United States Patent
Nomura et al.

(10) Patent No.: US 8,396,643 B2
(45) Date of Patent: Mar. 12, 2013

(54) GAS TURBINE CONTROL DEVICE AND GAS TURBINE SYSTEM

(75) Inventors: Masumi Nomura, Takasago (JP); Kozo Toyama, Takasago (JP); Hiroyuki Iba, Takasago (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 1147 days.

(21) Appl. No.: 11/993,915

(22) PCT Filed: Mar. 29, 2006

(86) PCT No.: PCT/JP2006/306522
§ 371 (c)(1),
(2), (4) Date: Dec. 26, 2007

(87) PCT Pub. No.: WO2006/137201
PCT Pub. Date: Dec. 28, 2006

(65) Prior Publication Data
US 2009/0125207 A1 May 14, 2009

(30) Foreign Application Priority Data
Jun. 23, 2005 (JP) .................. 2005-183219

(51) Int. Cl.
*G01N 33/22* (2006.01)
*G01L 23/00* (2006.01)
*G06F 17/00* (2006.01)

(52) U.S. Cl. ........ 701/103; 701/111; 73/35.02; 73/35.05
(58) Field of Classification Search .......... 701/100, 701/102, 103, 104, 110, 111; 73/32 R, 434, 73/35.01, 35.02, 35.03, 35.04, 35.05, 35.06
See application file for complete search history.

(56) References Cited

U.S. PATENT DOCUMENTS
7,188,019 B2 3/2007 Nomura et al.
2005/0107942 A1 5/2005 Nomura et al.

FOREIGN PATENT DOCUMENTS
CN 1611839 A 5/2005
(Continued)

OTHER PUBLICATIONS

Chinese Office Action dated Mar. 13, 2009, issued in corresponding Chinese Patent Application No. 200680022033.

(Continued)

*Primary Examiner* — Thomas Tarcza
*Assistant Examiner* — Edward Pipala
(74) *Attorney, Agent, or Firm* — Westerman, Hattori, Daniels & Adrian, LLP

(57) ABSTRACT

An object of the present invention is to provide a gas turbine control device which is capable of performing correction on the basis of a fuel composition of fuel gas to be supplied to a gas turbine, and is capable of changing an amount of correction in response to variation with time of the gas turbine. To attain this, a frequency analyzing unit 25 performs a frequency analysis of combustion oscillation of a combustor and splits a result of the analysis into respective frequency bands. Then, a state grasping unit 22 checks an operating state of the gas turbine on the basis of the result of the analysis of the combustion oscillation and process value of the gas turbine, and corrects the checked operating state on the basis of a fuel composition or a heat capacity of fuel gas measured by a fuel characteristic measuring unit 200. A countermeasure determining unit 23 conducts a countermeasure for controlling an operating action of the gas turbine on the basis of the operating state thus checked.

17 Claims, 26 Drawing Sheets

| FUEL COMPOSITION | CONCENTRATION |
|---|---|
| O2 | 0% |
| CO2 | 0% |
| H2O | 0% |
| N2 | 0% |
| Ar | 0% |
| CO | 0% |
| H2 | 0% |
| CH4 | 80% |
| C2H6 | 15% |
| C3H8 | 2% |
| C4H10 | 2% |
| CH3OH | 1% |
| C2H5OH | 0% |

FOREIGN PATENT DOCUMENTS

| | | |
|---|---|---|
| JP | 05187271 A | 7/1993 |
| JP | 6193470 A | 7/1994 |
| JP | 7224689 A | 8/1995 |
| JP | 2003314301 A | 11/2003 |
| JP | 2005155590 A | 6/2005 |

OTHER PUBLICATIONS

International Search Report of PCT/JP2006/306522; date of mailing Jun. 20, 2006.

Fig. 8

| TIME | PROCESS AMOUNTS ||||||| COMBUSTION OSCILLATION |||
| | OPERATION AMOUNTS || INOPERABLE STATE AMOUNTS |||| | | |
| | BYPASS VALVE OPENING | PILOT RATIO | AMBIENT TEMPERATURE | MW | CALORIE | FUEL COMPOSITION | FIRST FREQUENCY BAND | SECOND FREQUENCY BAND | ... | N-TH FREQUENCY BAND |
|---|---|---|---|---|---|---|---|---|---|---|
| t1 | Xi1-1 | Xi2-1 | Xx1-1 | Xx2-1 | Xy1-1 | Xy2-1 | Yi1-1 | Yi2-1 | ... | Yin-1 |
| t2 | Xi1-2 | Xi2-2 | Xx1-2 | Xx2-2 | Xy1-2 | Xy2-2 | Yi1-2 | Yi2-2 | ... | Yin-2 |
| ... | ... | ... | ... | ... | ... | ... | ... | ... | ... | ... |
| tn | Xi1-n | Xi2-n | Xx1-n | Xx2-n | Xy1-n | Xy2-n | Yi1-n | Yi2-n | ... | Yin-n |

Fig.10
|  | FIRST FREQUENCY BAND |  | ... | N-TH FREQUENCY BAND |  |
|---|---|---|---|---|---|
| FIRST PRIORITY | BYPASS VALVE | OPEN | ... | PILOT RATIO | DECREASE |
| SECOND PRIORITY | PILOT RATIO | INCREASE | ... | — | — |
Fig.11
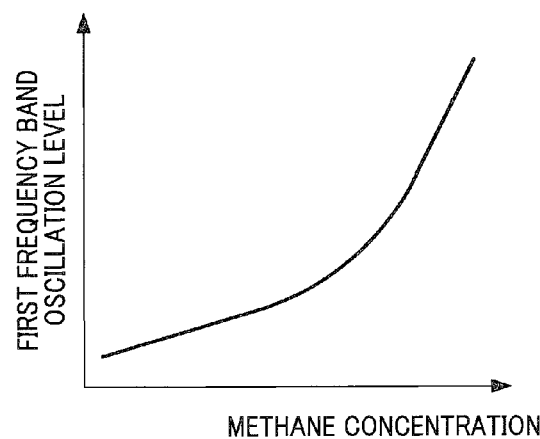
Fig.12
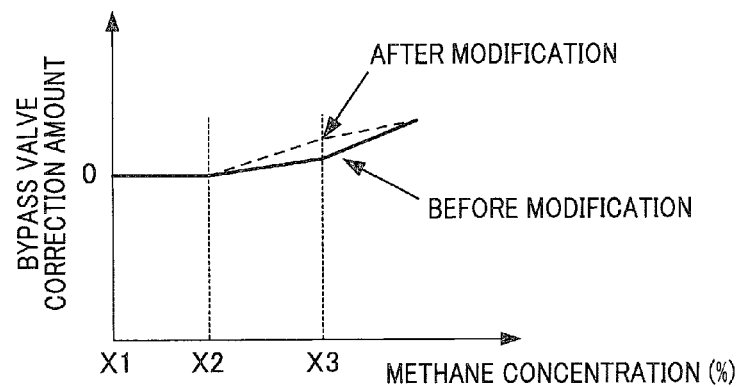

Fig. 21

| | PROCESS AMOUNTS ||||| COMBUSTION OSCILLATION |||
|---|---|---|---|---|---|---|---|---|
| | OPERATION AMOUNTS || INOPERABLE STATE AMOUNTS || | | | |
| TIME | BYPASS VALVE OPENING | PILOT RATIO | AMBIENT TEMPERATURE | MW | | FIRST FREQUENCY BAND | ... | N-TH FREQUENCY BAND |
| t1 | Xi1-1 | Xi2-1 | Xx1-1 | Xx2-1 | | Yi1-1 | ... | Yin-1 |
| t2 | Xi1-2 | Xi2-2 | Xx1-2 | Xx2-2 | | Yi1-2 | ... | Yin-2 |
| ... | ... | ... | ... | ... | | ... | ... | ... |
| tn | Xi1-n | Xi2-n | Xx1-n | Xx2-n | | Yi1-n | ... | Yin-n |

| | PROCESS AMOUNTS |||||
|---|---|---|---|---|---|
| | OPERATION AMOUNTS | INOPERABLE STATE AMOUNTS |||| 
| | | FUEL F1 || ... | FUEL Fq ||
| TIME | PRINCIPAL COMPONENTS | CALORIE | PRINCIPAL COMPONENTS | ... | CALORIE | PRINCIPAL COMPONENTS |
| | CALORIE | | | | | |
| t1 | Xz1-1 | Xz2-1 | F1y1-1 | F1y2-1 | ... | Fqy1-1 | Fqy2-1 |
| t2 | Xz1-2 | Xz2-2 | F1y1-2 | F1y2-2 | ... | Fqy1-2 | Fqy2-2 |
| ... | ... | ... | ... | ... | ... | ... | ... |
| tn | Xz1-n | Xz2-n | F1y1-n | F1y2-n | ... | Fqy1-n | Fqy2-n |

GAS TURBINE CONTROL DEVICE AND GAS TURBINE SYSTEM

TECHNICAL FIELD

The present invention relates to a control device for a gas turbine for performing control to suppress combustion oscillation and a system including the same.

BACKGROUND ART

A conventional gas turbine is configured to predetermine an air flow rate and a fuel flow rate to be sent to a combustor on the basis of a power generator output, an ambient temperature, humidity, and the like, and to perform operation based on the determined flow rate values. However, there is a possibility that fuel composition, the fuel flow rate, and the air flow rate in practice are deviated from those at the time of planning or at the time of test run adjustment due to variation in the composition or the heat capacity of the fuel gas to be supplied to the gas turbine or to secular changes such as deterioration in performance of a compressor or filter clogging, for example. Attributed to such deviation, there arises a risk of deterioration in combustion stability and eventual occurrence of combustion oscillation which constitutes a major obstacle to operation of the gas turbine. Accordingly, from the viewpoints of equipment protection and improvement in the operating rate, there is a strong demand for suppressing and avoiding occurrence of this combustion oscillation as much as possible.

Meanwhile, the fuel gas stored in a fuel tank, for instance, is supplied to the combustor of the gas turbine. However, inside this fuel tank for storing the fuel gas, heavy molecules out of components constituting the fuel gas go down while light molecules go up over time. As a result, the fuel composition of the fuel gas supplied to the gas turbine fluctuates in response to the residual amount of the fuel inside the fuel tank or to the time, whereby such a difference in the fuel composition generates a change in a combustive action in the combustor which may lead to reduction in the combustion stability. Moreover, the fuel composition fluctuates largely in the case of using blast furnace gas as the fuel, for example, and similar reduction in the combustion stability may occur.

In response, a gas turbine controlling method configured to control a fuel flow rate and an air flow rate in a combustor in response to an amount of variation in a fuel calorific value based on a fuel composition has been disclosed as a gas turbine controlling method for maintaining this combustion stability (see Patent Document 1). According to the gas turbine controlling method disclosed in this patent document, adjustment for the amount of variation in the fuel calorific value is performed by setting up a bias coefficient corresponding to the amount of variation in the fuel calorific value based on the fuel composition, and by performing addition after-multiplying operation amounts of a fuel flow rate and an air flow rate by the set bias coefficient.
Patent Document 1: Japanese Patent Application Laid-open Publication No. 5 (1993)-187271

DISCLOSURE OF THE INVENTION

Problem to be Solved by the Invention

However, in the controlling method according to Patent Document 1, the bias coefficient corresponding to the amount of variation in the fuel calorific value is uniquely determined. For this reason, there may be a case where it is not possible to perform sufficient adjustment when a relation between the amount of variation in the fuel calorific value and the bias coefficient is deviated because of aging of the compressor, the combustor, and the like in the gas turbine. In other words, although amounts of correction corresponding to the respective operation amounts in the gas turbine are determined by the fuel calorific value, the amounts of correction determined by this fuel calorific value do not correspond to condition changes attributable to deterioration or deformation of the respective units of the gas turbine by aging. Accordingly, there is a case where the operation amounts corresponding to the condition changes attributable to deterioration or deformation of the respective units of the gas turbine cannot be obtained so that it is not possible to perform sufficient control for avoiding combustion oscillation depending on the condition of the gas turbine.

In view of the above-described problems, an object of the present invention is to provide a gas turbine control device and a gas turbine system, which are capable of performing correction based on a fuel composition of fuel gas to be supplied to a gas turbine, and of changing an amount of correction depending on aging of the gas turbine.

Means for Solving the Problem

To attain the object, a gas turbine control device according to a first invention of the present invention is characterized by including: a frequency analyzing unit for performing a frequency analysis of combustion oscillation in a combustor of a gas turbine, and for splitting a result of this frequency analysis into multiple frequency bands; a fuel characteristic detecting unit for detecting any of a fuel composition and a heat capacity of fuel to be supplied to the combustor; an inputting unit to which a process value of the gas turbine other than the fuel composition and the heat capacity of the fuel is inputted; a state grasping unit for confirming a current state of operation of the gas turbine by using the result of the frequency analysis split into the frequency bands from the frequency analyzing unit, the process value of the gas turbine from the inputting unit, and any of the fuel composition and the heat capacity of the fuel detected by the fuel characteristic detecting unit; a countermeasure determining unit for determining an increase or decrease in a flow rate of at least one of a fuel flow rate and an air flow rate to the combustor on the basis of the current state of operation of the gas turbine confirmed by the state grasping unit; and an outputting unit for outputting an operation amount corresponding to a countermeasure determined by the countermeasure determining unit. In addition, to attain the object, the gas turbine control device according to the first invention of the present invention is characterized in that a history indicating a relation between the fuel composition or the heat capacity of the fuel and combustion oscillation of the combustor is recorded and that a relation between the fuel composition or the heat capacity of the fuel and the current state of operation of the gas turbine is determined based on the history.

Meanwhile, a gas turbine control device according to a second invention of the present invention is the gas turbine control device according to the first invention of the present invention, which is characterized in that the state grasping unit confirms the current state of operation of the gas turbine on the basis of the result of the frequency analysis split into the multiple frequency bands from the frequency analyzing unit and the process value of the gas turbine from the inputting unit, that the state grasping unit determines a relation of an amount of correction in the current state of operation of the gas turbine corresponding to any of the fuel composition and the heat capacity of the fuel detected by the fuel characteristic detecting unit on the basis of the history indicating the relation between the fuel composition or the heat capacity of the fuel and combustion oscillation of the combustor, and that the state grasping unit corrects the confirmed current state of operation on the basis of any of the fuel composition and the heat capacity of the fuel detected by the fuel characteristic detecting unit.

Meanwhile, a gas turbine control device according to a third invention of the present invention is the gas turbine control device according to the first invention of the present invention, which is characterized by including a combustion characteristic grasping unit for finding a relational expression indicating a combustion characteristic of the combustor from a relation between the current state of operation of the gas turbine confirmed by the state grasping unit and any of the fuel composition and the heat capacity of the fuel, and is characterized in that the countermeasure determining unit determines the increase or decrease in the flow rate of at least one of the fuel flow rate and the air flow rate to the combustor by calculation based on any of the fuel composition and the heat capacity of the fuel confirmed through the state grasping unit.

Meanwhile, a gas turbine control device according to a fourth invention of the present invention is the gas turbine control device according to the third invention of the present invention, which is characterized in that the combustion characteristic grasping unit finds the relational expression indicating the combustion characteristic of the combustor from the history indicating the relation between the fuel composition or the heat capacity of the fuel and combustion oscillation of the combustor.

Meanwhile, a gas turbine control device according to a fifth invention of the present invention is the gas turbine control device according to any one of the third and fourth invention of the present invention, which is characterized in that the relational expression indicating the combustion characteristic of the combustor is generated for each of the frequency bands split by the frequency analyzing unit and represents an expression indicating a relation among the result of the frequency analysis, the fuel composition or the heat capacity of the fuel, and the fuel flow rate as well as the air flow rate to the combustor.

Meanwhile, a gas turbine control device according to a sixth invention of the present invention is the gas turbine control device according to any one of the third to fifth inventions of the present invention, which is characterized in that the counter measure determining unit determines the increase or decrease in the flow rate of at least one of the fuel flow rate and the air flow rate to the combustor by utilizing an optimization method based on a relation between the current state of operation of the gas turbine confirmed by the state grasping unit and the relational expression indicating the combustion characteristic of the combustor by the combustion characteristic grasping unit. This optimization method may also apply a steepest descent method, a conjugate method, a genetic algorithm, and the like.

Meanwhile, a gas turbine control device according to a seventh invention of the present invention is the gas turbine control device according to any one of the first to sixth inventions of the present invention, which is characterized by including a performance characteristic grasping unit for detecting efficiency of any of the entirety and respective units of the gas turbine by use of the process value of the gas turbine from the inputting unit and the fuel composition or the heat capacity of the fuel detected by the fuel characteristic detecting unit, and is characterized in that the countermeasure determining unit corrects an amount of the increase or decrease in the flow rate of at least one of the fuel flow rate and the air flow rate to the combustor, which is previously set up, to improve efficiency of any of the entirety and the respective units of the gas turbine detected by the performance characteristic grasping unit.

Meanwhile, a gas turbine control device according to an eighth invention of the present invention is the gas turbine control device according to any one of the first to seventh inventions of the present invention, which is characterized by including a life characteristic grasping unit for detecting lives of the respective units of the gas turbine by use of the process value of the gas turbine from the inputting unit and the fuel composition or the heat capacity of the fuel detected by the fuel characteristic detecting unit, and is characterized in that the countermeasure determining unit corrects an amount of the increase or decrease in the flow rate of at least one of the fuel flow rate and the air flow rate to the combustor, which is previously set up, to improve the lives of the respective units of the gas turbine detected by the life characteristic grasping unit.

Meanwhile, a gas turbine control device according to a ninth invention of the present invention is the gas turbine control device according to any one of the first to eighth inventions of the present invention, which is characterized in that combustion oscillation of the combustor is measured based on any of pressure fluctuation of the combustor and acceleration oscillation of the combustor.

Meanwhile, a gas turbine control device according to a tenth invention of the present invention is the gas turbine control device according to any one of the first to ninth inventions of the present invention, which is characterized in that the fuel characteristic detecting unit includes a gas analyzer for measuring concentrations of respective components of the fuel and detects the fuel composition or the heat capacity of the fuel on the basis of the concentrations of the respective components of the fuel measured by the gas analyzer.

Meanwhile, a gas turbine control device according to an eleventh invention of the present invention is the gas turbine control device according to any one of the first to tenth inventions of the present invention, which is characterized in that the fuel characteristic detecting unit is installed on a fuel supply line for guiding the fuel from a fuel supply source to the combustor and a location of the installation is set to a position where it is possible to obtain a measurement value of the fuel measured in the location of the installation before the measured fuel flows on the fuel supply line and reaches the combustor.

Meanwhile, a gas turbine control device according to a twelfth invention of the present invention is the gas turbine control device according to the eleventh invention of the present invention, which is characterized in that the a time delay from a point of obtaining the measurement value of the fuel by the fuel characteristic detecting unit to a point of the fuel reaching the combustor is set by a function of any of an output of the gas turbine or the fuel flow rate, and that timing of the fuel reaching the combustor is synchronized with timing of capturing the measurement value by the state grasping unit or by the state grasping unit and the combustion characteristic grasping unit on the basis of this time delay.

Meanwhile, a gas turbine control device according to a thirteenth invention of the present invention is the gas turbine control device according to any one of the eleventh and twelfth inventions of the present invention, which is characterized in that the multiple fuel characteristic detecting units are installed in the location of installation, and that the multiple fuel characteristic measuring units have shifted timing for measuring the fuel.

Meanwhile, a gas turbine control device according to a fourteenth invention of the present invention is the gas turbine control device according to any one of the first to ninth inventions of the present invention, which is characterized in that the fuel characteristic detecting unit detects the fuel composition or the heat capacity of the fuel on the basis of the fuel flow rate of the fuel and an output as well as efficiency of the gas turbine.

Meanwhile, a gas turbine control device according to a fifteenth invention of the present invention is characterized by including: a frequency analyzing unit for performing a frequency analysis of combustion oscillation in a combustor of a gas turbine and for splitting a result of this frequency analysis into multiple frequency bands; a fuel characteristic estimating unit having a threshold for categorizing a fuel characteristic into multiple categories and being configured to compare this threshold with a ratio between an output of the gas turbine and a fuel flow rate of the fuel, and to determine which one out of the multiple categories the fuel characteristic of the fuel corresponds to; an inputting unit to which a process value of the gas turbine other than a fuel composition and a heat capacity of the fuel is inputted; a state grasping unit for confirming a current state of operation of the gas turbine by using the result of the frequency analysis split into the frequency bands from the frequency analyzing unit, the process value of the gas turbine from the inputting unit, and the category of the fuel characteristic determined by the fuel characteristic estimating unit; a countermeasure determining unit for determining an increase or decrease in a flow rate of at least one of the fuel flow rate and an air flow rate to the combustor on the basis of the current state of operation of the gas turbine confirmed by the state grasping unit; and an outputting unit for outputting an operation amount corresponding to a countermeasure determined by the countermeasure determining unit. In addition, the gas turbine control device according to the fifteenth invention of the present invention is characterized in that a history indicating a relation between the category of the fuel characteristic and combustion oscillation of the combustor is recorded, and that a relation of the current state of operation of the gas turbine corresponding to the category of the fuel characteristic is determined based on the history.

Meanwhile, a gas turbine control device according to a sixteenth invention of the present invention is the gas turbine control device according to the fifteenth invention of the present invention, which is characterized in that the state grasping unit confirms the current state of operation of the gas turbine on the basis of the result of the frequency analysis split into the multiple frequency bands from the frequency analyzing unit and the process value of the gas turbine from the inputting unit, that the state grasping unit determines a relation of an amount of correction in the current state of operation of the gas turbine corresponding to the category of the fuel characteristic determined by the fuel characteristic estimating unit on the basis of the history indicating the relation between the category of the fuel characteristic and combustion oscillation of the combustor, and that the state grasping unit corrects the confirmed current state of operation on the basis of the category of the fuel characteristic determined by the fuel characteristic estimating unit.

Meanwhile, a gas turbine control device according to a seventeenth invention of the present invention is the gas turbine control device according to any one of the fifteenth and sixteenth inventions of the present invention, which is characterized in that a ratio between an output of the gas turbine and the fuel flow rate of the fuel by use of a deterioration characteristic of the gas turbine.

Meanwhile, a gas turbine control device according to an eighteenth invention of the present invention is the gas turbine control device according to any one of the fifteenth to seventeenth inventions of the present invention, which is characterized by including a combustion characteristic grasping unit for finding a relational expression indicating a combustion characteristic of the combustor from the current state of operation of the gas turbine confirmed by the state grasping unit on the basis of the category of the fuel characteristic determined by the fuel characteristic estimating unit, and is characterized in that the countermeasure determining unit determines the increase or decrease in the flow rate of at least one of the fuel flow rate and the air flow rate to the combustor by use of the relational expression indicating the combustion characteristic of the combustor.

Meanwhile, a gas turbine control device according to a nineteenth invention of the present invention is the gas turbine control device according to any one of the first to eighteenth inventions of the present invention, which is characterized in that, when the fuel to be supplied to the combustor includes multiple types of fuel substances having mutually different fuel compositions, the countermeasure determining unit also sets up increases or decreases of respective fuel flow rates of the multiple types of fuel substances.

Meanwhile, a gas turbine system according to a twentieth invention of the present invention is characterized by including a compressor for compressing external air, a combustor for combusting compressed air from the compressor and fuel, a turbine for being rotated by combustion gas from the combustor, and a gas turbine control device for setting an air flow rate and a fuel flow rate to the combustor on the basis of process values respectively measured in terms of the compressor, the combustor and the turbine, and is characterized in that the gas turbine control device is the gas turbine control device according to any one of the first to nineteenth inventions of the present invention.

Meanwhile, a gas turbine system according to a twenty-first invention of the present invention is the gas turbine system according to the twentieth invention of the present invention, which is characterized by including multiple gas turbine plants each having the compressor, the combustor and the turbine, and a control device for controlling states of operation of the multiple gas turbine plants by communication with the multiple gas turbine plants, and is characterized in that the gas turbine plant includes the inputting unit, the fuel characteristic detecting unit, the frequency analyzing unit, the outputting unit, and a communicating unit for communicating with the control device, and that the control device includes the state grasping unit, the countermeasure determining unit, and a communicating unit for communicating with the gas turbine plants.

Effect of the Invention

According to the present invention, the state of operation of the gas turbine can be controlled based on the fuel composition or the heat capacity of the fuel to be supplied to the combustor. Consequently, it is possible to control the gas turbine in response to a change in the fuel composition caused by passage of time, to suppress combustion oscillation of the combustor, and to maintain combustion stability. In addition, since the relation between the fuel composition and the operation amount can be changed based on the history, it is possible to perform the control in response to aging of the gas turbine and to further stabilize combustion in the combustor.

Moreover, it is possible to obtain the measurement value of the fuel composition or the heat capacity of the fuel gas and to synchronize the timing of capturing the measurement value by the state grasping unit or by the state grasping unit and the combustion characteristic grasping unit with the timing of combusting the combusting gas from which this measurement value is obtained. Accordingly, it is possible to suppress combustion oscillation more reliably at the time of a change in the fuel composition and to maintain combustion stability more reliably. In addition, it is possible to shorten a sampling cycle (a measurement cycle) of the fuel gas by installing the multiple fuel characteristic detecting units and shifting the timing for measuring the fuel. Consequently, it is possible to improve a tracking performance relative to a change in the fuel composition or the heat capacity of the fuel gas, and thereby to maintain combustion stability more reliably.

Moreover, even when a fuel characteristic measuring unit such as a gas analyzer is not provided, it is possible to change the contents of a counter measure process so as to follow the change in the fuel characteristic by using the category of the fuel characteristic determined by the fuel characteristic estimating unit. Accordingly, it is possible to maintain combustion stability. Further, even in the case of operating the gas turbine for a long period of time, it is possible to judge the category of the fuel characteristic by correcting the ratio between the gas turbine output and the fuel flow rate by use of the deterioration characteristic of the gas turbine. Accordingly, it is possible to maintain combustion stability more reliably. In addition, the combustion characteristic grasping unit is provided for finding the relational expression indicating the combustion characteristic of the combustor from the current state of operation of the gas turbine confirmed by the state grasping unit on the basis of the category of the fuel characteristic determined by the fuel characteristic estimating unit, and the countermeasure determining unit determines the increase or decrease in the flow rate of at least one of the fuel flow rate and the air flow rate to the combustor by use of the relational expression indicating the combustion characteristic of the combustor. Accordingly, it is possible to improve accuracy of a characteristic analysis concerning combustion stability, and resultantly to maintain combustion stability while suppressing combustion oscillation at the time of the change in the fuel composition or the heat capacity.

BRIEF DESCRIPTION OF THE DRAWINGS

FIG. 8 is a diagram showing an example of a data table for state check.

FIG. 10 is a diagram showing an example of a data table for countermeasures.

FIG. 11 is a graph showing an example of a relation between oscillation intensity of a first frequency band and a methane concentration in fuel gas.

FIG. 12 is a graph showing an example of a relation between an amount of correction relative to a bypass valve opening and a methane concentration of the fuel gas.

FIG. 21 is a diagram showing another example of the data table for state check.

EXPLANATION OF REFERENCE NUMERALS

1 GAS TURBINE SYSTEM
2 GAS TURBINE
3 GAS TURBINE CONTROL UNIT
4 PROCESS AMOUNT MEASURING UNIT
5 PRESSURE FLUCTUATION MEASURING UNIT
6 ACCELERATION MEASURING UNIT
7 OPERATION MECHANISM
10 CONTROL UNIT
20, 20a to 20k AUTOMATIC ADJUSTING UNIT
21 INPUTTING UNIT
22 STATE GRASPING UNIT
23 COUNTERMEASURE DETERMINING UNIT
24 OUTPUTTING UNIT
25 FREQUENCY ANALYZING UNIT
28 COMBUSTION CHARACTERISTIC GRASPING UNIT
29 PERFORMANCE CHARACTERISTIC GRASPING UNIT
30 LIFE CHARACTERISTIC GRASPING UNIT
40, 41 COMMUNICATION DEVICE
50, 50-1 to 50-N PLANT-SIDE CONTROL UNIT
51 REMOTE CONTROL UNIT
100 INTERNET
200, 200-1 to 200-q, 200-1 to 200-n Fuel Characteristic Measuring Unit
201 FUEL CHARACTERISTIC ESTIMATING UNIT
400 FUEL CHARACTERISTIC ESTIMATING UNIT

BEST MODES FOR CARRYING OUT THE INVENTION

Configuration of Gas Turbine System

Figure 1:
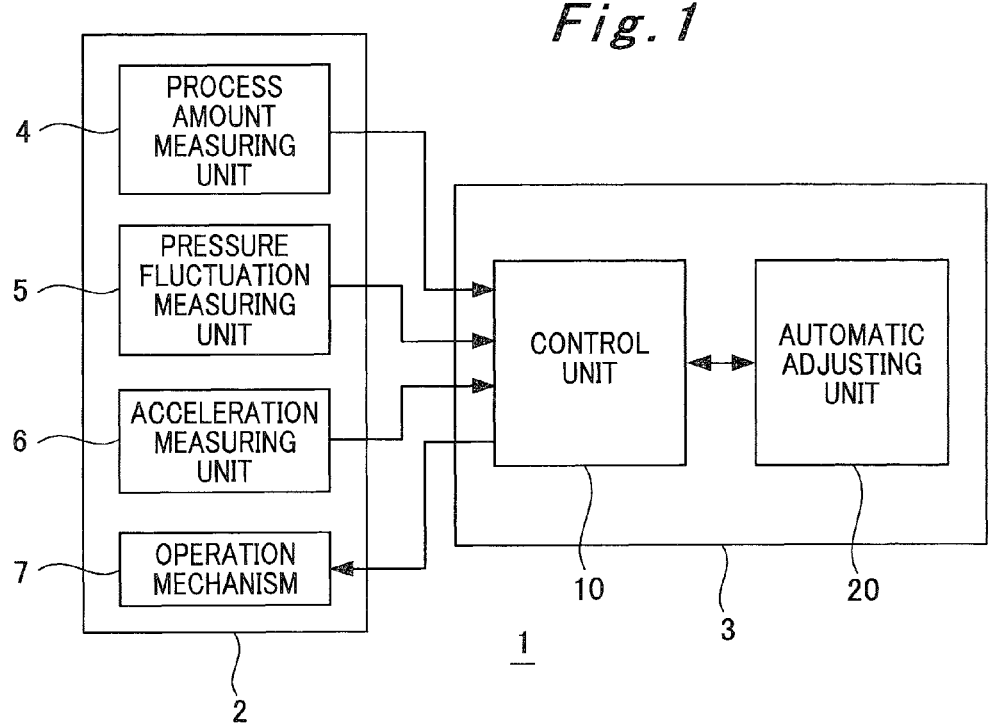
FIG. 1 is a block diagram showing a configuration example of a gas turbine system of an embodiment of the present invention.

An overall configuration of a gas turbine system constituting a common configuration to respective embodiments of the present invention will be described with reference to the accompanying drawings. FIG. 1 is a block diagram showing a configuration of a gas turbine system. A gas turbine system 1 in FIG. 1 includes a gas turbine 2 to be rotated by thermal energy obtained by combusting supplied fuel gas, and a gas turbine control unit 3 for controlling the gas turbine 2.

In this gas turbine system 1, the gas turbine 2 includes a process amount measuring unit 4 for measuring respective process amounts indicating operating conditions and operating states of the gas turbine 2, a pressure fluctuation measuring unit 5 and an acceleration measuring unit 6 attached to a combustor 111 (see FIG. 2) to be described later which is provided on the gas turbine 2, and an operation mechanism 7 for operating respective units of the gas turbine 2. Meanwhile, the gas turbine control unit 3 includes a controller 10 for generating control signals to be given to the operation mechanism 7 on the basis of signals from the process amount measuring unit 4, the pressure fluctuation measuring unit 5 and the acceleration measuring unit 6, and an automatic adjusting unit 20 for adjusting operation amounts equivalent to the control signals generated by the controller 10.

In the gas turbine system 1 configured as described above, the process amount measuring unit 4 disposed in the gas turbine 2 is installed in an appropriate region on the gas turbine 2 and is configured to output to the controller 10 of the gas turbine control unit 3 at every predetermined time t1, t2, and so forth. At this time, generated power (generated current and generated voltage) of a power generator 121 (see FIG. 2) to be described later, ambient temperature, humidity, fuel flow rates and gas pressure at the respective units, the numbers of revolutions of a compressor 101 (see FIG. 2) and a turbine 104 (see FIG. 2) to be described later, a fuel composition of fuel gas to be supplied to the combustor 111, combustion gas temperature, a fuel gas flow rate and fuel gas pressure in the combustor 111, concentrations of emissions contained in exhaust gas from the turbine 104 as represented by nitrogen oxides (NOx) and carbon monoxide (CO), and the like are measured as the process amounts (plant state amounts) by the process amount measuring unit 4, for example. Moreover, in the following description, the uncontrollable process amounts including meteorological data such as the ambient temperature and the size of a load on the power generator 121 determined by requests will be referred to as "inoperable state amounts" while the controllable process amounts such as the volumes of the fuel gas and air to be supplied to the gas turbine 1 will be referred to as the "operation amounts".

Moreover, similarly, the pressure fluctuation measuring unit 5 disposed in the gas turbine 2 includes pressure fluctuation measuring gauges respectively provided on m pieces of the combustors 111 installed in the gas turbine 2, then measures the pressure fluctuation inside the combustor 111 where the respective gauges are installed at every predetermined time t1, t2, and so forth, and then outputs measurement values to the controller 10 of the gas turbine control unit 3. Similarly, the acceleration measuring unit 6 disposed in the gas turbine 2 includes acceleration measuring gauges respectively provided on the combustors 111 installed in the gas turbine 2, then measures the acceleration equivalent to second order differential of positions of the combustors 111 on their own at every predetermined time t1, t2, and so forth, and then outputs measurement values to the controller 10 of the gas turbine control unit 3.

In this way, the inoperable state amounts and the operation amounts measured by the process amount measuring unit 4, and the pressure fluctuation as well as the acceleration inside the combustors 111 respectively measured by the pressure fluctuation measuring unit 5 and the acceleration measuring unit 6 are given to the controller 10 and then transferred to the automatic adjusting unit 20. Thereafter, the automatic adjusting unit 20 sets up adjustment amounts for the respective units of the gas turbine 2 on the basis of the measurement values measured and obtained by this process amount measuring unit 4, the pressure fluctuation measuring unit 5, and the acceleration measuring unit 6, which are given to the controller 10. Consequently, the controller generates the control signals for the respective units of the gas turbine 2 in response to the adjustment amounts set up by the automatic adjusting unit 20, which are given to the operation mechanism 7.

First Example of Configuration of Gas Turbine

Figure 2:
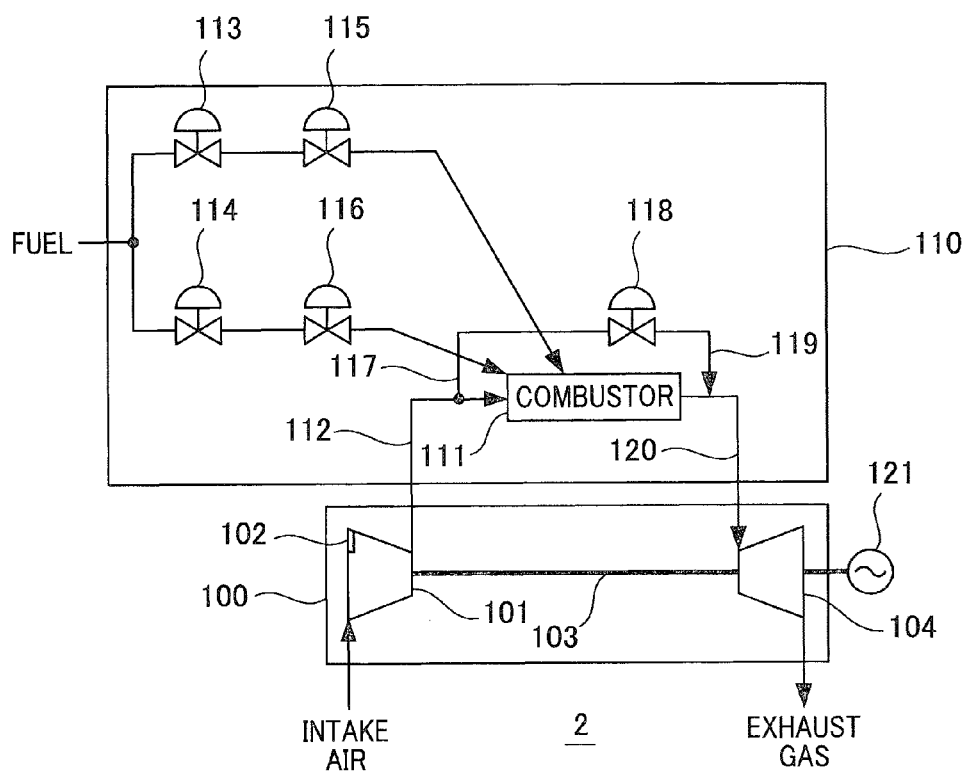
FIG. 2 is a block diagram showing a configuration example of a gas turbine in the gas turbine system in FIG. 1.

A first example of a configuration of the gas turbine in the gas turbine system in FIG. 1 will be described with reference to the accompanying drawing. FIG. 2 is a block diagram showing the configuration of the gas turbine in the gas turbine system in FIG. 1. The gas turbine 2 in FIG. 2 includes a gas turbine main unit 100 which is a rotating body, and a combusting unit 110 for generating the combustion gas for rotating the gas turbine 100.

Here, the gas turbine main unit 100 includes a compressor 101 for compressing intake air from outside and discharging high-pressure air, an inlet guide vane (IGV) 102 which is provided as a first-stage stator vane of this compressor 101 and is able to adjust an opening, a rotating shaft 103 for connecting the compressor 101 to a turbine 104 coaxially, and the turbine 104 to be rotated by the combustion gas from the combusting unit 110. Moreover, as the power generator 121 is connected to the turbine 104 coaxially, the power generator 121 performs a power generating action by rotation of the turbine 104.

Meanwhile, the combusting unit 110 includes the combustor 111 for receiving supply of the high-pressure air compressed by the compressor 101 and the fuel gas and performing a combusting action, a compressed air introducing unit 112 for introducing the high-pressure air from the compressor 101 to the combustor 111, a main fuel flow rate control valve 113 for determining a fuel flow rate to be supplied to an unillustrated main nozzle provided on the combustor 111, a pilot fuel flow rate control valve 114 for determining a fuel flow rate to be supplied to an unillustrated pilot nozzle provided on the combustor 111, a main fuel supply valve 115 to be disposed on a downstream side of the main fuel flow rate control valve 114, a pilot fuel supply valve 116 to be disposed on a downstream side of the pilot fuel flow rate control valve 113, a bypass air inlet tube 117 for bypassing the compressed air from the compressed air introducing unit 112 to the downstream of the combustor 111, a bypass valve 118 for determining a bypass air flow rate, a bypass air mixing tube 119 to be disposed on the downstream of the bypass valve 118 and connected to the down stream of the combustor 111, and a combustion gas inlet tube 120 for supplying the combustion gas from the combustor 111 to the turbine 104.

When configured in this way, the m pieces of the combustors 111-1 to 111-$m$ are provided around the gas turbine main unit 100 as described previously. In the following, the combustor 111 will be used in the explanation common to the m pieces of the combustors 111-1 to 111-$m$, while the explanation concerning the individual combustors will mark the combustors 111-1 to 111-$m$. Moreover, reference numerals will be changed between the case of common explanation and the case of individual explanation similarly in terms of main fuel supply valves 115-1 to 115-$m$, the pilot fuel supply valves 116-1 to 116-$m$, the bypass air inlet tubes 117-1 to 117-$m$, the bypass valves 118-1 to 118-$m$, the bypass air mixing tubes 119-1 to 119-$m$, and the combustion gas inlet tubes 120-1 to 120-$m$, all of which are configured to be attached to the combustors 111-1 to 111-$m$, respectively. Furthermore, the single main fuel control valve 113 is connected to the multiple main fuel supply valves 115-1 to 115-$m$ and the single pilot fuel control valve 114 is connected to the multiple pilot fuel supply valves 116-1 to 116-$m$.

In this case, firstly when the fuel gas is supplied from an unillustrated fuel tank to the main nozzles and the pilot nozzles of the combustors 111-1 to 111-$m$, the fuel flow rate to be supplied to all the main nozzles of the combustors 111-1 to 111-$m$ is controlled by the main fuel flow rate control valve 113, and the fuel flow rates to be supplied to the respective main nozzles of the combustors 111-1 to 111-$m$ are controlled by the respective main fuel supply valves 115-1 to 115-$m$. Similarly, the fuel flow rate to be supplied to all the pilot nozzles of the combustors 111-1 to 111-$m$ is controlled by the pilot fuel flow rate control valve 114, and the fuel flow rates to be supplied to the respective pilot nozzles of the combustors 111-1 to 111-$m$ are controlled by the respective pilot fuel supply valves 116-1 to 116-$m$.

In other words, the fuel flow rate to be supplied to all the main nozzles and the pilot nozzles of the combustors 111-1 to 111-$m$ is set up by operating the respective openings of the main fuel flow rate control valve 113 and the pilot fuel flow rate control valve 114 by the operation mechanism 7, thereby setting up a pilot ratio of the fuel to be supplied to all the combustors 111-1 to 111-$m$. Meanwhile, the fuel flow rates to be supplied to the respective main nozzles and the respective pilot nozzles of the combustors 111-1 to 111-$m$ are set up by operating the respective openings of the main fuel supply valves 115-1 to 115-$m$ and the pilot fuel supply valves 116-1 to 116-$m$ by the operation mechanism 7, thereby setting up pilot ratios of the fuel to be respectively supplied to the combustors 111-1 to 111-$m$.

Meanwhile, the amount of outside air to be taken into the compressor 101 is set up when the opening of the IGV 102 is operated by the operation mechanism 7. Then, the outside air taken in from the IGV 102 is compressed by the compressor 101 and the high-pressure compressed air is supplied to the combustor 111 through the compressed air introducing unit 112. At this time, part of the compressed air given to the compressed air introducing unit 112 flows on the bypass air inlet tube 117. The flow rate of the compressed air supplied from the compressed air introducing unit 112 to the combustor 111 is set up as the flow rate of the air passing through this bypass air inlet tube 117 is set up by operation of the opening of the bypass valve 118 by the operation mechanism 7. Thereafter, the compressed air that passed through the bypass air inlet tube 117 and the bypass valve 118 is supplied to the combustion gas inlet tube 120 through the bypass air mixing tube 119.

When the fuel flow rate and the air flow rate to be supplied to the combustor 111 are set up as described above, the combustor 111 performs a combusting action by use of the fuel gas and the air thus supplied, and generates the high-temperature and high-pressure combustion gas. The combustion gas generated by this combustor 111 is supplied to the turbine 104 through the combustion gas inlet tube 120. Meanwhile, the compressed air from the bypass air mixing tube 119 flows into this combustion gas inlet tube 120 and is mixed with the combustion gas from the combustor 111.

Then, the turbine 104 is rotated by the combustion gas supplied through the combustion gas inlet tube 120. As the rotation of this turbine 104 is transmitted to the compressor 101 through the rotating shaft 103, the compressor 101 is also rotated. Accordingly, as the compressor 101 is rotated, the compressor 101 generates the compressed air as described above by inhaling and compressing the outside air and supplies the compressed air to the compressed air introducing unit 112. Meanwhile, as rotational energy of the turbine 104 is given to the power generator 121, the power generator 121 performs the power generating action on the basis of this rotational energy.

When operated as described above, the fuel gas to be supplied to the main nozzle of the combustor 111 is increased (or decreased) by opening (or closing) the openings of the main fuel flow rate control valve 113 and the main fuel supply valve 115. Meanwhile, the fuel gas to be supplied to the pilot nozzle of the combustor 111 is increased (or decreased) by opening (or closing) the openings of the pilot fuel flow rate control valve 114 and the pilot fuel supply valve 116. In the meantime, the air flow rate to be taken into the compressor 101 is increased (or decreased) by opening (or closing) the opening of the IGV 102. Moreover, the air flow rate flowing on the bypass side formed of the bypass air inlet tube 117 and the bypass air mixing tube 119 is increased (or decreased) by opening (or closing) the opening of the bypass valve 118, thereby decreasing (or increasing) the air flow rate to be supplied to the combustor 111.

First Embodiment

Figures 3, 4:
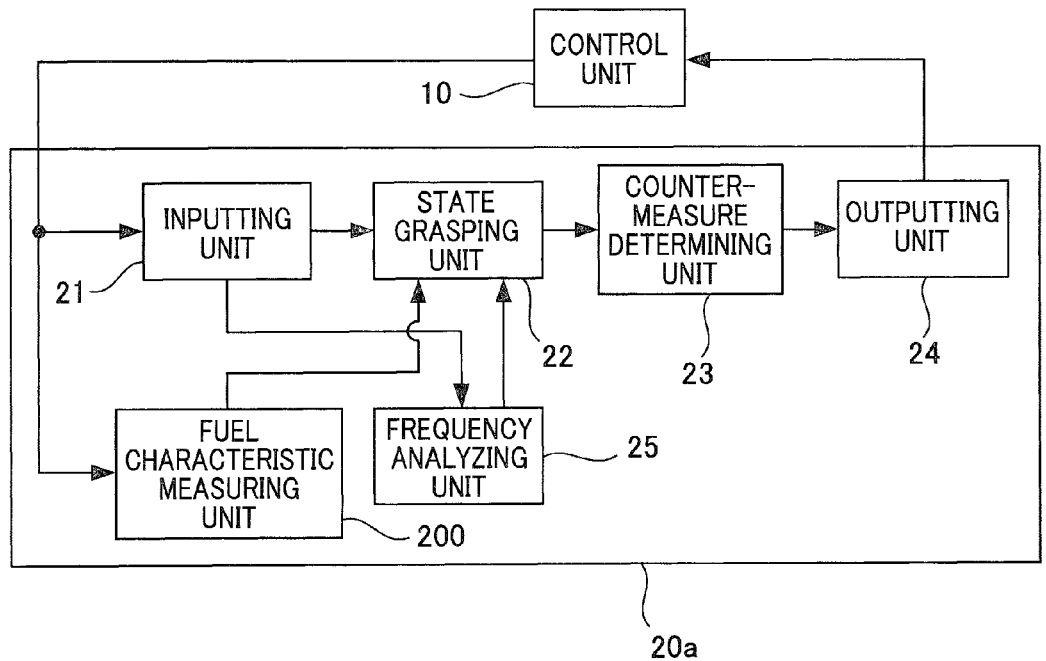
FIG. 3 is a block diagram showing a configuration of an automatic adjusting unit in a gas turbine system of a first embodiment.
FIG. 4 is a diagram showing an example of a fuel composition of fuel gas to be supplied to the gas turbine.

A first embodiment of the present invention will be described with reference to the accompanying drawings. FIG. 3 is a block diagram showing an internal configuration of an automatic adjusting unit used in a gas turbine system of this embodiment.

Figure 29:
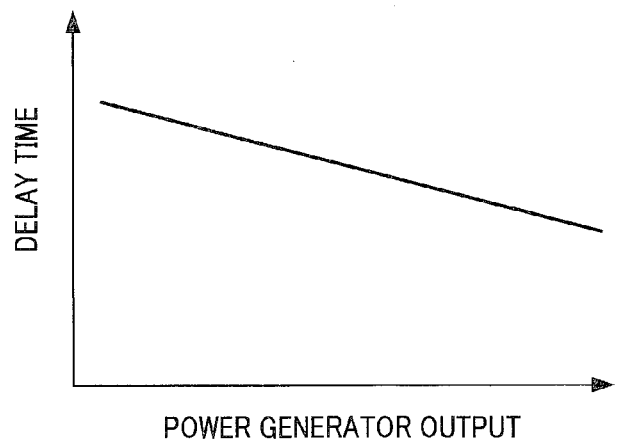
FIG. 29 is a diagram showing a setting example of time delay.

An automatic adjusting unit 20a (corresponding to the automatic adjusting unit 20 in FIG. 1) shown in FIG. 3 includes an inputting unit 21 to which measurement results at respective units of the gas turbine 2 are inputted, a state grasping unit 22 for grasping a state of the gas turbine 2, a countermeasure determining unit 23 for setting up adjustment amounts of the respective units of the gas turbine 2 on the basis of the state of the gas turbine 2 confirmed by the state grasping unit 22, an outputting unit 24 for outputting the adjustment amounts set up by the countermeasure determining unit 23 to the controller 10 (see FIG. 1), and a frequency analyzing unit 25 for analyzing the pressure fluctuation and the acceleration of the combustor 111 (see FIG. 29 inputted through the inputting unit 21 for each frequency band.

Meanwhile, a fuel characteristic measuring unit 200 for measuring a fuel composition of fuel gas to be supplied to the combustor 111 is disposed in the gas turbine 2 as one of process amount measuring units 4 (see FIG. 1), and a signal constituting a measurement result of this fuel characteristic measuring unit 200 is given to the state grasping unit 22 while respective signals constituting measurement results of the process amount measuring units 4 other than the fuel characteristic measuring unit are given to the inputting unit 21. This fuel characteristic measuring unit 200 may also be formed of a gas analyzer for measuring the fuel composition of the fuel gas. Moreover, the measurement results of the pressure fluctuation measuring unit 5 (see FIG. 1) and the acceleration measuring unit 6 (see FIG. 1) are also inputted to the inputting unit 21.

At this time, the measurement result of this fuel characteristic measuring unit 200 may be concentrations by volume ratio (%) of methane, ethane, propane, and the like within the fuel gas, which constitute principal components for the combusting action of the combustor 111, or a concentration by volume ratio (%) of inert gas within the fuel gas. Meanwhile, as shown in FIG. 4, it is also possible to measure concentrations by volume ratio (%) of multiple components constituting the fuel gas. Moreover, when this fuel characteristic measuring unit 200 measures the principal components for the combusting action in the fuel gas or the volume ratio of the inert gas, it is also possible to compute combustion calorie of the fuel gas on the basis of the volume ratios of the principal components or the inert gas and to output this combustion calorie as the measurement result. Then, the measurement result concerning the fuel composition (hereinafter referred to as "fuel composition information") of the fuel gas obtained by this fuel characteristic measuring unit 200 is given to the state grasping unit 22.

Meanwhile, the pressure fluctuation measuring unit 5 obtains pressure fluctuation values of the combustors 111-1 to 111-m by use of the pressure fluctuation measuring gauges respectively provided in the combustors 111-1 to 111-m. Then, the respective pressure fluctuation values of the combustors 111-1 to 111-m are given to the frequency analyzing unit 25 through the inputting unit 21. Similarly, the acceleration measuring unit 6 measures combustion oscillation generated at the combustor 111 by measuring oscillation of the combustors 111 of their own measured with the acceleration measuring gauges as the acceleration, and the acceleration values of the respective combustors 111-1 to 111-m thus measured are given to the frequency analyzing unit 25 through the inputting unit 21.

At this time, it is possible to provide the pressure fluctuation measuring unit 5 and the acceleration measuring unit 6 respectively with multiple sets of the pressure fluctuation measuring gauges and the acceleration measuring gauges, and to judge whether or not an anomaly occurs in any of the multiple sets of the pressure fluctuation measuring gauges, the acceleration measuring gauges, and data transmission systems for data outputted from the pressure fluctuation measuring gauges and the acceleration measuring gauges by means of comparing the measurement results of the multiple sets of the pressure fluctuation measuring gauges and the acceleration measuring gauges. For example, it is also possible to provide odd-number sets of the pressure fluctuation measuring gauges and the acceleration measuring gauges respectively to the pressure fluctuation measuring unit 5 and the acceleration measuring unit 6, and to employ the most common result by majority vote when different results of analyses are obtained.

Meanwhile, in the acceleration measuring unit 6, the single acceleration measuring unit 6 can measure the combustion oscillation generated at the multiple combustors 111 as the acceleration. Accordingly, if the pressure fluctuation measuring gauges in the pressure fluctuation measuring unit 5 respectively provided to the combustors 111-1 to 111-m are judged to be abnormal, it is possible to detect the combustion oscillation by use of the acceleration measuring unit 6. Meanwhile, in the case of providing the acceleration measuring unit 6 with the multiple acceleration measuring gauges, it is possible to improve the reliability when at least two acceleration measuring gauges judge occurrence of the combustion oscillation at the time of combustion even if no combustion oscillation is detected by the pressure fluctuation measuring unit 5. Moreover, in the case of measurement by using both of the pressure fluctuation measuring unit 5 and the acceleration measuring unit 6, it is also possible to improve the reliability similarly when both of the units judge occurrence of the combustion oscillation.

Figure 5:
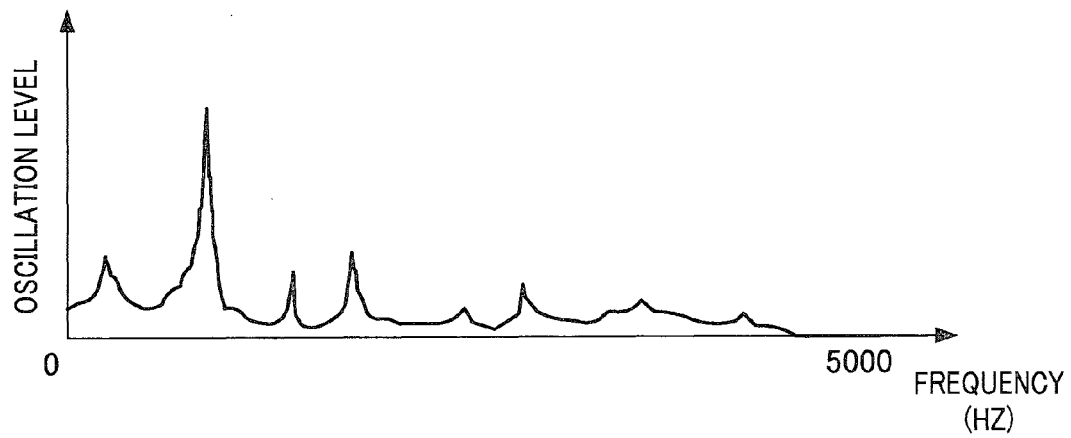
FIG. 5 is a graph showing a result of a frequency analysis.
Figure 6:
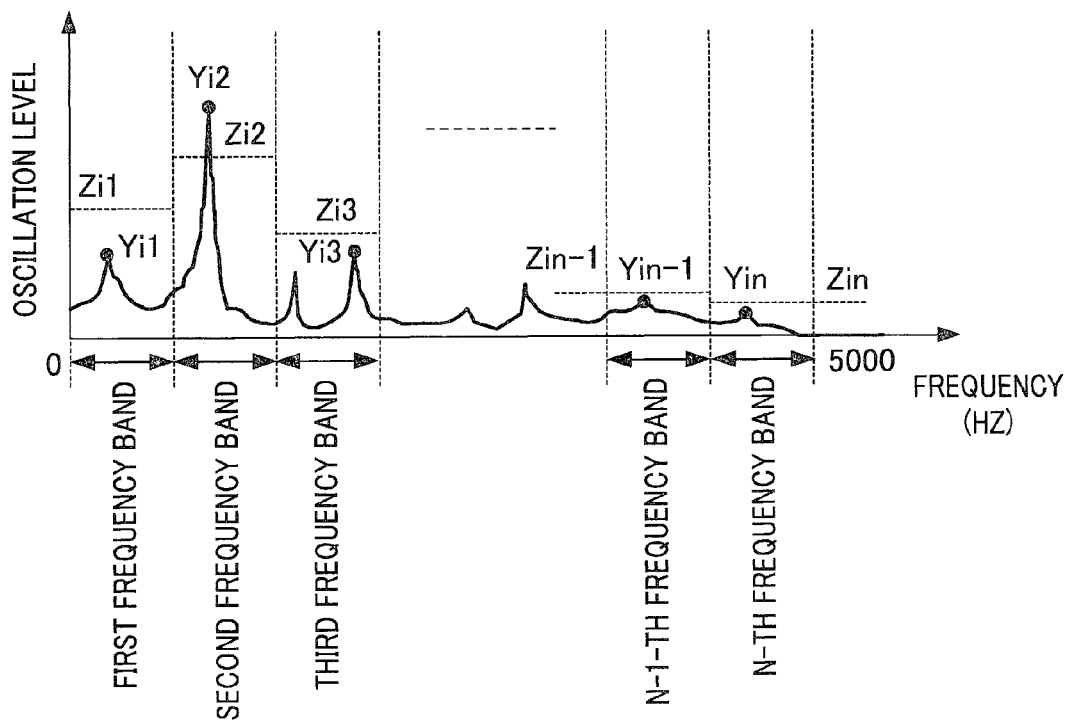
FIG. 6 is a graph showing the result of the frequency analysis, multiple frequency bands, and thresholds which are set to the respective frequency bands.

As described above, when the pressure fluctuation values (pressure oscillation) and the acceleration values (acceleration oscillation) of the respective combustors 111-1 to 111-m measured respectively by the pressure fluctuation measuring unit 5 and the acceleration measuring unit 6 are given to the frequency analyzing unit 25 through the inputting unit 21, the frequency analyzing unit 25 subjects the pressure fluctuation values and the acceleration values of the respective combustors 111-1 to 111-m thus measured to fast Fourier transformation to perform the frequency analysis. FIG. 5 shows an example of a result of the frequency analysis based on the pressure fluctuation values measured by the pressure fluctuation measuring unit 5. In FIG. 5, the lateral axis indicates the frequency while the longitudinal axis indicates the intensity (level) of the oscillation. As shown in this FIG. 5, it is possible to confirm that there are multiple frequencies having the pressure oscillation over the entire frequency band. This applies not only to the pressure oscillation but also to the acceleration oscillation. In other words, the combustion oscillation generated at the combustor 111 is composed of the oscillation at multiple frequencies.

As described above, since the combustion oscillation (the pressure fluctuation value and the acceleration) in the combustor 111 includes the oscillation composed of the multiple frequencies, the frequency analyzing unit 25 performs the frequency analysis to confirm the combustion oscillation in the respective frequencies and then divides a result of this frequency analysis of the combustion oscillation into multiple (n) frequency bands to perform the analysis in terms of the respective frequency bands. These frequency bands are frequency regions constituting units for allowing the state grasping unit 22 to confirm a state of combustion of the combustor 111 on the basis of the result of the frequency analysis executed by the frequency analyzing unit 25, and the oscillation intensity (level) attributable to the combustion oscillation is analyzed for each of these frequency bands by the frequency analyzing unit 25.

Accordingly, the pressure fluctuation values and the acceleration values of the respective combustors 111-1 to 111-$m$ measured respectively by the pressure fluctuation measuring unit 5 and the acceleration measuring unit 6 are subjected to fast Fourier transformation to confirm frequency characteristics constituting the result of the frequency analysis, and then the pressure fluctuation values and the acceleration values are split into predetermined n pieces of the frequency bands. By analyzing the frequency oscillation in first to n-th frequency bands split into the n pieces in this way, maximum values Yij of the oscillation intensity respectively for the first to n-th frequency bands are confirmed. Here, in the maximum values Yij, i is a natural number enumerated as 1, 2, 3, . . . , m representing the combustors 111-1 to 111-$m$, while j is a natural number enumerated as 1, 2, 3, . . . , n representing the first to n-th frequency bands.

Specifically, if the result of the frequency analysis as shown in FIG. 5 is obtained when the pressure fluctuation values of the combustor 111 are provided by the pressure fluctuation measuring unit 5, for example, then it is possible to confirm that the oscillation is generated mainly in a range from 0 to 5000 Hz. Accordingly, the frequency range subject to the analysis is set in the range from 0 to 5000 Hz and is preset to be divided into n=100 frequency band search being the frequency band having the range of 50 Hz, namely, a first frequency band ranging from 0 to 50 Hz, a second frequency band ranging from 50 to 100 Hz, . . . , and a hundredth frequency band ranging from 4950 to 5000 Hz, for example. Then, the maximum values Y11 to Ym100 of the oscillation intensity in the first to hundredth frequency bands corresponding to the respective combustors 111-1 to 111-$m$ are detected. Meanwhile, the maximum values of the oscillation intensity in the respective frequency bands are confirmed by carrying out a similar process concerning the acceleration of the combustor 111 provided by the acceleration measuring unit 6. It is to be noted, however, that the frequency range is not limited only to an equal interval. Moreover, the upper limit of the frequency analysis is not always limited to 5000 Hz.

In this way, when the maximum values Y11 to Ymn of the oscillation intensity in the first to n-th frequency bands of the combustors 111-1 to 111-$m$ measured by the frequency analyzing unit 25 are confirmed, these maximum values Y11 to Ymn of the oscillation intensity are given to the state grasping unit 22. In this state grasping unit 22, when the process amounts inputted from the inputting unit 21, the fuel composition information measured and obtained by the fuel characteristic measuring unit 200, and the maximum values of the oscillation intensity attributable to the combustion oscillation confirmed by the frequency analyzing unit 25 are provided, the combustion states of the respective combustors 111-1 to 111-$m$ are confirmed in accordance with a flowchart of FIG. 7.

In this state grasping unit 22, firstly when the various information is inputted respectively from the inputting unit 21, the fuel characteristic measuring unit 200, and the frequency analyzing unit 25 (STEP 101), a judgment is made whether or not the combustion oscillation is in the state of immediately requiring adjustment by confirming the maximum values Y11 to Ymn of the oscillation intensity in the first to n-th frequency bands of the combustor oscillation of the combustors 111-1 to 111-$m$ (STEP 102).

At this time, thresholds Z11 to Zmn for executing the judgment for the necessity of adjustment are preset respectively for the first to n-th frequency bands of the respective combustors 111-1 to 111-$m$ on the basis of the combustors 111-1 to 111-$m$ and on structural aspects of surrounding equipment. Moreover, these thresholds Z11 to Zmn are determined, for example, depending on whether there are members or structures that resonate with the oscillation of the frequency, on how much intensity the present members or structures which are susceptible to damages can endure, and so forth.

Then, the judgment for the necessity of adjustment is executed by comparing these thresholds Z11 to Zmn with the maximum values Y11 to Ymn of the oscillation intensity. Specifically, the maximum value Yij of the oscillation intensity in the j-th frequency band of the combustor 111-$i$ is compared with the threshold Zij. When the maximum value Yij is confirmed to be larger than the threshold Zij, a judgment is made that the combustion oscillation in the j-th frequency band of the combustor 111-$i$ is large and adjustment is therefore needed. Alternatively, in STEP 102, it is also possible to compare with a threshold for judging whether or not there is a state of indication of the combustion oscillation, which is present but does not require immediate adjustment. Here, the state of the indication of the combustion oscillation or the state of presence of the combustion oscillation having the oscillation intensity that requires adjustment will be defined as a state of presence of an anomaly.

Then, when the judgment is made in STEP 102 that there is the presence of the anomaly in any of the frequency bands (Yes), the respective process amounts containing the maximum values Y11 to Ymn of the oscillation intensity and the fuel composition information are accumulated as a data log (STEP 103). Here, as the maximum values Y11 to Ymn of the oscillation intensity and the various process values are accumulated as described above, a data table for state check as shown in FIG. 8 is configured to store the maximum values Y11 to Ymn of the oscillation intensity and the various process values for every measured time T1, t2, and so forth, and this data table for state check is stored in the state grasping unit 22. In other words, in STEP 103, the maximum values Y11 to Ymn of the oscillation intensity confirmed in STEP 101 and the various process values are additionally accumulated in the data table for state check stored in the state grasping unit 22.

Meanwhile, valve openings of the bypass valves 118-1 to 118-$m$, the pilot ratios (the fuel ratios to be supplied to the pilot nozzles relative to the entire fuel supplied), and the maximum values of the oscillation intensity are stored in the data table for state check shown in FIG. 8 depending on the time t1, t2, and so on for the respective combustors 111-1 to 111-$m$, and the ambient temperature, the loads (MW) on the generator 21, the fuel calorie, and the volume ratio of the principal components of the fuel gas are stored therein. Specifically, at the time t1 and concerning the combustion 111-$i$, the valve opening of the bypass valve 118 is indicated as Xi1-1, the pilot ratio is indicated as Xi2-1, and the maximum values of the oscillation intensity in the first to n-th frequency bands are indicated as Yi1-1 to Yin-1. Moreover, the ambient temperature is indicated as Xx1-1, the load (MW) on the power generator is indicated as Xx2-1, the fuel calorie is indicated as Xy1-1, and the volume ratio of the principal components of the fuel gas is indicated as Xy2-1.

Similarly, at the time t2 and concerning the combustor 111-$i$, the valve opening of the bypass valve 118 is indicated as Xi1-2, the pilot ratio is indicated as Xi2-2, and the maximum values of the oscillation intensity in the first to n-th frequency bands are indicated as Yi1-2 to Yin-2. Moreover, the ambient temperature is indicated as Xx1-2, the load (MW) on the power generator is indicated as Xx2-2, the fuel calorie is indicated as Xy1-2, and the volume ratio of the principal components of the fuel gas is indicated as Xy2-2. At the time tn and concerning the combustor 111-$i$, the valve opening of the bypass valve 118 is indicated as Xi1-$n$, the pilot ratio is indicated as Xi2-$n$, and the maximum values of the oscillation intensity in the first to n-th frequency bands are indicated as Yi1-$n$ to Yin-n. Moreover, the ambient temperature is indicated as Xx1-$n$, the load (MW) on the power generator is indicated as Xx2-$n$, the fuel calorie is indicated as Xy1-$n$, and the volume ratio of the principal components of the fuel gas is indicated as Xy2-$n$.

As described above, after performing addition and updating of the data table for state check by use of the maximum values Y11 to Ymn of the oscillation intensity and the various process values in STEP 103, abnormal frequency designating information for indicating the frequency band of the combustor 111 judged to have the oscillation intensity larger than the threshold (showing the anomaly) as well as the fuel composition information is sent out to the countermeasure determining unit 23 (STEP 104). Specifically, when the maximum value Yij of the oscillation intensity becomes larger than the threshold Zij, the j-th frequency band of the oscillation of the combustor 111-$i$ is deemed to have the anomaly, and this information is contained in the abnormal frequency designating information and is sent out to the countermeasure determining unit 23 together with the fuel composition information. Moreover, a difference between the oscillation intensity and the threshold in the frequency band confirmed to have the anomaly is included in the abnormal frequency designating information. After sending the information out to the countermeasure determining unit 23 as described above, the operation is terminated in preparation for the next processing cycle.

Meanwhile, when the judgment is made in STEP 102 that no anomaly occurs in any of the frequency bands (No), various process information inputted from the inputting unit 21 and the fuel characteristic measuring unit 200 is compared with various process information in a previous session stored in the data table for state check to confirm presence or absence of a change in an operating state of the gas turbine 2 (STEP 105). Specifically, no change in the operating state of the gas turbine 2 is confirmed when there is only a small change in the various process information in the previous session while the change in the operating state of the gas turbine 2 is confirmed when there is a large change in the various process information in the previous session.

Moreover, when confirming the change in the operating state of the gas turbine 2 (Yes), the various process amounts including the maximum values Y11 to Ymn of the oscillation intensity and the fuel composition information are accumulated as the data log as similar to STEP 103, and after updating the data table for state check (STEP 106), the operation is terminated in preparation for the next processing cycle. At this time, the contents of adjustment executed in the previous processing cycle may also be added to the data table for state check. Meanwhile, when the judgment is made that there is no change in the operating state of the gas turbine 2 (No), the operation is terminated in preparation for the next processing cycle.

Figure 9:
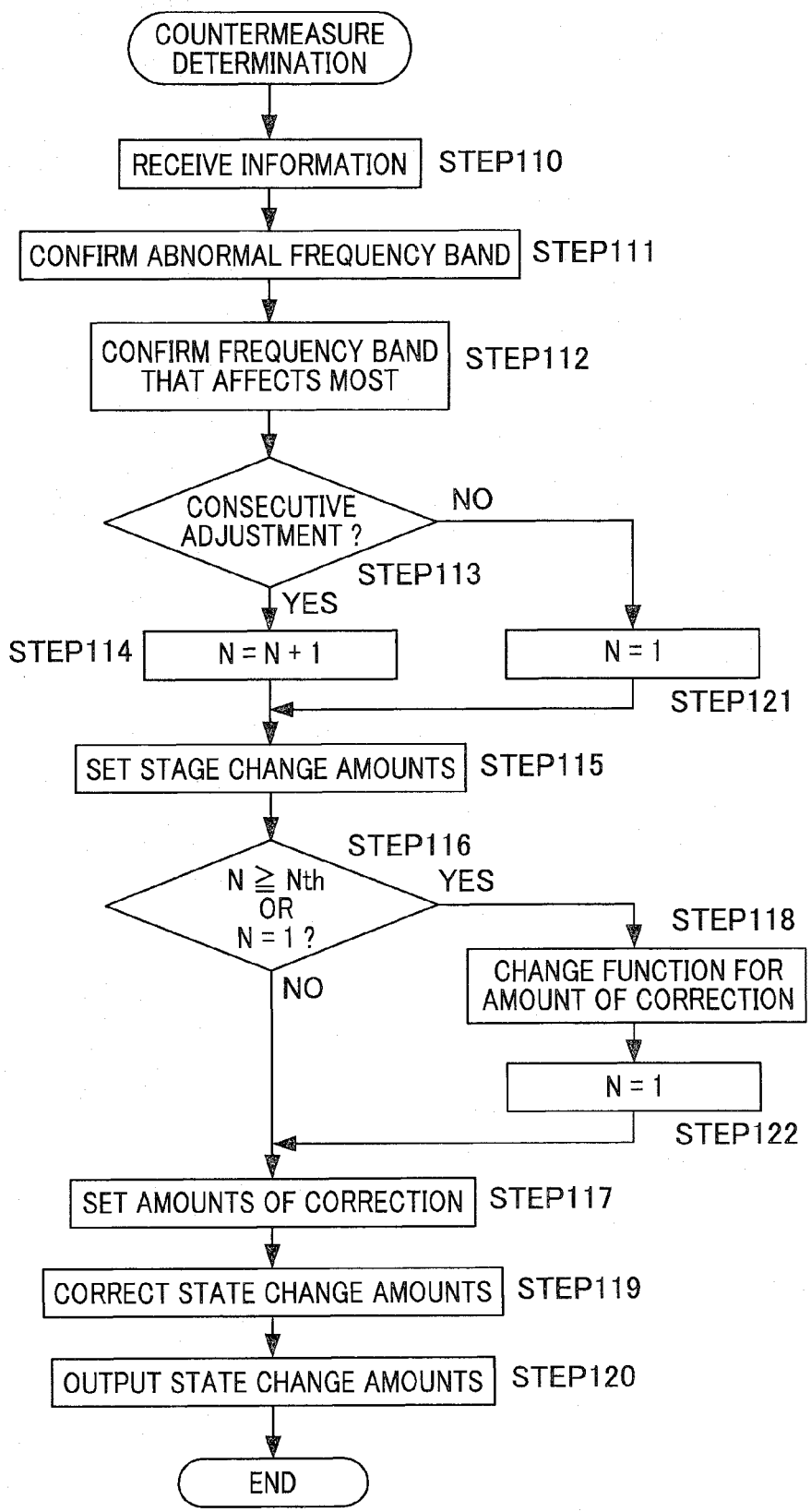
FIG. 9 is a flowchart showing operations of a countermeasure determining unit.

Furthermore, when the state grasping unit 22 executes the operation in STEP 104, the countermeasure determining unit 23 performs an operation in accordance with a flowchart in FIG. 9. When the countermeasure determining unit 23 receives the abnormal frequency designating information and the fuel composition information sent from the state grasping unit 22 (STEP 110), the frequency band for which the anomaly is confirmed by the abnormal frequency designating information is checked in terms of the respective combustors 111-1 to 111-$m$ in the first place (STEP 111). Then, the frequency band that affects most to the combustion oscillation by confirming the difference of the oscillation intensity in the frequency band, where the anomaly is confirmed, from the threshold for each of the combustors 111-1 to 111-$m$ (STEP 112).

Thereafter, a check is made as to whether or not the adjustment is instructed consecutively to the previous adjustment for the gas turbine 2 (STEP 113). At this time, when the check is made that the state grasping unit 22 consecutively instructs the adjustment of the gas turbine 2 (Yes), the number of adjustment N for the gas turbine 2 is incremented by 1 (STEP 114). Here, this number of adjustment N is the number configured to have an initial value of 1 and to be incremented by 1 when there are consecutive processing cycles for adjusting the gas turbine 2.

Then, if the adjustment for the gas turbine 2 is not consecutively instructed in STEP 113 (No), the number of adjustment N is set equal to 1 in STEP 121. When the number of adjustment N is set equal to 1 or when the number of adjustment N is incremented in STEP 114, the most effective countermeasures for the aspects of the combustion oscillation that respectively occur in the current combustors 111-1 to 111-$m$ are determined based on the frequency bands confirmed for the respective combustors 111-1 to 111-$m$ in STEP 111 with reference to a data table for countermeasures that stores countermeasures having priorities in the respective frequency bands (STEP 115). This data table for countermeasures stores information as shown in FIG. 10, for example, and this information indicates effective countermeasures for the aspects of the combustion oscillation which are set up based on experiences of personnel having expertise in the adjustment.

Meanwhile, according to the data table for countermeasures in FIG. 10, when the oscillation in the first frequency is confirmed to have the largest influence to the combustion oscillation, a countermeasure to reduce the air flow rate to the combustor 111 by opening the bypass valve 118 has a first priority while a counter measure to increase the fuel flow rate to be supplied to the pilot nozzle of the combustor 111 has a second priority. Similarly, when the oscillation in the n-th frequency is confirmed to have the largest influence to the combustion oscillation, a countermeasure to reduce the fuel flowrate to be supplied to the pilot nozzle of the combustor 111 has a priority.

As described above, when setting the effective countermeasures in response to the state of the combustion oscillation, the countermeasure having the second highest priority is determined upon check that it is impossible to carry out the countermeasure having the highest priority. Specifically, when the anomaly in the first frequency band is confirmed, the countermeasure to open the opening of the bypass valve 118 which has the highest priority is determined in the first place. Meanwhile, in this case, if the opening of the bypass valve 118 is already in the full-open state and it is therefore impossible to carry out the countermeasure, which has the highest priority, to open the opening of the bypass valve 118, the countermeasure having the second highest priority to change the pilot ratio is determined. When determining the most effective countermeasure as described above, state change amounts of the respective units of the gas turbine 2, which are instructed by the countermeasure, are set to predetermined constant values. Accordingly, if the countermeasure to open the opening of the bypass valve 118 upon check of the anomaly in the first frequency band, the opening to open the bypass valve 118 is set to a predetermined opening.

When the countermeasure is determined in this STEP 115, a check is made as to whether or not the number of adjustment N is equal to 1, or whether or not the number exceeds a predetermined number Nth (STEP 116). At this time, upon check that the number of adjustment N is not equal to 1 or that the number of adjustment N does not exceed the predetermined number Nth (No), amounts of correction corresponding to the fuel composition information (the fuel calorie and the volume ratio of the principal components of the fuel gas) provided by the fuel characteristic measuring unit 200 are set up based on a preset correction amount function (STEP 117). Here, this correction amount function is composed of a relational expression representing the amount of correction to be determined relative to the fuel composition information.

This is attributed to the fact that, when using a relation between the oscillation intensity in the first frequency band of the pressure fluctuation amount of the combustor 111 and the volume ratio of methane (the methane concentration) contained in the fuel gas as an example, the combustion oscillation is influenced by variation in the fuel composition as the oscillation intensity in the first frequency band tends to be increased by an increase in the methane concentration as shown in FIG. 11. Accordingly, when an action to open the opening of the bypass valve 118 is set up as the countermeasure in STEP 115, for example, the amount of correction concerning the opening of the bypass valve 118 relative to the methane concentration is set up based on the relational expression as indicated with a solid line in FIG. 12. Specifically, when the methane concentration becomes higher than x1% determined as a standard concentration, the amount of correction corresponding to the opening of the bypass valve 118 is set equal to 0 up to x2% where the influence to the combustion oscillation is small. Then, if the methane concentration exceeds x2%, the amount of correction is increased. Here, the amount of correction relative to the methane concentration is changed such that a rate of increase in the amount of correction becomes larger if the methane concentration is equal to or above x3% which is larger than x2%.

Meanwhile, if the number of adjustment N is confirmed to be equal to 1 or, equal to or above the predetermined number Nth in STEP 116 (Yes), the preset relational expression using the correction amount function is modified with another relational expression (STEP 118). Specifically, in the case where the amount of correction concerning the opening of the bypass valve 118 relative to the methane concentration is set up, for example, if the correction amount function is set up by the relational expression indicated with the solid line in FIG. 12, the relational expression is modified in this STEP 118 so as to set up the correction amount function by use of a relational expression indicated with a dotted line in FIG. 12. In other words, the correction amount function is modified such that the rate of change in the amount of correction relative to the methane concentration becomes larger where the methane concentration is equal to or above x2% and equal to or below x3% and that the rate of change in the amount of correction relative to the methane concentration becomes smaller where the methane concentration exceeds x3%.

In this way, when the relational expression for setting up the amount of correction is modified based on the fuel composition information in STEP 118, the operation goes to STEP 117 after setting the number of adjustment equal to 1 in STEP 122, whereby the amount of correction based on the fuel composition information is set up. When the amount of correction is set up in STEP 117 as described above, the state change amounts of the respective units of the gas turbine 2 are corrected in accordance with the amounts of correction as instructed by the countermeasure which is set up in STEP 115 (STEP 119). At this time, when setting the amounts of correction having the relation as shown in FIG. 12, the state change amounts are corrected by adding the amounts of correction thus set up to the state change amounts. The state change amounts thus obtained are outputted to the control unit 10 through the outputting unit 24 (STEP 120).

Here, when operating as described above, the amounts of correction to be set up in STEP 117 may be set equal to 1 in the ranges where it is not necessary to correct the state change amounts of the respective units of the gas turbine 2 while changing the amounts of correction in response to the fuel composition information in other ranges. At this time, when the state change amounts of the respective units of the gas turbine 2 are corrected in STEP 119, the state change amounts are corrected by multiplying the state change amounts set up in STEP 115 by the amounts of correction.

Meanwhile, in the case where the maximum values of the oscillation intensity exceed the thresholds in multiple frequency bands of the combustion oscillation, it is also possible to confirm the frequency bands most affecting the combustion oscillation by confirming the differences from the thresholds for the oscillation intensity in the frequency bands where the anomalies are confirmed as similar to the operation in the above-described STEP 112.

Moreover, instead of the judgment based on the differences from the thresholds for the oscillation intensity in the frequency bands where the anomalies are confirmed, it is also possible to preset priorities among the respective frequency bands so as to define which frequency band is to be selected preferentially as the frequency band having the influence and to confirm the frequency band most affecting the combustion oscillation based on these priorities. At this time, the lowest frequency band is set to the highest priority. Moreover, on the contrary to the lowest frequency band, the frequency bands on the high-frequency side are sequentially set to high priorities. This is because flame in the gas turbine 2 is highly likely to be extinguished when the combustion oscillation occurs in the lowest frequency band while energy attributable to the combustion oscillation is large in the high frequency bands and has a large impact to cause damages and the like.

Meanwhile, when the countermeasure to take priority is determined in each of the frequency bands in STEP 115, it is also possible to determine the countermeasure having the second highest priority if the combustion oscillation does not disappear after performing the countermeasure having the highest priority continuously for a predetermined number of times of the processing cycles. Similarly, when the priorities are set to each of the frequency bands, it is also possible to determine the countermeasure having the second highest priority if the combustion oscillation does not disappear after performing the countermeasure corresponding to the same frequency band continuously for a predetermined number of times of the processing cycles.

Second Embodiment

A second embodiment of the present invention will be described with reference to the accompanying drawings. FIG.

13 is a block diagram showing an internal configuration of an automatic adjusting unit used in a gas turbine system of this embodiment. In the configuration of the automatic adjusting unit in FIG. 13, constituents used for the same purposes as the configuration of the automatic adjusting unit in FIG. 3 will be designated by the same reference numerals and detailed description thereof will be omitted.

Figure 13:
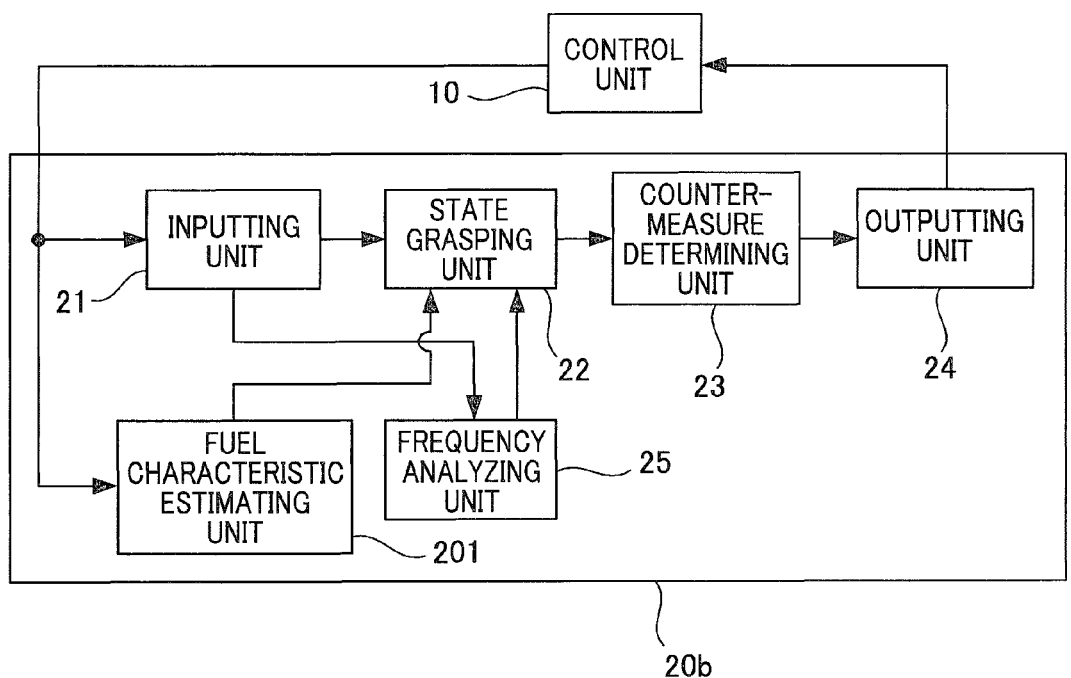
FIG. 13 is a block diagram showing a configuration of an automatic adjusting unit in a gas turbine system of a second embodiment.

Unlike the automatic adjusting unit 20a shown in FIG. 3, an automatic adjusting unit 20b shown in FIG. 13 (which corresponds to the automatic adjusting unit 20 in FIG. 1) includes a fuel characteristic estimating unit 201 for estimating the fuel composition by use of the process amounts to be inputted from the process amount measuring unit 4 of the gas turbine 2 through the inputting unit 21 instead of installing the fuel characteristic measuring unit 200 in the gas turbine 2. Specifically, in the gas turbine system 1 of this embodiment, the gas turbine 2 is not provided with the fuel characteristic measuring unit 200 for measuring the fuel composition of the fuel gas to be supplied to the combustor 111 but is configured to use the fuel characteristic estimating unit 201 for estimating the fuel composition on the basis of other process amounts measured by the process amount measuring unit 4 except for the fuel characteristic measuring unit 200.

In the automatic adjusting unit 20b having the above-described configuration, the process amounts inputted to the inputting unit 21 are sent out to the fuel characteristic estimating unit 201 which is provided instead of the fuel characteristic measuring unit 200 in the automatic adjusting unit 20a in FIG. 3, and the fuel composition information obtained by this fuel characteristic estimating unit 201 are sent out to the state grasping unit 22. Then, for the rest of operations to be performed by the fuel characteristic estimating unit 201, this automatic adjusting unit 20b performs the same operations as those in the automatic adjusting unit 20a.

Accordingly, in the state grasping unit 22, the combustion oscillation in the first to n-th frequency bands of the respective combustors 111-1 to 111-m are analyzed as similar to the first embodiment and the abnormal frequency designating information indicating the frequency band having the anomaly is outputted. Then, as similar to the first embodiment, the countermeasure determining unit 23 sets up the state change amounts of the respective units of the gas turbine 2 by adding the amounts of correction derived from the fuel composition information on the basis of the abnormal frequency designating information sent out from the state grasping unit 22 and on the fuel composition information, and outputs the state change amounts to the control unit 10 through the outputting unit 24.

Figure 14:
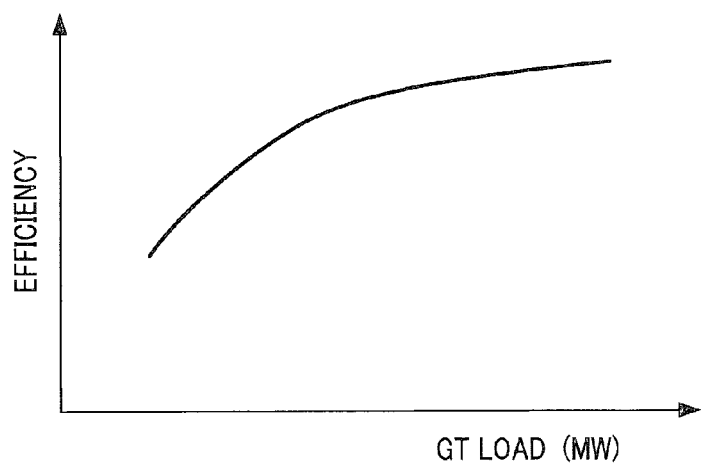
FIG. 14 is a diagram showing an example of a relation between efficiency of a gas turbine and a load.

At this time, power generator output (MW) Lgt and a fuel gas flow rate Qf to be supplied to the combustor 111 are given by the process amount measuring unit 4 to the fuel characteristic estimating unit 201 through the inputting unit 21. Meanwhile, a relation between the power generator output Lgt and power generation efficiency q as shown in FIG. 14, which is confirmed by setting the fuel gas flow rate Qf and the fuel calorie of the fuel gas to constant reference values, is stored in the fuel characteristic estimating unit 201 in the form of either a data table or a function. Moreover, a function applying the power generator output Lgt, the power generation efficiency η, the fuel gas flow rate Qf, and the fuel calorie H is expressed as the following formula (1):

$$Lgt \times 1000 = \eta \times H \times Qf/3600 \qquad (1)$$

Then, this fuel characteristic estimating unit 201 finds the power generation efficiency $\eta(Lgt)$ on the basis of the power generator output Lgt, which is inputted from the process amount measuring unit 4 through the inputting unit 21, by making reference to the relation between the power generator output Lgt and the power generation efficiency η as shown in FIG. 14. Further, the fuel calorie H is found by substituting the power generator output Lgt, the power generation efficiency η, and the fuel gas flow rate Qf inputted from the process amount measuring unit 4 through the inputting unit 21 into the following formula (2), which is given to the state grasping unit 22 as the fuel composition information:

$$H = (Lgt \times 1000 \times 3600)/(\eta(Lgt) \times Qf) \qquad (2)$$

In this way, although the fuel calorie is found by the fuel characteristic estimating unit 201 as the fuel composition information, it is also possible to find the volume ratio of the principal components of the fuel gas similarly as the fuel composition information on the basis of the process amounts to be inputted from the process amount measuring unit 4. Moreover, when the fuel composition information such as the fuel calorie or the volume ratio of the principal components of the fuel gas found by this fuel characteristic estimating unit 201 is given to the state grasping unit 22, the combustion oscillation of the gas turbine 2 is analyzed by making reference together with the result of the frequency analysis by the frequency analyzing unit 25 which is provided similarly.

Third Embodiment

Figure 15:
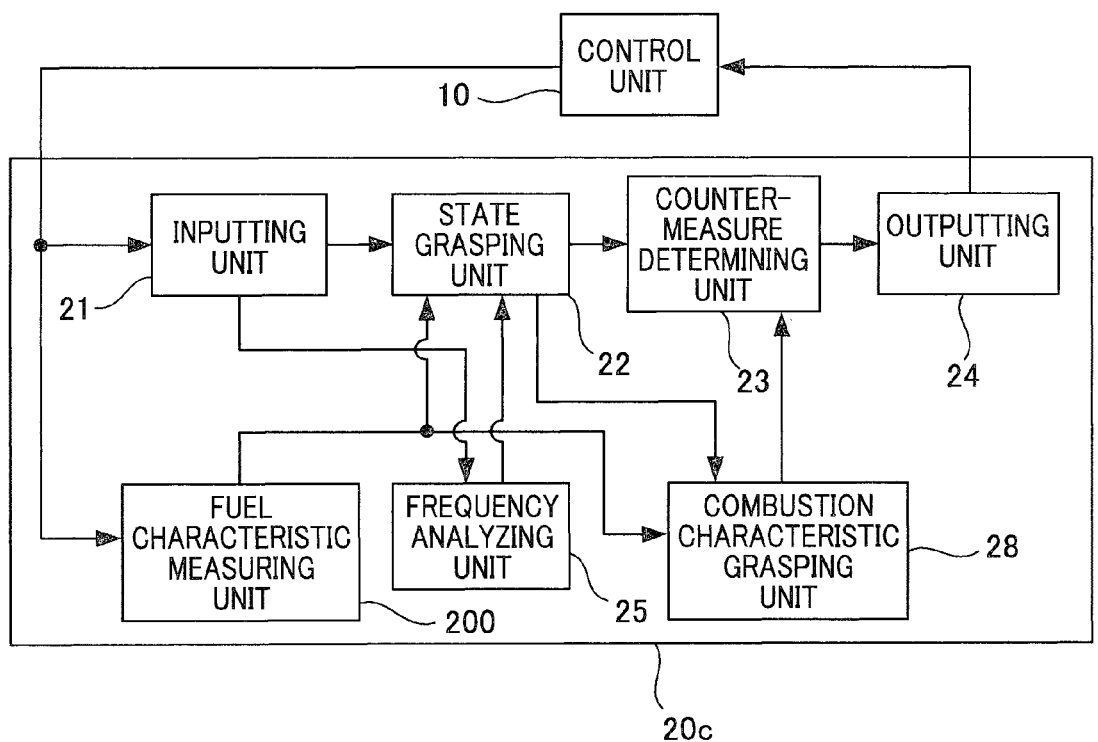
FIG. 15 is a block diagram showing a configuration of an automatic adjusting unit in a gas turbine system of a third embodiment.

A third embodiment of the present invention will be described with reference to the accompanying drawings. FIG. 15 is a block diagram showing an internal configuration of an automatic adjusting unit used in a gas turbine system of this embodiment. In the configuration of the automatic adjusting unit in FIG. 15, constituents used for the same purposes as the configuration of the automatic adjusting unit in FIG. 3 will be designated by the same reference numerals and detailed description thereof will be omitted.

An automatic adjusting unit 20c shown in FIG. 15 (which corresponds to the automatic adjusting unit 20 in FIG. 1) has a configuration obtained by adding a combustion characteristic grasping unit 28 for constructing a mathematical model, which is formed by modeling combustion characteristics based on results of the analyses of the combustion oscillation for the respective frequency bands accumulated in the data table for state check stored in the state grasping unit 22, and combustion characteristics based on the process amounts in the gas turbine 2 to the configuration of the automatic adjusting unit 20a shown in FIG. 3. Specifically, in this embodiment, the maximum values Y11 to Ymn of the oscillation intensity accumulated in the state grasping unit 22 concerning the respective combustors 111 depending on the time and the various process amounts are given to the combustion characteristic grasping unit 28. Then, when the countermeasure determining unit 23 sets up the state change amounts corresponding to the respective units of the gas turbine 2 in accordance with the constructed mathematical model, the state change amounts thus set up are outputted from the outputting unit 24 to the control unit 10.

When the automatic adjusting unit 20c is operated as described above, the inputting unit 21, the state grasping unit 22, and the fuel characteristic measuring unit 200 perform similar operations to the automatic adjusting unit 20a of the first embodiment. Accordingly, the countermeasure determining unit 23 having different operation from that in the automatic adjusting unit 20a and the combustion characteristic grasping unit 28 newly added to the configuration will be respectively described below in light of the operations thereof. Here, basic functions of the combustion characteristic grasping unit 28 are also disclosed in Japanese Patent Application Laid-open Publication No. 2002-47945 filed by the applicant of this application.

First, in the combustion characteristic grasping unit 28, the maximum value Yij of the oscillation intensity of the pressure oscillation in the j-th frequency band of the combustor 111-$i$ is assumed to be modeled by use of a multiple regression model as shown in the following formula (3), for example:

$$Yij = aij\text{-}0 + aij\text{-}1 \times Xi1 + aij\text{-}2 \times Xi2 + aij\text{-}3 \times Xx1 + aij\text{-}4 \times Xx2 + aij\text{-}5 \times Xy1 + aij\text{-}6 \times Xy2 \quad (3)$$

Here,

Xi1: the value of the operation amount 1 (the valve opening of the bypass valve 118-$i$ in this example);

Xi2: the value of the operation amount 2 (the pilot ratio in this example);

Xx1: the value of the inoperable state amount 1 (the ambient temperature in this example);

Xx2: the value of the inoperable state amount 2 (the load (MW) of power generator in this example);

Xy1: the value of the fuel composition information 1 (the fuel calorie in this example);

Xy2: the value of the fuel composition information 2 (the volume ratio of principal components of the fuel gas in this example); and aij-0 to aij-6: coefficient parameters.

At this time, in order to model the combustion characteristic in the j-th frequency band of the combustor 111-$i$, the maximum values Yij of the oscillation intensity and the various process amounts Xi1, Xi2, Xx1, Xx2, Xy1, and Xy2, which are stored for the respective time t1, t2, and so on in the data table for state check as shown in FIG. 8, for example, are firstly given from the state grasping unit 22 to the combustion characteristic grasping unit 28. Specifically, the maximum value Yij-1 of the oscillation intensity and the various process amounts Xi1-1, Xi2-1, Xx1-1, Xx2-1, Xy1-1, and Xy2-1 measured at the time t1, the maximum value Yij-2 of the oscillation intensity and the various process amounts Xi1-2, Xi2-2, Xx1-2, Xx2-2, Xy1-2, and Xy2-2 measured at the time t2, . . . , and the maximum value Yij-n of the oscillation intensity and the various process amounts Xi1-$n$, Xi2-$n$, Xx1-$n$, Xx2-$n$, Xy1-$n$, and Xy2-$n$ measured at the time tn are respectively given to the combustion characteristic grasping unit 28 in order to model the combustion characteristic in the j-th frequency band of the combustor 111-$i$.

In this way, when the maximum values Yij of the oscillation intensity and the various process amounts Xi1, Xi2, Xx1, Xx2, Xy1, and Xy2, which are stored for the respective time t1, t2, and soon are provided, the coefficient parameters aij-0 to aij-6 in the model formula such as the formula (3) in the j-th frequency band of the combustor 111-$i$ are obtained based on the maximum values Yij of the oscillation intensity and the various process amounts Xi1, Xi2, Xx1, Xx2, Xy1, and Xy2 thus provided. The least squares method is used as a solution of the coefficient parameters aij-0 to aij-6, for example.

It is to be noted that, for the convenience of explanation, the model formula is described above by using two variables for the operation amounts and four variables for the inoperable state amounts including the fuel composition information. However, the quantities of the variables are not limited only to the foregoing. Moreover, although the model structure is described as a liner primary expression, it is also possible to apply a second or higher order model or a non-linear model such as a neutral network. Moreover, although the model formula is described herein by using the various process amounts to be inputted from the gas turbine 2, it is also possible to apply values converted based on the mass balance principle or calculated values such as a fuel-air ratio, an air flow velocity or a combustion velocity.

When the coefficient parameters aij-0 to aij-6 in the model formula for the combustion characteristic in the j-th frequency band of the combustor 111-$i$ are obtained as described above, a region which is apt to cause the combustion oscillation in a n-th dimensional space defined by the operation amounts of n pieces of variables is subsequently obtained by use of this model formula. At this time, the region which is apt to cause the combustion oscillation is firstly confirmed while defining the thresholds Z11 to Zmn for judging the necessity of adjustment as values indicating the largest allowable oscillation intensity in the combustion oscillation. Moreover, only the process amounts Xi1 and Xi2 constituting the operation amounts are defined as the variables while recent values confirmed with the data table for state check are given to the process values Xx1, Xx2, Xy1, and Xy2 that constitute the inoperable state amounts. Specifically, the process values Xx1, Xx2, Xy1, and Xy2 are set to constant numbers by substitution of the measured values in the current processing cycle.

In other words, in the model formula for the combustion characteristic in the j-th frequency band of the combustor 111-$i$ expressed as the formula (3) and set up with the coefficient parameters aij-0 to aij-6, the process amounts Xi1 and Xi2 are defined as the variables. Accordingly, the following formula (4) representing a relation between the process amounts Xi1 and Xi2 is generated by setting the process amounts Xx1, Xx2, Xy1, and Xy2 to the constant numbers based on the measured value in the current processing cycle and substituting the threshold Zij for the maximum value Yij of the oscillation intensity:

$$Zij = aij\text{-}0 + aij\text{-}1 \times Xi1 + aij\text{-}2 \times Xi2 + aij\text{-}3 \times Xx1 + aij\text{-}4 \times Xx2 + aij\text{-}5 \times Xy1 + aij\text{-}6 \times Xy2 \quad (4)$$

Figure 16:
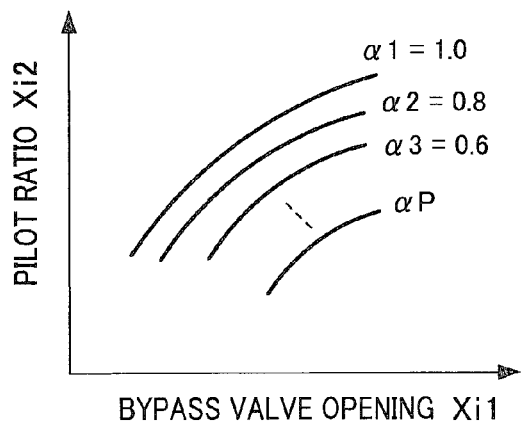
FIG. 16 is a diagram showing a principle concerning an estimation method for a combustion oscillation region.

Further, p pieces of functions expressing the relations between the process amounts Xi1 and Xi2 in response to degrees of the combustion oscillation can be obtained by finding the following formula (5) in which values calculated by multiplying Zij by gains $\alpha k$ (k=1, 2, . . . , p) ($0 \leq \alpha k \leq 1$) for setting the degrees of the combustion oscillation are substituted for Zij. Here, an example of the relations between the process amounts Xi1 and Xi2 expressed by p pieces of the functions is shown in FIG. 16. In this FIG. 16, if the coefficient parameter aij-2 is positive, then an upper side of a straight line expressed by the obtained function indicates the region which is apt to cause the combustion oscillation and a lower side of the straight line indicates the region which is unlikely to cause the combustion oscillation. On the contrary, if the coefficient parameter aij-2 is negative, then a lower side of a straight line expressed by the obtained function indicates the region which is apt to cause the combustion oscillation and an upper side of the straight line indicates the region which is unlikely to cause the combustion oscillation.

$$\alpha k \times Zij = aij\text{-}0 + aij\text{-}1 \times Xi1 + aij\text{-}2 \times Xi2 + aij\text{-}3 \times Xx1 + aij\text{-}4 \times Xx2 + aij\text{-}5 \times Xy1 + aij\text{-}6 \times Xy2 \quad (5)$$

In this way, when the combustion characteristic grasping unit 28 obtains the relations between the two variables constituting the operation amounts relative to the p pieces of the thresholds respectively applicable to the first to n-th frequency bands of the combustion oscillation in terms of the respective combustors 111-1 to 111-$m$, the regions which are apt to cause the combustion oscillation and the regions which are unlikely to cause the combustion oscillation are ultimately obtained based on linear programming. Specifically, when the relations between the operation amounts Xi1 and Xi2 relative to the thresholds $\alpha1 \times Zij$, $\alpha2 \times Zij$, ..., and $\alpha p \times Zij$ are obtained respectively in terms of the first to n-th frequency bands of the combustion oscillation of the combustor 111-$i$, the regions which are apt to cause the combustion oscillation and the regions which are unlikely to cause the combustion oscillation are obtained based on p pieces of the relations of the operation amounts Xi1 and Xi2 obtained for each of the first to n-th frequency bands.

Figure 17:
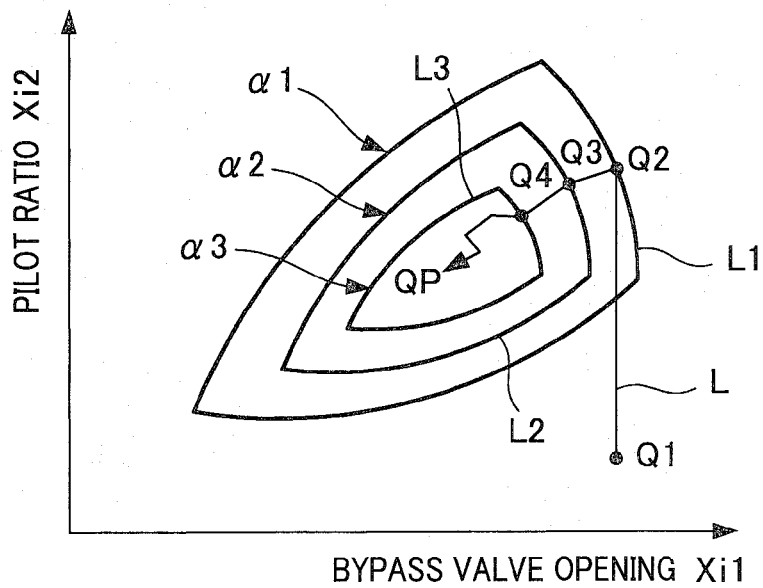
FIG. 17 is a diagram showing an example of estimation of the combustion oscillation region.

Meanwhile, an example of the regions of the combustion oscillation applying Xi1 to the lateral axis and Xi2 to the longitudinal axis obtained as described above by the combustion characteristic grasping unit 28 is shown in FIG. 17. In this example in FIG. 17, regarding combustion oscillation regions, lines based on the relational formulae obtained for the respective gains $\alpha k$ are expressed like contour lines, in which central portions represent the regions which are unlikely to cause the combustion oscillation while surrounding portions represent the regions which are more apt to cause the combustion oscillation as they are located more distant from the central portions. Although the example in FIG. 17 is illustrated in two-dimensional coordinates because of using the two variables for the operation amounts for the convenience of explanation as described previously, the example will be illustrated in N-dimensional coordinate space when N pieces of variables are used for the operation amounts. Moreover, in the example in FIG. 17, the gain $\alpha 1$ is set equal to 1.0, the gain $\alpha 2$ is set equal to 0.8, and the gain $\alpha 3$ is set equal to 0.6.

In this way, when the regions of the combustion oscillation (such as the regions illustrated in FIG. 17) are obtained for the respective combustors 111-1 to 111-$m$, combustion oscillation region information indicating the regions of the combustion oscillation respectively corresponding to the combustors 111-1 to 111-$m$ is given to the countermeasure determining unit 23. Then, this countermeasure determining unit 23 is operated as hereinunder described to set up the state change amounts of the respective units of the gas turbine 2 similarly to the first embodiment. Next, operations of this countermeasure determining unit 23 will be described below.

The countermeasure determining unit 23 provided with the combustion oscillation region information confirms whether or not the maximum values Y11 to Ymn of the oscillation intensity respectively in the first to n-th frequency bands in the combustion oscillation measured for the respective combustors 111-1 to 111-$m$ by the state grasping unit 22 exceed the thresholds Z11 to Zmn as similar to the first embodiment. When the necessity of adjustment for the combustion oscillation is judged, the countermeasure determining unit 23 determines a direction for adjusting the operating state of the combustor 111, which is judged to require adjustment of the combustion oscillation, by use of an optimization method.

Specifically, when the state grasping unit 22 judges that it is necessary to adjust the combustion oscillation for the combustor 111-$i$, the countermeasure determining unit 23 makes reference to the combustion oscillation region information provided by the combustion characteristic grasping unit 28 and determines the direction for adjusting the current operating state of the gas turbine 2 by the optimization method so as to suppress the combustion oscillation of the combustor 111-$i$. In the following, an example of applying a steepest descent method to the optimization method will be described. Note that this optimization method will not be limited only to the steepest descent method and it is also possible to apply one utilizing a conjugate method, a genetic algorithm or the like.

At this time, regarding the combustor 111-$i$, the countermeasure determining unit 23 confirms a coordinate position Q1 indicating the current operating state (Xi1=xa, Xi2=xb) of the gas turbine 2 in the two-dimensional coordinates that apply the operation amounts Xi1 and Xi2 as shown in FIG. 17. This coordinate position Q1 indicating the current operating state is the coordinate position outside the region surrounded by the gain $\alpha 1$. Accordingly, the current operating state of the gas turbine 2 is confirmed to be located in the region having the combustion oscillation. Then, an operating state after adjustment is determined by use of the steep descent method. At this time, in FIG. 17, the coordinate position Q1 is located outside a line L1 based on a relational formula which is obtained by applying the gain $\alpha 1$ to the first to n-th frequency bands.

Consequently, a phantom line L is drawn from the coordinate position Q1 perpendicularly to the line L1 according to the gain $\alpha 1$, and the phantom line L is extended so as to cross the region surrounded by the line L1 according to the gain $\alpha 1$. At this time, in the case of FIG. 17, since the phantom line L does not intersect a line L2 according to the gain $\alpha 2$ located inside the region of the line L1 according to the gain $\alpha 1$, the phantom line L is further extended to a coordinate position Q2 (Xi1=xc, Xi2=xd) that crosses the line L1 according to the gain $\alpha 1$.

Next, the phantom line L is drawn from this coordinate position Q2 perpendicularly to the line L2 according to the gain $\alpha 2$ and the phantom line L is further extended so as to cross the inside of the region surrounded by the line L2 according to the gain $\alpha 2$. At this time, in the case of FIG. 17, since the phantom line L intersects a line L3 according to the gain $\alpha 3$ located inside the region of the line L2 according to the gain $\alpha 2$, the phantom line L is drawn from a coordinate position Q3 (Xi1=xe, Xi2=xf) constituting an intersection of this line L3 and the phantom line L perpendicularly to a line L4 (not shown) according to the gain $\alpha 4$ located inside the region of the line L3 according to the gain $\alpha 3$.

Thereafter, when a coordinate position Qp (Xi1=xg, Xi2=xh) constituting an intersection of a line Lp according to the gain $\alpha p$ and the phantom line L is confirmed by continuously performing similar operations, the operation amounts Xi1 and the Xi2 of the gas turbine 2 are determined as the values xg and xh which are set up by this coordinate position Qp. The operation amounts Xi1 and Xi2 (the valve opening Xi1 of the bypass valve 118-$i$ and the pilot ratio Xi2) determined in terms of the combustor 111-$i$ as described above are outputted to the control unit 10 through the outputting unit 24 as the state change amounts corresponding to the respective units of the gas turbine 2, thereby modifying the operating state so as to suppress the combustion oscillation of the combustor 118-$i$ of the gas turbine 2.

When the countermeasure determining unit 23 and the combustion characteristic grasping unit 28 are operated as described above, if the combustion characteristic grasping unit 28 cannot grasp the combustion characteristic sufficiently, the countermeasure determining unit 23 can set up the state change amounts corresponding to the respective units of the gas turbine 2 by determining the direction for adjustment based on the information correlating the adjustment carried out in the past and a change in the operating state of the gas turbine 2 caused by carrying out the adjustment.

Moreover, in the case where the data table for state check stored in the state grasping unit 22 does not accumulate sufficient data at a point immediately after installing the gas turbine 2, for example, the combustion characteristic grasping unit 28 confirms the combustion characteristics of the respective combustors 111 on the basis of mathematical models indicating combustion characteristics which are obtained by analyses using data collected with other gas turbines 2 of the same type or on the basis of limit information for operating the gas turbine 2. At this time, the countermeasure determining unit 23 can set up the state change amounts corresponding to the respective units of the gas turbine 2 by determining the direction for adjustment using the combustion characteristics and on the basis of empirical information which correlates "aspects" set up based on experiences of personnel having expertise in the adjustment with effective "countermeasures" corresponding to the "aspects". Here, the limit information includes a limit value of the fuel-air ratio for avoiding occurrence of an accident fire or a flashback, for example.

Figure 18:
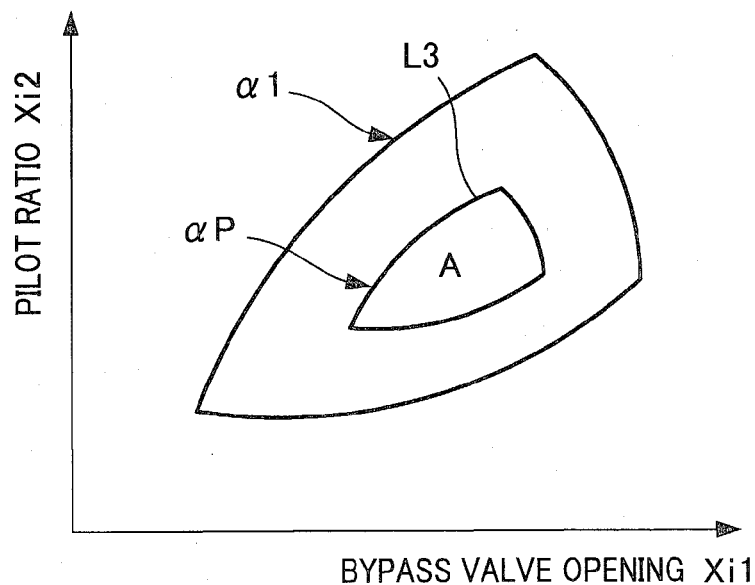
FIG. 18 is a diagram showing an example of estimation of the combustion oscillation region.

Alternatively, in terms of the respective combustors 111-1 to **111-*m*, it is also possible to make reference to the provided combustion oscillation region information, to confirm whether or not the current operating state of the gas turbine 2 is located in the region without the combustion oscillation by use of a relation with the current operating state, and to judge whether or not the operating state of the gas turbine 2 should be adjusted. At this time, when a region surrounded by a line Lp based on the relational formula obtained by setting the gain αp relative to the first to n-th frequency bands concerning the combustor 111-*i* is formed as a region A in FIG. 18, a judgment is made that it is not necessary to adjust the operating state of the gas turbine 2 if the operation amounts $Xi1$ and $Xi2$ indicating the operating state of the gas turbine 2 are located inside this region A. Meanwhile, it is also possible to obtain the change amounts to be adjusted by obtaining an ultimate region where it is unlikely that the gas turbine causes the combustion oscillation on the basis of linear programming of the combustion oscillation region information provided in terms of the respective combustors 111-1 to 111-*m***.

Second Example of Configuration of Gas Turbine

Figure 19:
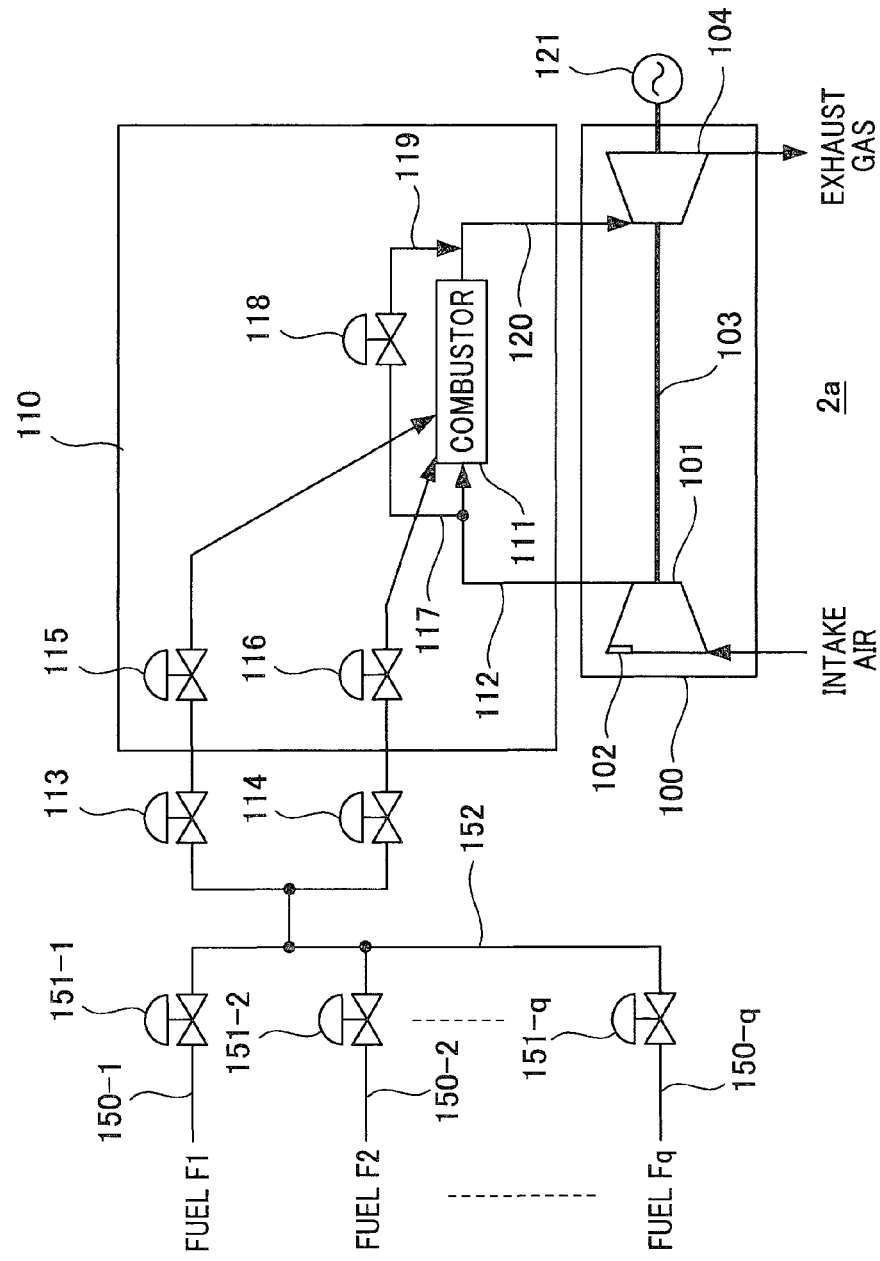
FIG. 19 is a block diagram showing another configuration example of the gas turbine in the gas turbine system in FIG. 1.

A second example of the configuration of the gas turbine in the gas turbine system in FIG. 1 will be described with reference to the accompanying drawing. FIG. 19 is a block diagram showing the configuration of the gas turbine in the gas turbine system in FIG. 1. Here, in the configuration of the gas turbine in FIG. 19, constituents used for the same purposes as the configuration of the gas turbine in FIG. 2 will be designated by the same reference numerals and detailed description thereof will be omitted.

A gas turbine **2*a* shown in FIG. 19 (which corresponds to the gas turbine 2 in FIG. 2) has a configuration to add fuel supply tubes 150-1, 150-2, . . . , and 150-*q* connected to fuel tanks (not shown) respectively storing fuel gases F1, F2, . . . , and Fq having different fuel compositions, fuel flow rate control valves 151-1, 151-2, . . . , and 151-*q* for determining respective flow rates of the fuel gases F1, F2, . . . , and Fq to be supplied from the respective fuel supply tubes 150-1, 150-2, . . . , and 150-*q*, and a fuel mixing tube 152 for mixing the fuels F1 to Fq supplied from the fuel supply tubes 150-1 to 150-*q*, to the configuration of the gas turbine 2 shown in FIG. 2**.

Specifically, the fuel flow rates of the fuel gases Fx to be supplied from the fuel supply tubes **150-*x* (x=1, 2, . . . , q) are set by openings of the fuel flow rate control valves 151-*x*. Then, the fuel gases F1 to Fq having the flow rates set up by the respective fuel flow rate control valves 151- to 151-*q* are mixed in the fuel mixing tube 152 and supplied to the main fuel flow rate control valve 113 and the pilot fuel flow rate control valve 114. Consequently, it is possible to change the fuel compositions of the fuel gases to be given to the main nozzles and the pilot nozzles in the respective combustors 111-1 to 111-*m* by means of flow ratios among the fuel gases F1 to Fq set up by the openings of the respective fuel flow rate control valves 151-1 to 151-*q***.

In this second example of the configuration of the gas turbine, the configuration of the gas turbine control unit 3 except for the automatic adjusting unit 20 constitutes the configuration common to the following fourth to sixth embodiments. In each of the fourth to sixth embodiments in the following, the automatic adjusting unit 20 having a different configuration will be mainly explained.

Fourth Embodiment

Figure 20:
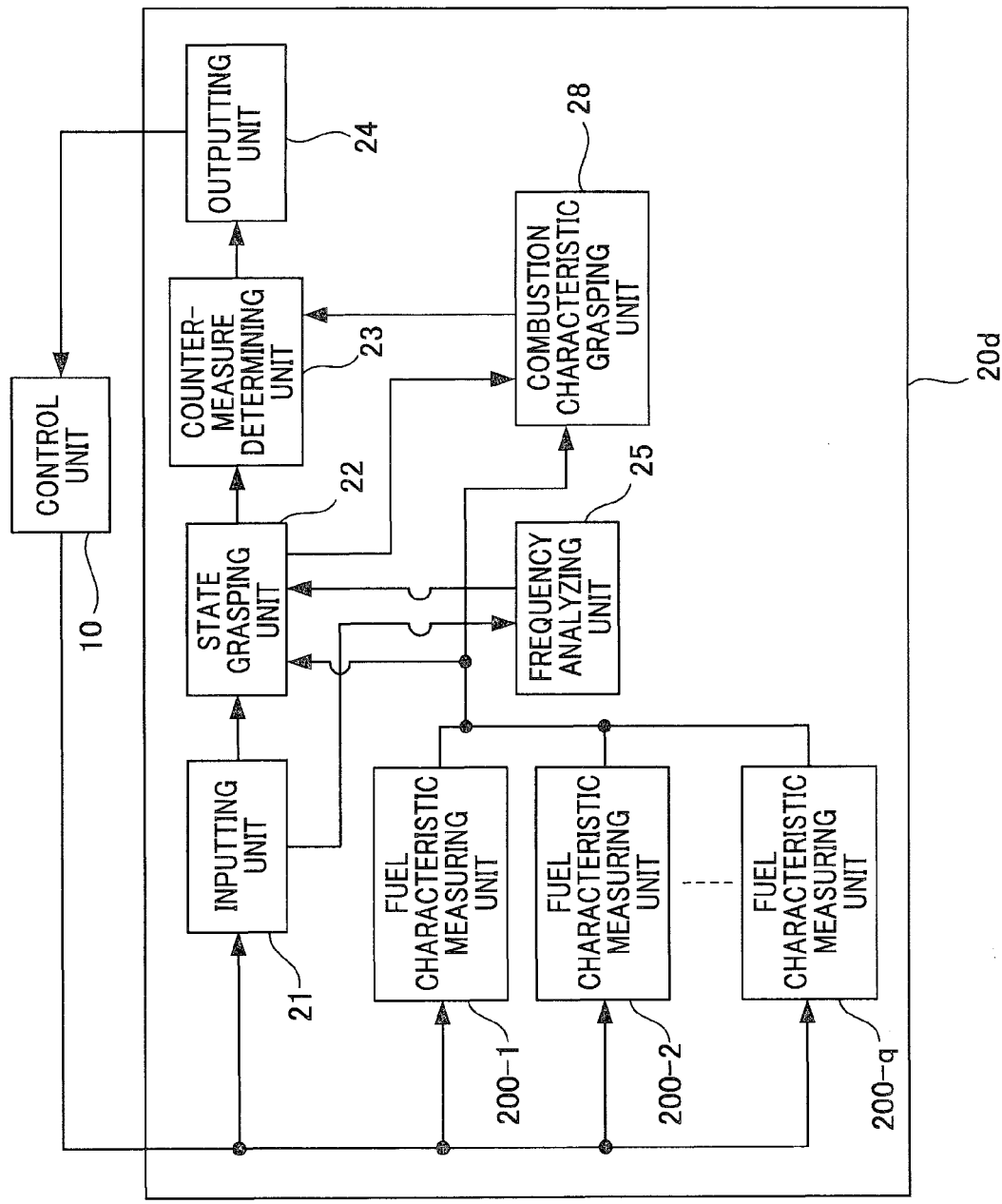
FIG. 20 is a block diagram showing a configuration of an automatic adjusting unit in a gas turbine system of a fourth embodiment.

A fourth embodiment of the present invention will be described with reference to the accompanying drawings. FIG. 20 is a block diagram showing an internal configuration of an automatic adjusting unit used in a gas turbine system of this embodiment. In the configuration of the automatic adjusting unit in FIG. 20, constituents used for the same purposes as the configuration of the automatic adjusting unit in FIG. 15 will be designated by the same reference numerals and detailed description thereof will be omitted.

An automatic adjusting unit **20*d* shown in FIG. 20 (which corresponds to the automatic adjusting unit 20 in FIG. 1) includes fuel characteristic measuring units 200-1 to 200-*q* for measuring the respective fuel compositions of the fuel gases F1 to Fq instead of the combustion characteristic measuring unit 200 in the automatic adjusting unit 20*c* shown in FIG. 15. Specifically, in this embodiment, the respective fuel composition information on the fuel gases F1 to Fq respectively measured by the fuel characteristic measuring units 200-1 to 200-*q* is given to the state grasping unit 22** and is accumulated in the data table for state check.

In this automatic adjusting unit **20*d*, the necessity of adjustment for the combustion oscillation for each of the combustors 111-1 to 111-*m* is judged by the state grasping unit 22 as similar to the third embodiment, and the data are accumulated in the data table for state check as described previously. Moreover, the fuel composition information (the fuel calorie and the volume ratio of the principal components) of the fuel gas to be supplied to all the combustors 111 is obtained based on the respective fuel composition information on the fuel gases F1 to Fq respectively measured by the fuel characteristic measuring units 200-1 to 200-*q* and on the fuel flow rates of the fuel gases F1 to Fq achieved by the valve openings of the fuel flow rate control valves 151-1 to 151-*q***.

At this time, the fuel calorie and the volume ratio of the principal components of the fuel gas (the fuel gas mixed in the fuel mixing tube 152) to be supplied to all the combustors 111 obtained by the state grasping unit 22 are accumulated as the operation amounts in the data table for state check in addition to the valve openings of the bypass valves 118 and the pilot ratios. Moreover, the fuel calories and the volume ratios of the respective fuel gases F1 to Fq measured by the fuel characteristic measuring units 200-1 to **200-*q* are accumulated therein as the inoperable state amounts. Accordingly, for example, in the data table for state check for the combustor 111-*i*, as shown in FIG. 21, in addition to the maximum values $Yi1$ to $Yin$ of the oscillation intensity recorded in FIG. 8 and the various process amounts $Xi1$, $Xi2$, $Xx1$, and $Xx2$, the fuel calories $F1y1$ to $Fqy1$ of the respective fuel gases F1 to Fq and the volume ratios $F1y2$ to $Fqy2$ of the principal components are accumulated as the inoperable state amounts and the fuel calorie $Xz1$ and the volume ratio $Xz2$ of the principal components of the fuel gas (the fuel gas mixed in the fuel mixing tube 152) to be supplied to all the combustors 111** are accumulated as the operation amounts.

Meanwhile, as similar to the third embodiment, the fuel characteristic grasping unit 28 constructs a mathematical model by modeling the combustion characteristic based on the results of the analyses of the combustion oscillation for the frequency bands accumulated in the data table for state check stored in the state grasping unit 22 and on the process amounts in the gas turbine 2. Accordingly, the maximum values Y11 to Ymn of the oscillation intensity accumulated in the state grasping unit 22 concerning the respective combustors 111 depending on the time and the various process amounts Xi1, Xi2, Xx1, Xx2, Xz1, and Xz2 are given from the data table for state check as shown in FIG. 21 to this combustion characteristic grasping unit 28, and the mathematical model representing the combustion characteristic is thereby constructed.

At this time, the maximum value Yij of the oscillation intensity of the pressure oscillation in the j-th frequency band of the combustor 111-$i$ is modeled by use of the multiple regression model, and modeling based on the following formula (6) is performed:

$$Yij = aij\text{-}0 + aij\text{-}1 \times Xi1 + aij\text{-}2 \times Xi2 + aij\text{-}3 \times Xx1 + aij\text{-}4 \times Xx2 + aij\text{-}5 \times Xz1 + aij\text{-}6 \times Xz2 \quad (6)$$

Here,

Xi1: the value of the operation amount 1 (the valve opening of the bypass valve 118-$i$ in this example);

Xi2: the value of the operation amount 2 (the pilot ratio in this example);

Xz1: the value of the operation amount 3 (the fuel calorie of the fuel gas to be supplied to the combustor 111 in this example);

Xz2: the value of the operation amount 4 (the volume ratio of the principal components of the fuel gas of the fuel gas to be supplied to the combustor 111 in this example);

Xx1: the value of the inoperable state amount 1 (the ambient temperature in this example);

Xx2: the value of inoperable state amount 2 (the load (MW) of power generator in this example); and aij-0 to aij-6: the coefficient parameters.

Specifically, the model formula representing the combustion characteristic corresponding to the combustor 111-$i$ is generated by finding the coefficient parameters aij-0 to aij-6 on the basis of the maximum values Y11 to Ymn of the oscillation intensity and the various process amounts Xi1, Xi2, Xx1, Xx2, Xz1, and Xz2, which are accumulated concerning the combustor 111-$i$ for the respective time t1, t2, and so on. when the model formula as shown in the formula (6) is obtained as descried above, the maximum value of the oscillation intensity in the formula (6) is then replaced with αk×Zij and the various process amounts Xx1 and Xx2 in the current operating state excluding the operation amounts Xi1, Xi2, Xz1 and Xz2 are substituted.

In this way, a reference line in four-dimensional coordinates applying the operation amounts Xi1, Xi2, Xz1, and Xz2 for identifying the region which is apt to cause the combustion oscillation is obtained as shown in the following formula (7). At this time, the gains αk apply multiple values in the range from 0 to 1 and the formulae (7) are obtained entirely for the first to n-th frequency bands. Accordingly, as similar to the third embodiment, in a four-dimensional coordinate space applying the operation amounts Xi1, Xi2, Xz1, and Xz2, the combustion oscillation region information using the relational formulae obtained for the respective gains αk for forming the coordinate space for judging the presence or absence of occurrence of the combustion oscillation is given to the countermeasure determining unit 23:

$$\alpha k \times Zij = aij\text{-}0 + aij\text{-}1 \times Xi1 + aij\text{-}2 \times Xi2 + aij\text{-}3 \times Xx1 + aij\text{-}4 \times Xx2 + aij\text{-}5 \times Xz1 + aij\text{-}6 \times Xz2 \quad (7)$$

Moreover, when the state grasping unit 22 judges that the combustor 111-$i$ requires adjustment for the combustion oscillation, the countermeasure determining unit 23 makes reference to the combustion oscillation region information provided by the combustion characteristic grasping unit 28 and determines the direction for adjusting the current operating state of the gas turbine 2 by use of the optimization method so as to suppress the combustion oscillation of the combustor 111-$i$. Specifically, as similar to the third embodiment, regarding the combustor 111-$i$ deemed to require the adjustment for the combustion oscillation, the direction for suppressing the combustion oscillation out of the current operating state is searched with reference to the combustion oscillation region information obtained for this combustor 111-$i$.

By operating as described above, the valve opening Xi1 of the bypass valve 118-$i$ and the pilot ratio Xi2 of the combustor confirmed to have the necessity for the adjustment for this combustion oscillation, as well as the fuel calorie Xz1 and the volume ratio Xz2 of the principal components of the fuel gas to be supplied to all the combustors 111 are obtained. Thereafter, the directions for adjusting the operating states of all the combustors 111-$i$ confirmed to have the necessities of the adjustment concerning the combustion oscillation are also confirmed, and then in terms of all the combustors 111-$i$ confirmed to have the necessities of adjustment concerning the combustion oscillation, respective average values Xz1-$av$ and Xz2-$av$ of the fuel calorie Xz1 and the volume ratio Xz2 of the fuel gas to be supplied to all the confirmed combustors 111 are obtained.

Moreover, setting of the valve openings of the fuel flow rate control valves 151-1 to 151-$q$ is performed with reference to the fuel calories F1$y$1 to F$q y$1 and the volume ratios F1$y$2 to F$q y$2 of the respective fuel gases F1 to F$q$ confirmed from a data table for state check as shown in FIG. 21 so as to achieve the fuel calorie Xz1-$av$ and the volume ratio Xz2-$av$ of the principal components of the fuel gas to be supplied to all the combustors 111. The valve opening Xi1 of the bypass valve 118-$i$ and the pilot ratio Xi2 of the combustor 111-$i$ are outputted together with the valve openings of the fuel flow rate control valves 151-1 to 151-$q$ thus set up to the control unit 10 through the outputting unit 24 as the state change amounts corresponding to the respective units of the gas turbine 2.

Here, in this embodiment, the countermeasure determining unit 23 is configured to obtain the fuel calorie Xz1 and the volume ratio Xz2 of the fuel gas to be supplied to all the combustors 111 by use of the optimization method, and then to set up the valve openings of the fuel flow rate control valves 151-1 to 151-$q$ with reference to the fuel calories F1$y$1 to F$q y$1 and the volume ratios F1$y$2 to F$q y$2 of the principal components of the respective fuel gases F1 to F$q$. However, it is also possible to set up the valve openings of the fuel flow rate control valves 151-1 to 151-$q$ directly by defining the fuel calories F1$y$1 to F$q y$1 and the volume ratios F1$y$2 to F$q y$2 of the principal components of the respective fuel gases F1 to F$q$ as the operation amounts and obtaining the operation amounts F1$y$1 to F$q y$1 and F1$y$2 to F$q y$2 in accordance with the optimization method.

Meanwhile, the fuel calories Xz1 and the volume ratios Xz2 of the fuel gas to be supplied to all the combustors 111 are obtained for the respective combustors 111-$i$ deemed to require the adjustment and then the average values thereof are obtained. However, it is also possible to select any of the fuel calories Xz1 and the volume ratios Xz2 of the fuel gas thus obtained on the basis of the combustor 111 causing the largest combustion oscillation or on a situation of causing the largest influence, and the like or it is also possible to obtain the values by adding weights. Alternatively, it is also possible to find the change amounts subject to adjustment by obtaining the regions which are unlikely to cause the combustion oscillation ultimately as the gas turbine 2 on the basis of the linear programming of the combustion oscillation region information provided in terms of the respective combustors 111-1 to 111-*m*.

Fifth Embodiment

Figure 22:
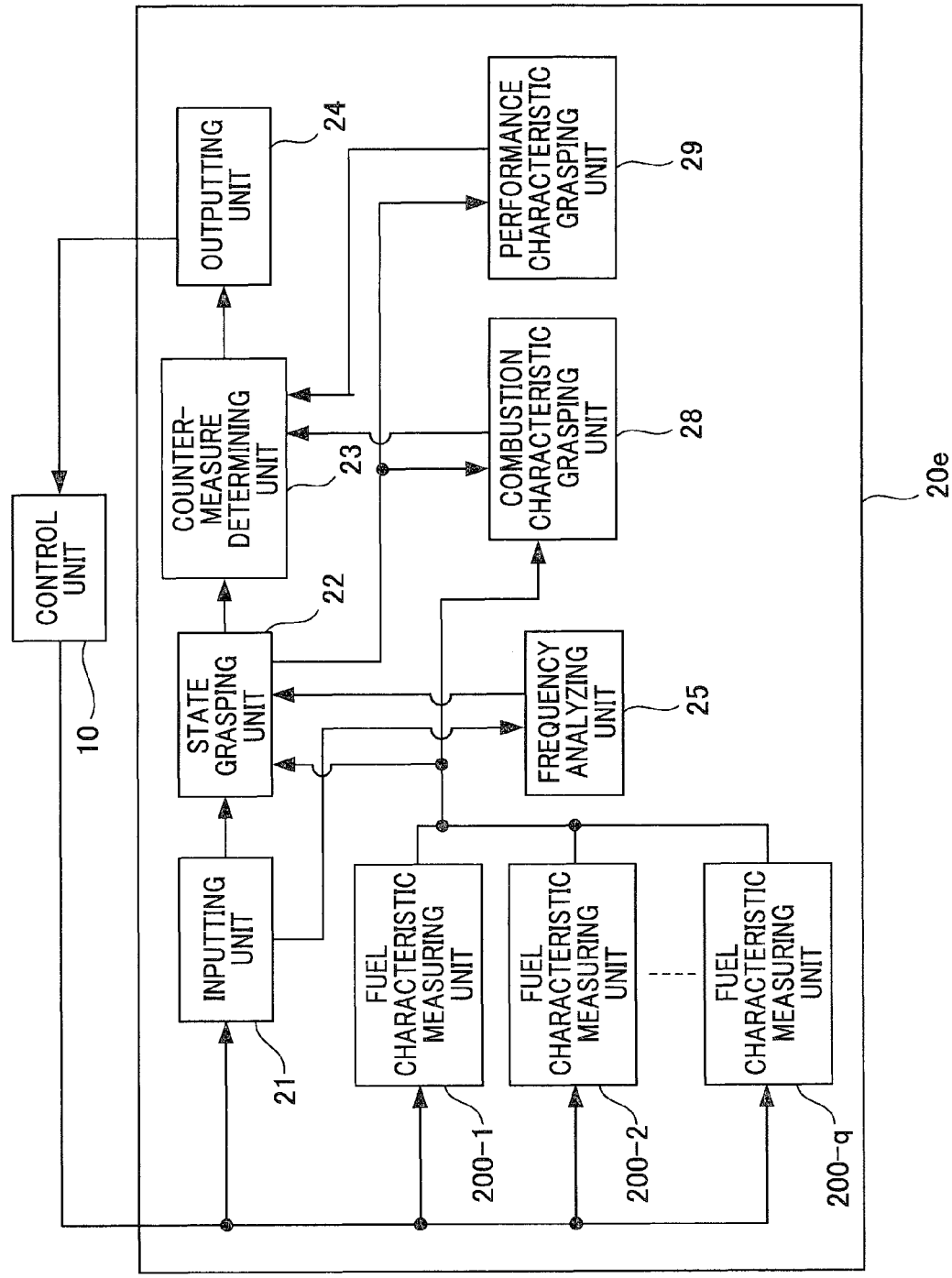
FIG. 22 is a block diagram showing a configuration of an automatic adjusting unit in a gas turbine system of a fifth embodiment.

A fifth embodiment of the present invention will be described with reference to the accompanying drawing. FIG. 22 is a block diagram showing an internal configuration of an automatic adjusting unit used in a gas turbine system of this embodiment. In the configuration of the automatic adjusting unit in FIG. 22, constituents used for the same purposes as the configuration of the automatic adjusting unit in FIG. 20 will be designated by the same reference numerals and detailed description thereof will be omitted.

An automatic adjusting unit 20*e* shown in FIG. 22 (which corresponds to the automatic adjusting unit 20 in FIG. 1) includes a performance characteristic grasping unit 29 for recognizing performance characteristics of the respective units of the gas turbine 2 on the basis of the process amounts of the gas turbine 2 accumulated in the data table for state check stored in the state grasping unit 22 in addition to the configuration of the automatic adjusting unit 20*d* shown in FIG. 20. This performance characteristic grasping unit 29 calculates efficiency (element efficiency) of respective elements of the gas turbine system 1 such as thermal efficiency of the gas turbine 2 or heat-insulating efficiency of the compressor 101 on the basis of the process amounts of the gas turbine 2, and sends a calculation result out to the countermeasure determining unit 23.

In the automatic adjusting unit 20*e* thus configured, when inputted to the performance characteristic grasping unit 29 through the fuel characteristic measuring units 200-1 to 200-*q* and the inputting unit 21 and the process amounts of the gas turbine 2 accumulated in the state grasping unit 22 are provided thereto, the heat capacity is obtained from the fuel composition of the fuel gas, the fuel flow rate as well as the air flow rate to be supplied, and the ambient temperature, for example. Moreover, thermal efficiency of the gas turbine system 1 is calculated by use of a ratio between the obtained heat capacity and a power generation capacity of the power generator 121. Moreover, the element efficiency of the gas turbine system 1 is calculated similarly by computation using other process amounts.

Moreover, when the entire thermal efficiency and the element efficiency in the gas turbine system 1 obtained by this performance characteristic grasping unit 29 are given to the countermeasure determining unit 23, the amounts of correction applicable to the state change amounts obtained by the countermeasure determining unit 23 are found as similar to the fourth embodiment on the basis of the terminal efficiency and the element efficiency, and the state change amounts corrected by these amounts of correction are outputted to the control unit 10 through the outputting unit 24. At this time, the amounts of correction are obtained respectively in terms of the valve openings of the fuel flow rate control valves 151-1 to 151-*q*, the valve opening of the bypass valve 118-*i* of the combustor 111-1, and the pilot ratio set up as the state change amounts so as to increase the thermal efficiency of the gas turbine system 1 confirmed by the performance characteristic grasping unit 29, for example.

Meanwhile, when obtaining the amounts of correction corresponding to the state change amounts, it is possible to set up not only the amounts of correction based on the thermal efficiency of the gas turbine system 1 but also the amounts of correction so as to reduce discharge amounts of NOx, CO, and the like on the basis of the thermal efficiency and the element efficiency confirmed by the performance characteristic grasping unit 29. It is also possible to set up the amounts of correction so as to reduce a cost of the fuel gas to be supplied. Furthermore, in the case of setting up so as to reduce the cost of the fuel gas to be supplied, when the fuel calorie and the volume ratio of the principal components of the fuel gas to be supplied to all the combustors 111 are set up so as to suppress the combustion oscillation as described in the fourth embodiment, the countermeasure determining unit 23 may set up the valve openings of the fuel flow rate control valves 151-1 to 151-*q* not only by making reference to the fuel calories and the volume ratios of the principal components of the respective fuel gases F1 to Fq but also by considering costs arising from the respective fuel gases F1 to Fq.

Sixth Embodiment

Figure 23:
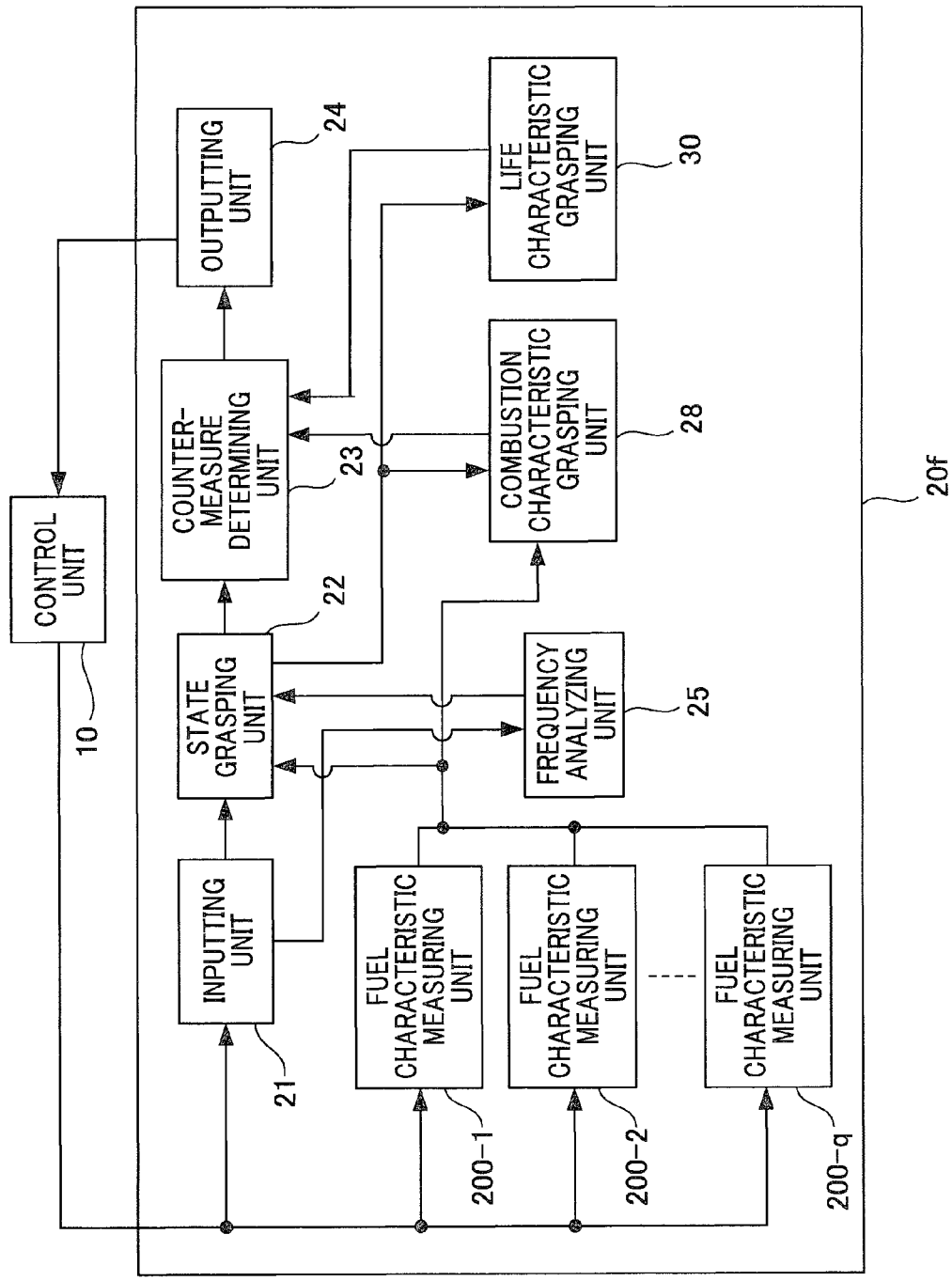
FIG. 23 is a block diagram showing a configuration of an automatic adjusting unit in a gas turbine system of a sixth embodiment.

A sixth embodiment of the present invention will be described with reference to the accompanying drawing. FIG. 23 is a block diagram showing an internal configuration of an automatic adjusting unit used in a gas turbine system of this embodiment. Here, in the configuration of the automatic adjusting unit in FIG. 23, constituents used for the same purposes as the configuration of the automatic adjusting unit in FIG. 20 will be designated by the same reference numerals and detailed description thereof will be omitted.

An automatic adjusting unit 20*f* shown in FIG. 23 (which corresponds to the automatic adjusting unit 20 in FIG. 1) includes a life characteristic grasping unit 30 for recognizing life characteristics of the respective units of the gas turbine 2 on the basis of the results of analyses of the combustion oscillation for the respective frequency bands accumulated in the data table for state check stored in the state grasping unit 22 and on the basis of process amounts of the gas turbine 2 in addition to the configuration of the automatic adjusting unit 20*d* shown in FIG. 20. This life characteristic grasping unit 30 calculates remaining lives and consumed lives of the respective elements of the gas turbine system 1 on the basis of the results of analyses of the combustion oscillation for the respective frequency bands, the process amounts of the gas turbine 2, and operating time of the gas turbine system, and sends this calculation result out to the countermeasure determining unit 23.

In the automatic adjusting unit 20*f* thus configured, when inputted to the life characteristic grasping unit 30 through the fuel characteristic measuring units 200-1 to 200-*q* and the inputting unit 21 and the process amounts of the gas turbine 2 accumulated in the state grasping unit 22 and the results of analyses of the combustion oscillation for the respective frequency bands obtained by the frequency analyzing unit 25 are provided thereto, the consumed lives of the respective elements of the gas turbine system 1 are calculated based on the operating time of the gas turbine system 1 and the results of analyses of the combustion oscillation for the respective frequency bands, for example. Specifically, in this case, it is possible to calculate the consumed lives of the elements, to which loads are applied by the oscillation in the respective frequency bands, on the basis of the results of analyses of the combustion oscillation for the respective frequency bands. Meanwhile, the remaining lives of the respective elements of the gas turbine system 1 is calculated based on the operating state of the gas turbine system 1, which is confirmed and changed by the process amounts of the gas turbine 2 accumulated in the state grasping unit 22.

Moreover, when the consumed lives and the remaining lives of the respective elements of the gas turbine system 1 obtained by this life characteristic grasping unit 30 are given to the countermeasure determining unit 23, the amounts of correction applicable to the state change amounts obtained by the countermeasure determining unit 23 are found as similar to the fourth embodiment on the basis of the consumed lives and the remaining lives, and the state change amounts corrected by these amounts of correction are outputted to the control unit 10 through the outputting unit 24. At this time, the amounts of correction are obtained respectively in terms of the valve openings of the fuel flow rate control valves 151-1 to 151-$q$, the valve opening of the bypass valve 118-$i$ of the combustor 111-1, and the pilot ratio set up as the state change amounts so as to achieve appropriate lives of the respective elements of the gas turbine system 1 confirmed by the life characteristic grasping unit 30, for example. The appropriate lives do not mean simply longer lives but also healthy fulfillment of functions of the respective elements up to predetermined lives thereof based on life cycles individually set up for expendable parts and other elements.

Meanwhile, in this embodiment, it is also possible to provide the performance characteristic grasping unit 29 as similar to the fifth embodiment and to allow the countermeasure determining unit 23 to correct the state change amount after obtaining the amounts of correction based on the thermal efficiency and the element efficiency confirmed with this performance characteristic grasping unit 29. Alternatively, in the third to sixth embodiments, it is also possible to provide the combustion characteristic estimating unit of the second embodiment instead of the combustion characteristic measuring unit.

Another Example of Gas Turbine System

Although the gas turbine system according to any of the above-described first to sixth embodiments is configured to control a single gas turbine with a single gas turbine control unit, it is also possible to apply a configuration to control multiple gas turbines with a single gas turbine control unit by use of a communication device. Such a gas turbine system configured to control and manage multiple gas turbines by use of a communication device will be described by using a gas turbine system having a similar configuration to the fifth embodiment, for example.

Figure 24:
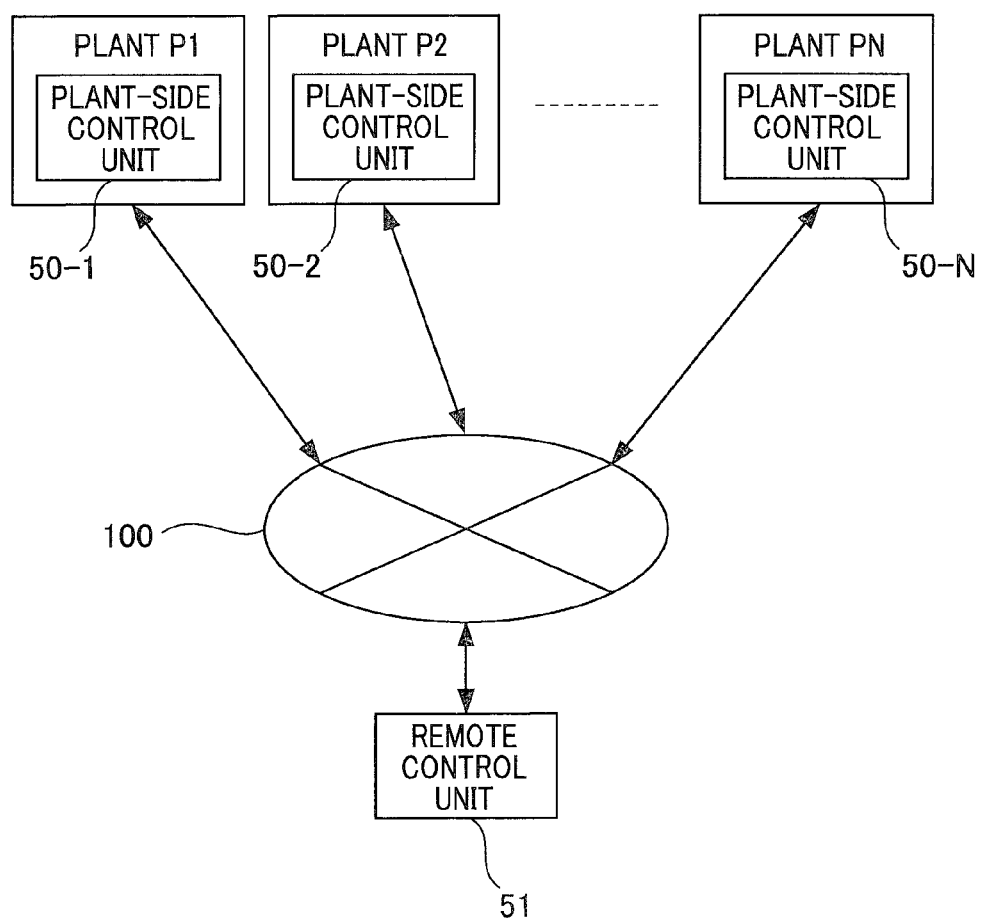
FIG. 24 is a block diagram showing another configuration example of the gas turbine system of this embodiment.

The configuration of the gas turbine system of this example will be described below with reference to the accompanying drawings. FIG. 24 is a block diagram showing a configuration of a gas turbine control unit in a gas turbine system 1$a$ of this example. Here, in the configuration in FIG. 24, constituents used for the same purposes as the configuration in FIG. 22 will be designated by the same reference numerals and detailed description thereof will be omitted.

The gas turbine system 1$a$ in FIG. 24 is applied to multiple plants P1 to PN that install gas turbines (not shown) having a similar configuration to FIG. 19, which includes plant-side control units 50-1 to 50-N to which measurement results of respective units of the gas turbines are inputted, and a remote control unit 51 for communicating with the plant-side control units 50-1 to 50-N through the Internet 100 and setting up the operating states of the respective gas turbines in the plants P1 to PN.

Figure 25:
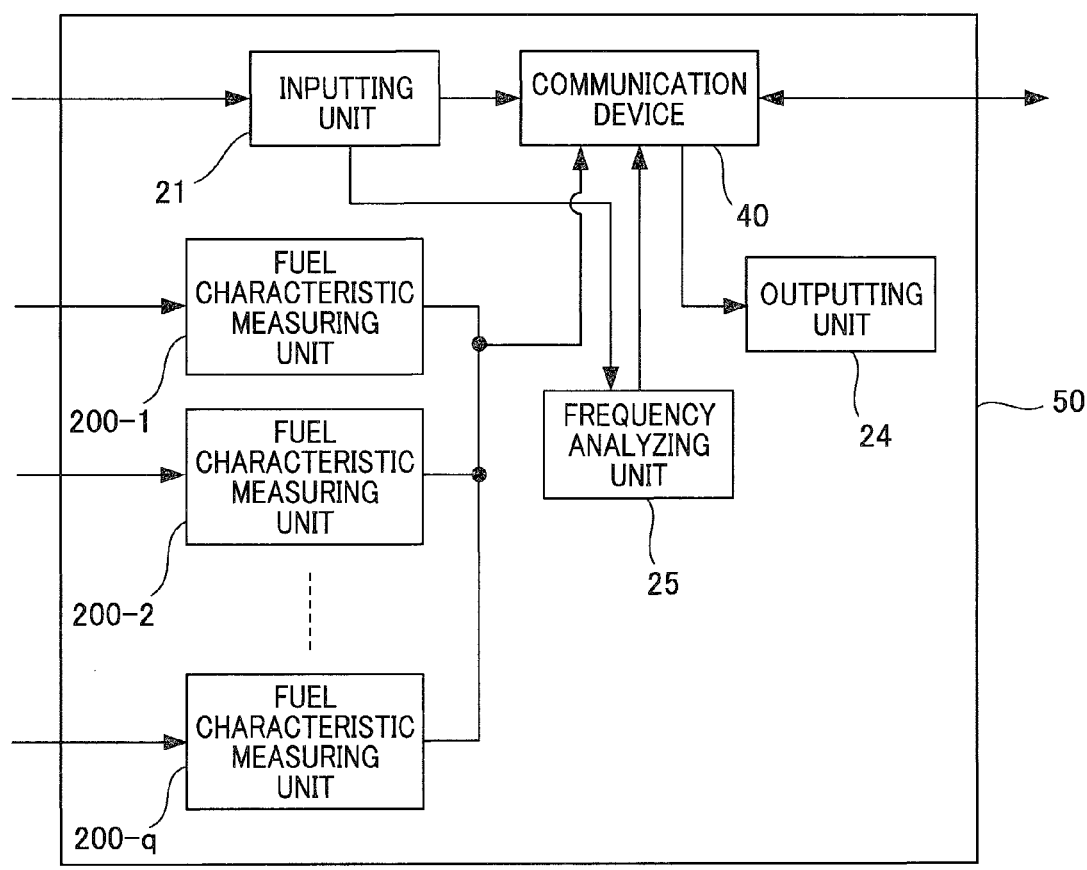
FIG. 25 is a block diagram showing a configuration of a plant-side control unit in the gas turbine system in FIG. 24.
Figure 26:
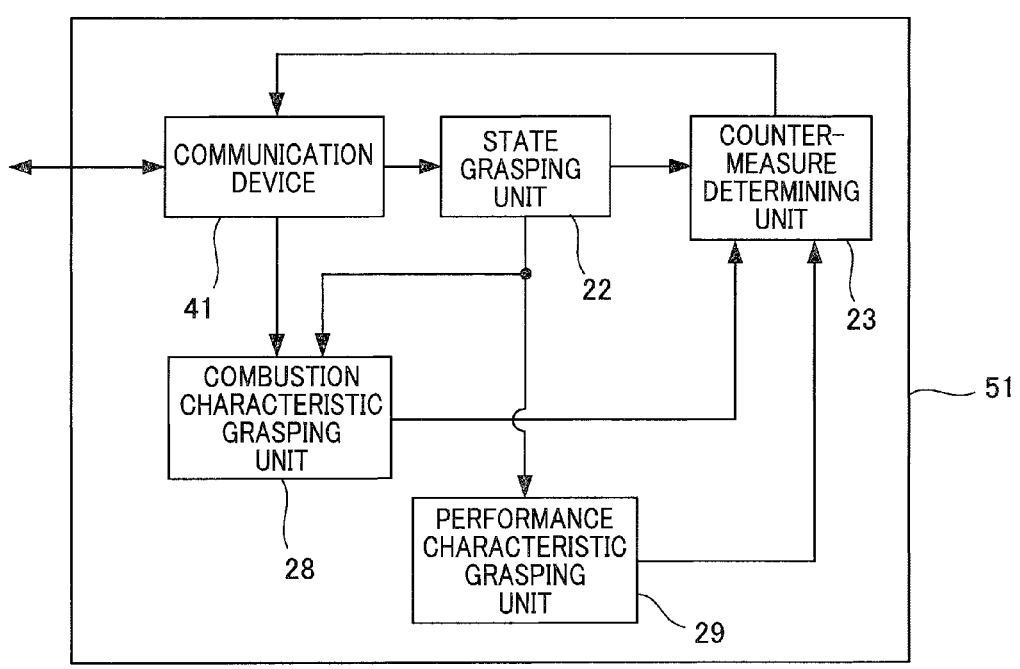
FIG. 26 is a block diagram showing a configuration of a remote control unit in the gas turbine system in FIG. 24.

Moreover, as shown in FIG. 25, each of the plant-side control units 50 (which correspond to the plant-side control units 50-1 to 50-N in FIG. 24) includes the fuel characteristic measuring units 200-1 to 200-$n$, the inputting unit 21, the outputting unit 24, the frequency analyzing unit 25, and in addition, a communication device 40 connected for communication to the Internet 100 by performing cable communication or radio communication. Meanwhile, as shown in FIG. 26, the remote control unit 51 includes the state grasping unit 22, the countermeasure determining unit 23, the combustion characteristic grasping unit 28, the performance characteristic grasping unit 29, and a communication device 41 connected for communication to the Internet 100 by performing cable communication or radio communication.

In these configurations, at each of the plant-side control units 50-1 to 50-N, various process amounts such as the ambient temperature inputted by the inputting unit 21 or a load on the power generators 121 which are inputted by the inputting unit 21 for the respective time t1, t2, and so on, the fuel composition information measured by the fuel characteristic measuring units 200-1 to 200-$q$, and results of analyses in the respective frequency bands of the combustion oscillation by the frequency analyzing unit 25 are transmitted from the communication device 40 to the remote control unit 51 through the Internet 100.

In the meantime, when the remote control unit 51 receives the respective information such as the various process amounts from the respective plant-side control units 50-1 to 50-N with the communication device 41, the various process amounts including the fuel composition information and the results of the analyses for the respective frequency bands are given to the state grasping unit 22 and the fuel composition information and the result of the analyses for the respective frequency bands are given to the combustion characteristic grasping unit 28. Thereafter, the state grasping unit 22, the countermeasure determining unit 23, the combustion characteristic grasping unit 28, and the performance characteristic grasping unit 29 perform similar operations to the automatic adjusting unit 20$c$ (FIG. 22) of the fifth embodiment. Accordingly, the countermeasure determining unit 23 sets up the state change amounts applicable to the respective plant-side control units 50-1 to 50-N for determining the operating states of the gas turbines.

Then, the state change amounts for the gas turbines applicable to the respective plant-side control units 50-1 to 50-N thus set up are given to the communication device 41 and are transmitted respectively to the plant-side control units 50-1 to 50-N through the Internet 100. Specifically, the state change amounts for the gas turbines corresponding to the plant-side control units 50-$u$ (U=1, 2, ..., N) are transmitted from the communication device 41 to the plant-side control units 50-$u$. When each of the plant-side control units 50-$u$ receives the state change amounts for the gas turbine set up by this remote control unit 51 with the communication device 40, the received state change amounts are outputted to the control unit 10 through the outputting unit 24 and the operating state of the gas turbine is thereby controlled.

Next, seventh to twelfth embodiments of the present invention will be described. An overall configuration of a gas turbine system constituting a common configuration to these embodiments is as shown in FIG. 1 and FIG. 2. Note that the present invention is applicable not only to the gas turbine system in FIG. 1 but also to the gas turbine system as shown in FIG. 19, the gas turbine system as shown in FIG. 24, and so forth. Moreover, it is also possible to combine any of the following embodiments with any of the above-described embodiments.

Seventh Embodiment

Figure 27A:
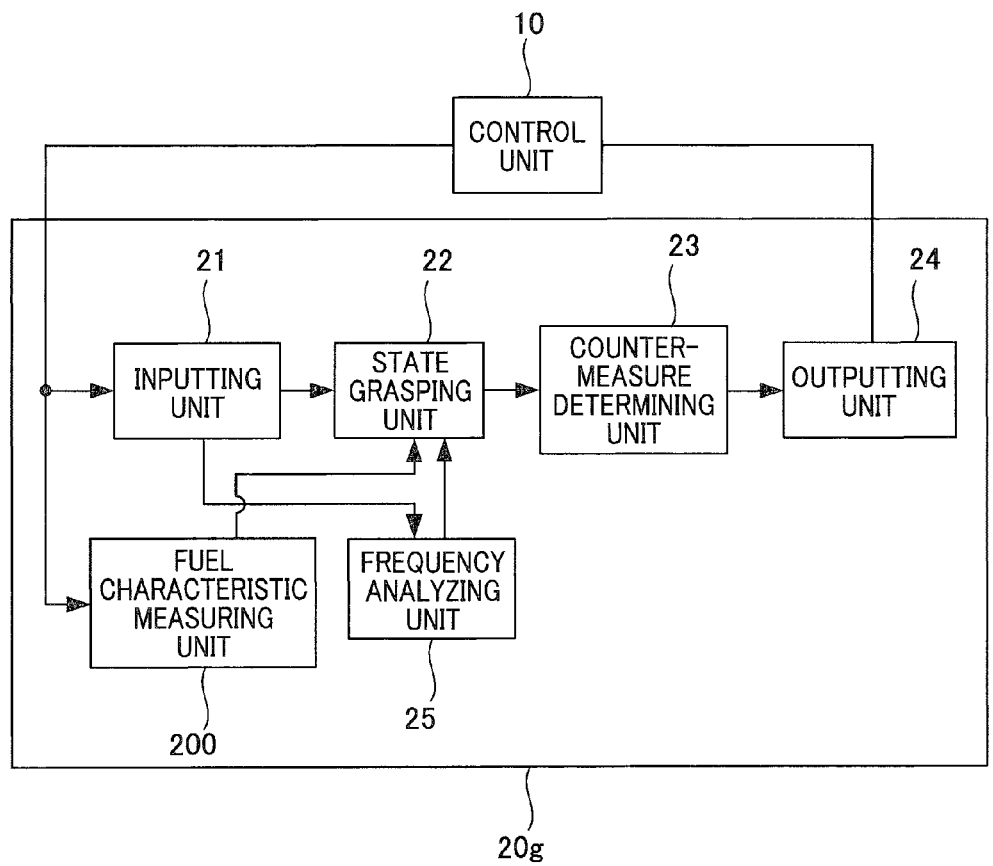
FIG. 27($a$) is a block diagram showing a configuration of an automatic adjusting unit in a gas turbine system of a seventh embodiment and FIG. 27($b$) is a diagram showing a state of installation of a fuel characteristic measuring unit.
Figure 27B:
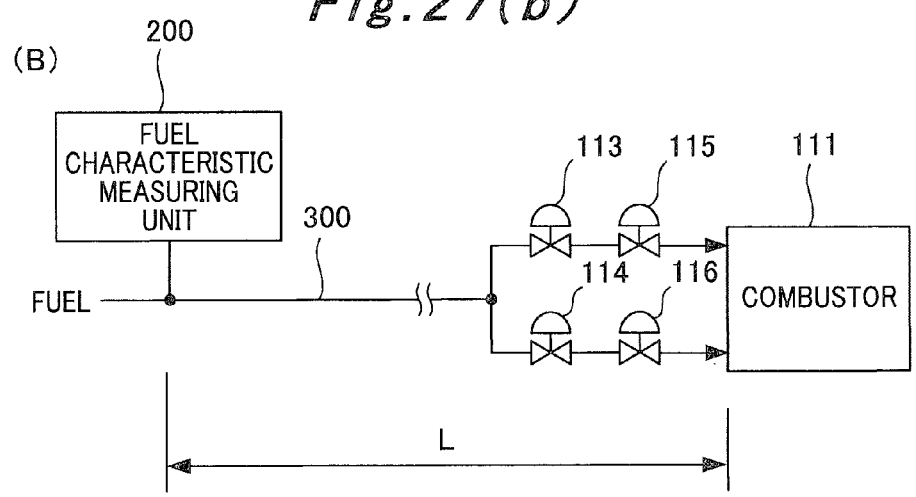

A seventh embodiment of the present invention will be described with reference to the accompanying drawings. FIG. 27(a) is a block diagram showing an internal configuration of an automatic adjusting unit used in a gas turbine system of this embodiment and FIG. 27(b) is a diagram showing a state of installation of a fuel characteristic measuring unit. Here, in the configuration of the automatic adjusting unit in FIG. 27(a), constituents used for the same purposes as the configuration of the automatic adjusting unit in FIG. 3 will be designated by the same reference numerals and detailed description thereof will be omitted.

An automatic adjusting unit 20g shown in FIG. 23 (which corresponds to the automatic adjusting unit 20 in FIG. 1) has a similar configuration to the automatic adjusting unit 20a shown in FIG. 3. Nevertheless, in consideration of a long sampling cycle of the fuel characteristic measuring unit 200, the fuel characteristic measuring unit 200 is disposed on a fuel supply line 300 in a position far away from the combustor 111 of the gas turbine system 1 as shown in FIG. 27(b), namely, in the position at a distance L (which may vary depending on conditions such as a pipe diameter of the fuel supply line but may be as long as several kilometers, for instance) away from the combustor 111 in the illustrated example.

Figure 28:
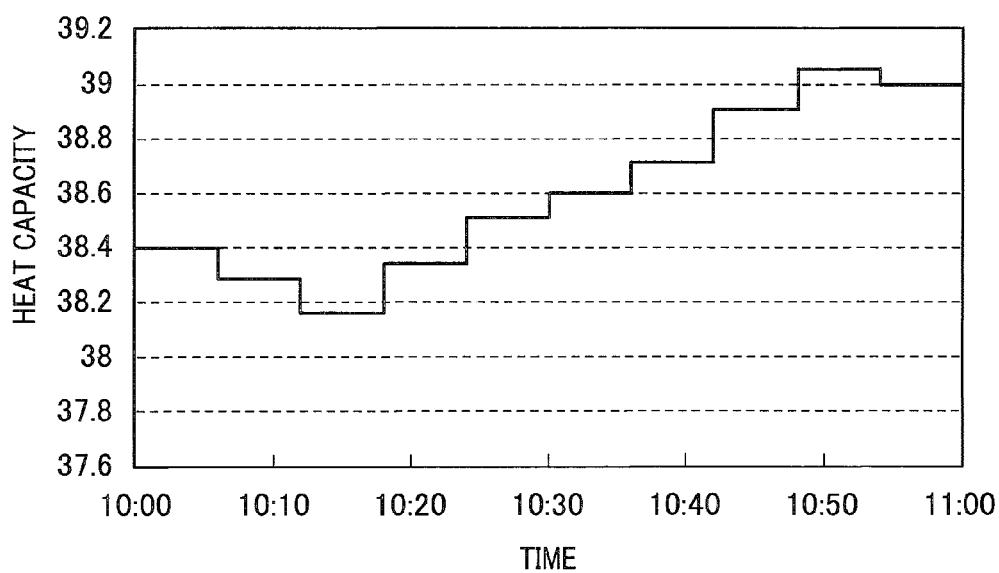
FIG. 28 is a diagram showing an output example of the fuel characteristic measuring unit.

The fuel characteristic measuring unit 200 is typically formed of a gas analyzer that cannot obtain results of an analysis such as the fuel composition or the heat capacity of the fuel gas immediately after sampling the fuel gas, and requires long time and therefore applies a long sampling cycle (a sampling cycle of about 6 minutes long in the illustrated example) as shown in an output example of the fuel characteristic measuring unit 200 in FIG. 28. Accordingly, the fuel characteristic measuring unit 200 has less responsiveness than other process amount measuring means.

For this reason, when the fuel characteristic measuring unit 200 is disposed near the combustor 111, the fuel gas would reach the combustor 111 and would be combusted before sampling the fuel gas and obtaining the result of the analysis by the fuel characteristic measuring unit 200. Consequently, it is not possible to synchronize timing for capturing and utilizing the result of the analysis (the measurement result) of the fuel gas from the fuel characteristic measuring unit 200 into the automatic adjusting unit 20g with timing of combustion of the fuel gas at the combustor 111 which is analyzed (measured) by the fuel characteristic measuring unit 200. Accordingly, in the case where the fuel gas can be supplied from multiple gas fields, for example, it is presumably difficult to suppress the combustion oscillation when the fuel composition and the heat capacity of the fuel gas to be supplied to the combustor 111 are changed by switching the gas field.

Consequently, the fuel characteristic measuring unit 200 is disposed on the fuel supply line 300 for guiding the fuel gas from a fuel supply source (such as the gas field) to the combustor 111. Moreover, the location of disposition is set to a position where it is possible to obtain the measured value (such as the fuel composition or the heat capacity) of the fuel gas measured (sampled) before the fuel gas measured (sampled) in the location of disposition by the fuel characteristic measuring unit 200 flows on the fuel supply line 300 and reaches the combustor 111 even when an output of the gas turbine 2 (a power generator output) is set to a rated output (i.e. even when the fuel flow rate of the fuel gas is the largest and the fuel flow velocity is the fastest) (the location is set to the position at the distance L away from the combustor 111 in the illustrated example).

Moreover, at this time, the measured value is taken into the state grasping unit 22 while considering a time delay from a point when the measured value of the fuel gas (such as the fuel composition or the heat capacity of the fuel gas) is obtained by the fuel characteristic measuring unit, 200 to a point when the fuel gas reaches the combustor 111.

Furthermore, considering that the fuel flow rate (the fuel flow velocity) varies depending on the output of the gas turbine 2 (a power generator output), the delay time is set up as a function of the load (the gas turbine output). Specifically, the time delay from the point when the measured value of the fuel gas (such as the fuel composition or the heat capacity of the fuel gas) is obtained by the fuel characteristic measuring unit 200, to the point when the fuel gas reaches the combustor 111 is set up with the function applying the output of the gas turbine 2 (the power generator output) as shown in FIG. 29 as an example, so that the timing (time) when the fuel gas reaches the combustor 111 can be synchronized with the timing (time) of taking the measured value into the state grasping unit 22 on the basis of this time delay. Note that the means for setting this delay time may be provided on the state grasping unit 22 or on the fuel characteristic measuring unit 200. In addition, although the delay time is explained as the function applying the load (the gas turbine output), it is also possible to use a function applying the fuel flow rate or a fuel flow rate command.

According to the seventh embodiment, the timing for obtaining the measured value such as the fuel composition or the heat capacity of the fuel gas and taking this value into the automatic adjusting unit 20g (the state grasping unit 22) can be synchronized with the timing for combusting the fuel gas used for obtaining this measured value in the combustor 111. Consequently, it is possible to suppress the combustion oscillation more reliably at the time of changing the fuel composition, and thereby to maintain combustion stability more reliably.

Eighth Embodiment

Figure 30A:
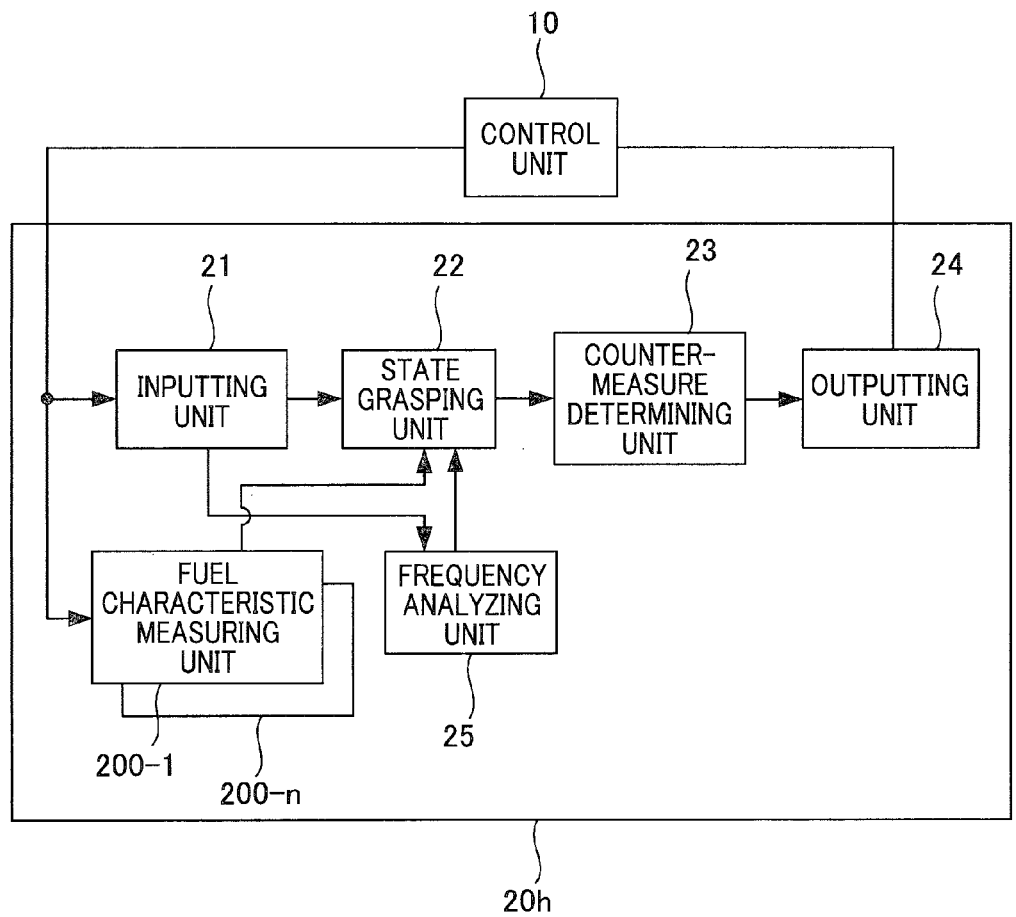
FIG. 30($a$) is a block diagram showing a configuration of an automatic adjusting unit in a gas turbine system of an eighth embodiment and FIG. 30($b$) is a diagram showing a state of installation of multiple fuel characteristic measuring units.
Figure 30B:
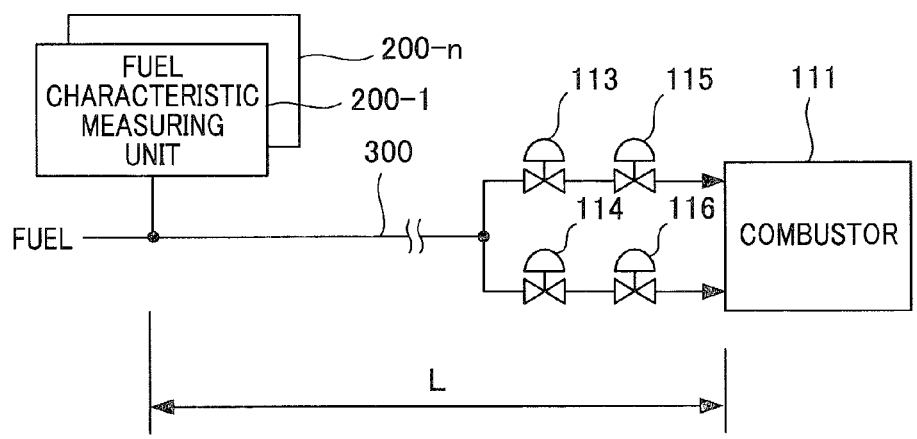

An eighth embodiment of the present invention will be described with reference to the accompanying drawings. FIG. 30(a) is a block diagram showing an internal configuration of an automatic adjusting unit used in a gas turbine system of this embodiment, and FIG. 30(b) is a diagram showing a state of installation of a fuel characteristic measuring unit. Here, in the configuration of the automatic adjusting unit in FIG. 30(a), constituents used for the same purposes as the configurations of the automatic adjusting units in FIG. 3 and FIG. 27(a) will be designated by the same reference numerals and detailed description thereof will be omitted.

The single fuel characteristic measuring unit 200 is disposed on the fuel supply line 300 in the above-described seventh embodiment as shown in FIG. 27(b), whereas the multiple fuel characteristic measuring units 200-1 to 200-n are disposed in the same position (which is the position having the distance L away from the combustor 111 in the illustrated example) on the fuel supply line 300 in the eighth embodiment as shown in FIG. 30(b). Note that other configurations of this embodiment are similar to the above-described seventh embodiment.

Figure 31:
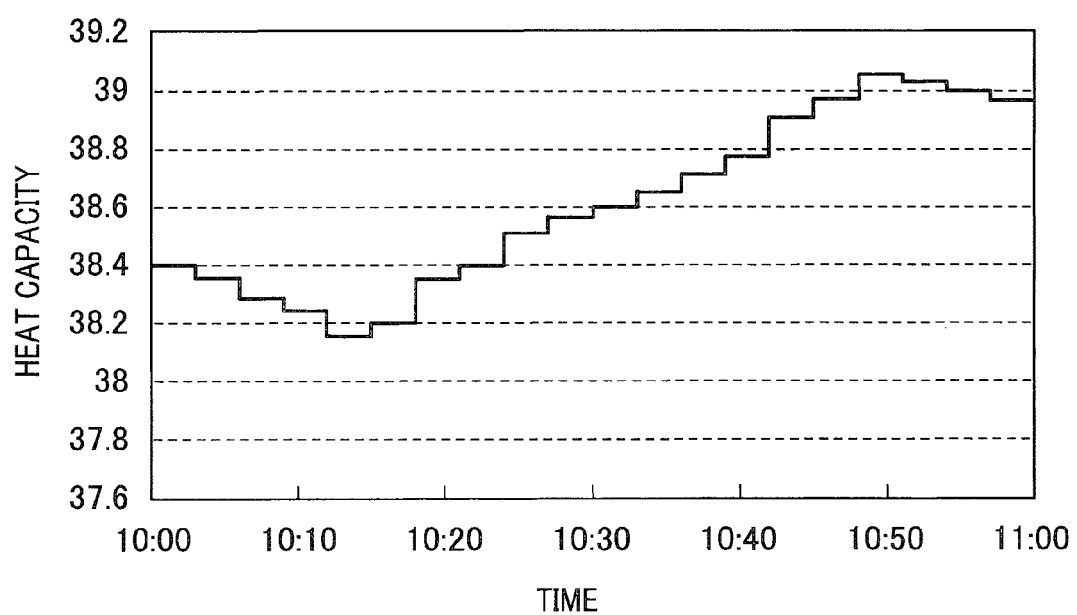
FIG. 31 is a diagram showing an output example of the multiple fuel characteristic measuring units.

The multiple fuel characteristic measuring units 200-1 to 200-n are formed of gas analyzers, for example. Moreover, these fuel characteristic measuring units 200-1 to 200-n have shifted timing for measuring (sampling) the fuel gas, whereby the measurement results (the measured values of the fuel composition and the heat capacity) by these fuel characteristic measuring units 200-1 to 200-*n* are sequentially taken into the state grasping unit 22 and used for state grasping processes. For this reason, although individual sampling cycles (measuring cycles) of the fuel characteristic measuring units 200-1 to 200-*n* are the same as the fuel characteristic measuring unit 200 of the above-described seventh embodiment, the sampling cycle (the measurement cycle) becomes shorter as shown in FIG. 31 as an example on the whole fuel characteristic measuring units 200-1 to 200-*n*. The example in FIG. 31 shows the case of disposing two fuel characteristic measuring unit and shifting the timing for sampling the fuel gas with these fuel characteristic measuring units in an amount of 3 minutes. The sampling cycle (the measurement cycle) as a whole is shortened from 6 minutes in the case of providing the single fuel characteristic measuring unit (see FIG. 28) down to 3 minutes.

According to the eighth embodiment, the sampling cycle (the measurement cycle) of the fuel gas can be shortened. Consequently, it is possible to improve a tracking performance relative to a change in the fuel composition or the heat capacity of the fuel gas, and thereby to maintain combustion stability more reliably.

Ninth Embodiment

Figure 32A:
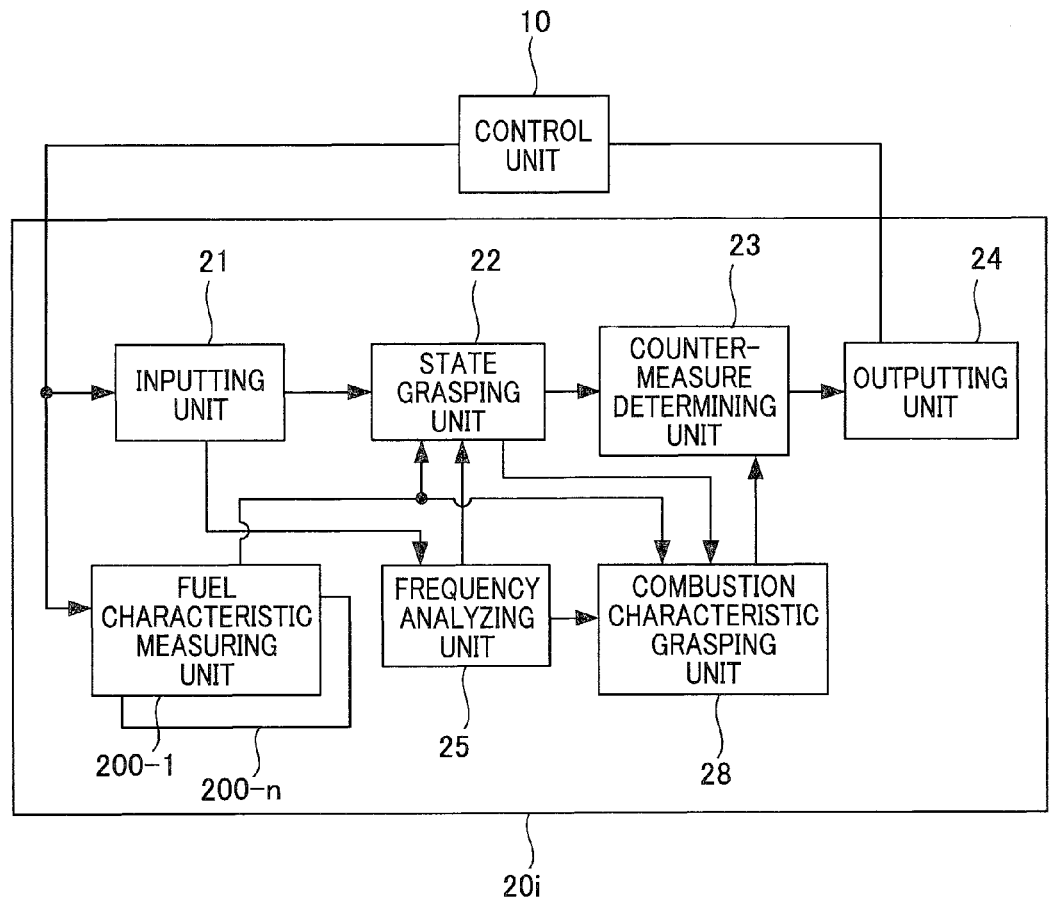
FIG. 32($a$) is a block diagram showing a configuration of an automatic adjusting unit in a gas turbine system of a ninth embodiment and FIG. 32($b$) is a diagram showing a state of installation of multiple fuel characteristic measuring units.
Figure 32B:
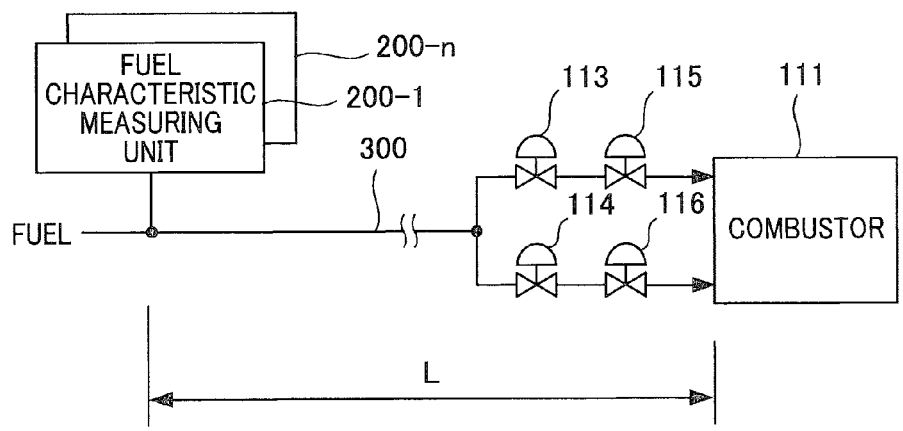

A ninth embodiment of the present invention will be described with reference to the accompanying drawings. FIG. 32(*a*) is a block diagram showing an internal configuration of an automatic adjusting unit used in a gas turbine system of this embodiment and FIG. 32(*b*) is a diagram showing a state of installation of a fuel characteristic measuring unit. Here, in the configuration of the automatic adjusting unit in FIG. 32(*a*), constituents used for the same purposes as the configurations of the automatic adjusting units in FIG. 3 and FIG. 30(*a*) will be designated by the same reference numerals and detailed description thereof will be omitted.

An automatic adjusting unit 20*i* shown in FIG. 32(*a*) (which corresponds to the automatic adjusting unit 20 in FIG. 1) has a configuration obtained by adding the combustion characteristic grasping unit 28 for constructing the mathematical model as similar to the automatic adjusting unit 20*c* shown in FIG. 15, which is formed by modeling the combustion characteristics based on the results of the analyses of the combustion oscillation for the frequency bands accumulated in the data table for state check stored in the state grasping unit 22, and on the combustion characteristics based on the process amounts in the gas turbine 2 to the configuration of the automatic adjusting unit 20*h* shown in FIG. 30(*a*).

In addition, as similar to the case in FIG. 30(*b*), the multiple fuel characteristic measuring units 200-1 to 200-*n* are disposed on the fuel supply line 300 for guiding the fuel gas from the fuel supply source (such as the gas field) to the combustor 111. Moreover, the location of disposition is set to the position where it is possible to obtain the measured value (such as the fuel composition or the heat capacity) of the fuel gas measured (sampled) before the fuel gas measured (sampled) in the location of disposition by the fuel characteristic measuring units 200 flows on the fuel supply line 300 and reaches the combustor 111 even when the output of the gas turbine 2 (a power generator output) is set to a rated output (i.e. even when the fuel flow rate of the of the fuel gas is the largest and the fuel flow velocity is the fastest) (the location is set to the position at the distance L away from the combustor 111 in the illustrated example).

Furthermore, the time delay from the point when the measured value of the fuel gas (such as the fuel composition or the heat capacity of the fuel gas) is obtained by the fuel characteristic measuring units 200-1 to 200-*n*, to the point when the fuel gas reaches the combustor 111 is set up with the function applying the output of the gas turbine 2 (the power generator output), so that the timing (time) when the fuel gas reaches the combustor 111 can be synchronized with the timing (time) of taking the measured value into the state grasping unit 22 and the combustion characteristic grasping unit 28 on the basis of this time delay. Note that the means for setting this delay time may be provided on the state grasping unit 22 and on the combustion characteristic grasping unit 28, or on the fuel characteristic measuring units 200-1 to 200*n*.

In addition, the multiple fuel characteristic measuring units 200-1 to 200-*n* have the shifted timing for measuring (sampling) the fuel gas, whereby the measurement results (the fuel composition and the heat capacity) by these fuel characteristic measuring units 200-1 to 200-*n* are sequentially taken into the state grasping unit 22 as well as the combustion characteristic grasping unit 28 and are used for the respective processes.

According to the ninth embodiment, the timing for obtaining the measured value such as the fuel composition or the heat capacity of the fuel gas and taking this value into the automatic adjusting unit 20*i* (the state grasping unit 22 and the combustion characteristic grasping unit 28) can be synchronized with the timing for combusting the fuel gas used for obtaining this measured value in the combustor 111 as similar to the seventh embodiment or the eighth embodiment described above. Consequently, it is possible to suppress the combustion oscillation more reliably at the time of changing the fuel composition and thereby to maintain combustion stability more reliably. In addition, since the sampling cycle (the measurement cycle) of the fuel gas can be shortened, it is possible to improve the tracking performance relative to the change in the fuel composition or the heat capacity of the fuel gas and thereby to maintain combustion stability more reliably.

Tenth Embodiment

Figure 33:
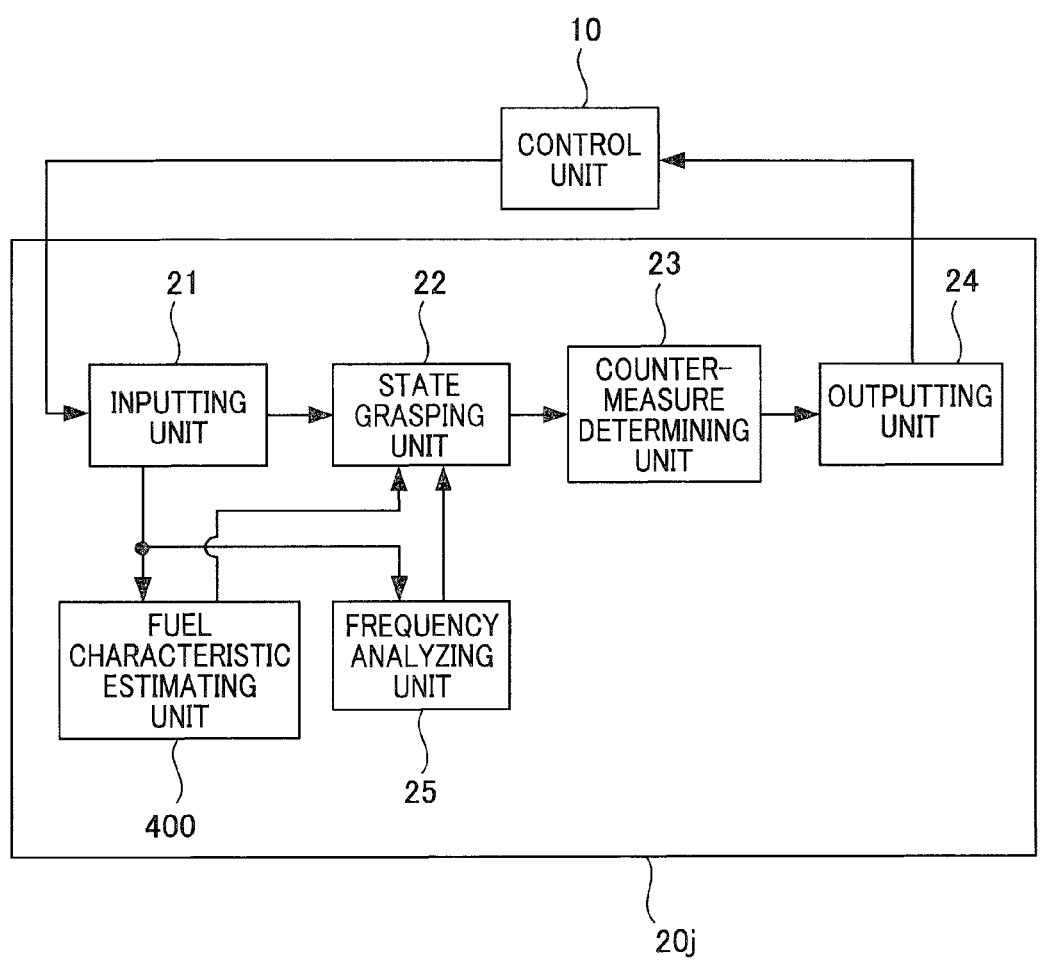
FIG. 33 is a block diagram showing a configuration of an automatic adjusting unit in a gas turbine system of a tenth embodiment.

A tenth embodiment of the present invention will be described with reference to the accompanying drawings. FIG. 33 is a block diagram showing an internal configuration of an automatic adjusting unit used in a gas turbine system of this embodiment. In the configuration of the automatic adjusting unit in FIG. 33, constituents used for the same purposes as the configuration of the automatic adjusting unit in FIG. 3 will be designated by the same reference numerals and detailed description thereof will be omitted.

Unlike the automatic adjusting unit 20*a* shown in FIG. 3, an automatic adjusting unit 20*j* shown in FIG. 33 (which corresponds to the automatic adjusting unit 20 in FIG. 1) includes a fuel characteristic estimating unit 400 instead of installing the fuel characteristic measuring unit 200 in the gas turbine 2. Moreover, while the fuel characteristic estimating unit 201 of the above-described second embodiment (FIG. 13) is configured to estimate the fuel composition or the heat capacity of the fuel gas on the basis of the fuel flow rate, the output of the gas turbine 2 (the power generator output) and efficiency, the fuel characteristic estimating unit 400 of the tenth embodiment is configured to determine a category of the fuel characteristic of the fuel gas on the basis of a ratio between the output of the gas turbine 2 (the power generator output) and the fuel flow rate of the fuel gas. At this time, as the fuel flow rate of the fuel gas, it is possible to use a fuel flow rate measured value to be inputted from the process amount measuring unit 4 (a fuel flow meter) through the inputting unit 21, a value of the fuel flow rate command for the fuel gas, or a fuel flow rate calculated by use of a process measured value other than the fuel flow rate measured value inputted from the process amount measuring unit 4 through the inputting unit 21.

Category classification of the fuel characteristic based on the ratio between the power generator output (the gas turbine output) and the fuel flow rate (power generator output/fuel flow rate) will be described below.

There is a correlation between the ratio between the power generator output (the gas turbine output) and the fuel flow rate, and, the heat capacity as well as the fuel composition of the fuel gas. The fuel flow rates (the amount of supply to the combustor 111) necessary for obtaining the same constant power generator output (the gas turbine output) are different between fuel gas having a large heat capacity and fuel gas having a small heat capacity. Accordingly, the ratios between the power generator output and the fuel flow rate are also different. In other words, in an attempt to obtain the same constant power generator output, combustion of the fuel gas having a small heat capacity requires supply of a larger amount of the fuel gas to the combustor 111 as compared to the case of combusting the fuel gas having a large heat capacity in the combustor 111, and therefore has a tendency that the ratio between the power generator output and the fuel flow rate becomes smaller. Meanwhile, the heat capacity also varies depending on the difference in the fuel composition. Accordingly, the fuel flow rates (the amount of supply to the combustor 111) necessary for obtaining the same constant power generator output varies depending on the difference in the fuel composition, whereby the ratios between the power generator output and the fuel flow rate become different.

For this reason, by analyzing the ratios between the power generator outputs and the fuel flow rates obtained from existing gas turbine systems and data concerning the heat capacity as well as the fuel composition of the fuel gas, for example, it is possible to classify the fuel characteristics into multiple categories on the basis of the ratios between the power generator outputs and the fuel flow rates. Consequently, if thresholds for sorting the categories are preset by performing the above-described category classification in advance, it is possible to judge (estimate) which one of the multiple categories sorted in advance the fuel characteristic (the heat capacity or the fuel composition) of the fuel gas currently used by the gas turbine 2 (supplied to the combustor 111) corresponds to by comparing these thresholds with the ratio between the current generator output and the fuel flow rate.

Here, the correlation between the ratio between the power generator output and the fuel flow rate, and, the heat capacity as well as the fuel composition of the fuel gas also becomes different in response to the power generator output (the gas turbine output). For example, the correlation between the ratio between the power generator output and the fuel flow rate, and, the heat capacity as well as the fuel composition of the fuel gas becomes different when the target power generator output is set to 100 MW or 50 MW, for example. For this reason, the threshold for sorting the categories of the fuel characteristic is changed depending on the power generator output (the gas turbine output) for example.

Figure 34:
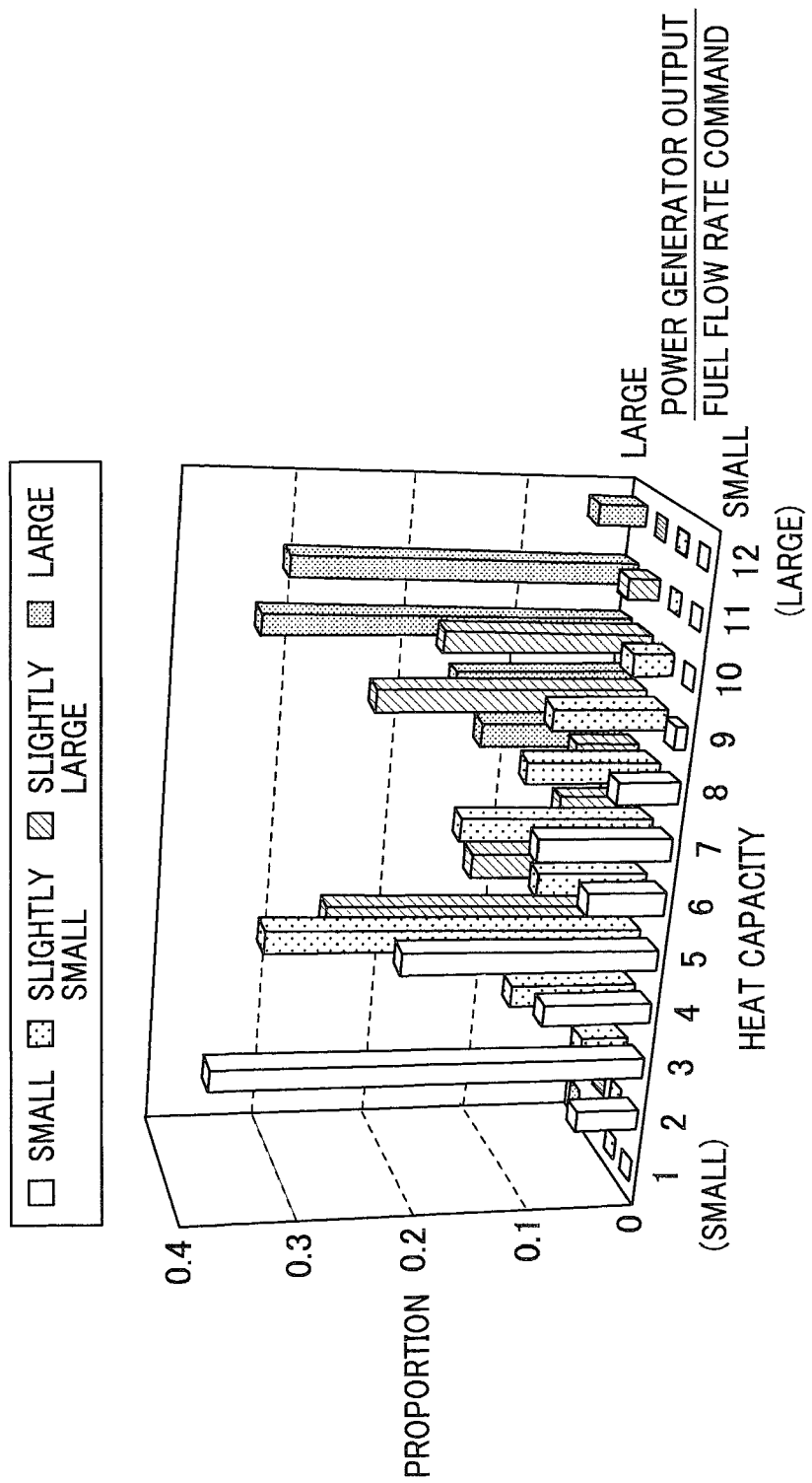
FIG. 34 is a diagram showing an example of category classification of fuel characteristics.

FIG. 34 shows an example of the fuel characteristics classified into four categories. For example, when the measured values (the heat capacity of the fuel gas) collected from the existing gas turbine system with a gas analyzer, the values of the flow rate commands, and the data of the power generator output are analyzed and expressed in a histogram, it is apparent that there is a correlation as shown in FIG. 34 in which the heat capacity of the fuel gas is large when the ratio between the power generator output and the fuel flow rate command is large (i.e. when the fuel flow rate command is small) and the heat capacity of the fuel gas is small when the ratio between the power generator output and the fuel flow rate command is small (i.e. when the fuel flowrate command is large). It is also apparent that the fuel characteristics can be classified into four categories on the basis of the ratio between the power generator output and the fuel flow rate command in the example in FIG. 34. Consequently, the ratio between the power generator output and the fuel flow rate command (i.e. the heat capacity of the fuel gas) is classified into four categories of a small category, a slightly small category, a slightly large category, and a large category, and three thresholds are set up for sorting into these four categories in the example in FIG. 34. Accordingly, in this case, these three thresholds are compared with the ratio between the power generator output and the fuel flow rate to judge (determine) which one out of the four categories sorted in advance the fuel characteristic (the heat capacity) of the fuel gas corresponds to.

The fuel characteristic estimating unit 400 sends the category of the fuel characteristic determined based on this ratio between the power generator output and the fuel flow rate out to the state grasping unit 22 as the fuel characteristic information. Consequently, the state grasping unit 22 in FIG. 3 or the state grasping unit 22 in FIG. 13 is configured to accumulate the fuel composition sent from the fuel characteristic measuring unit 200, or, the measured value of the heat capacity or the estimated value of the fuel composition or the heat capacity sent from the fuel characteristic estimating unit 201 in the data table for state check and send them out to the countermeasure determining unit 23. On the other hand, the state grasping unit 22 of this embodiment shown in FIG. 33 accumulates information on the category of the fuel characteristic sent from the fuel characteristic estimating unit 400 and then sends the information out to the countermeasure determining unit 23.

Figure 7:
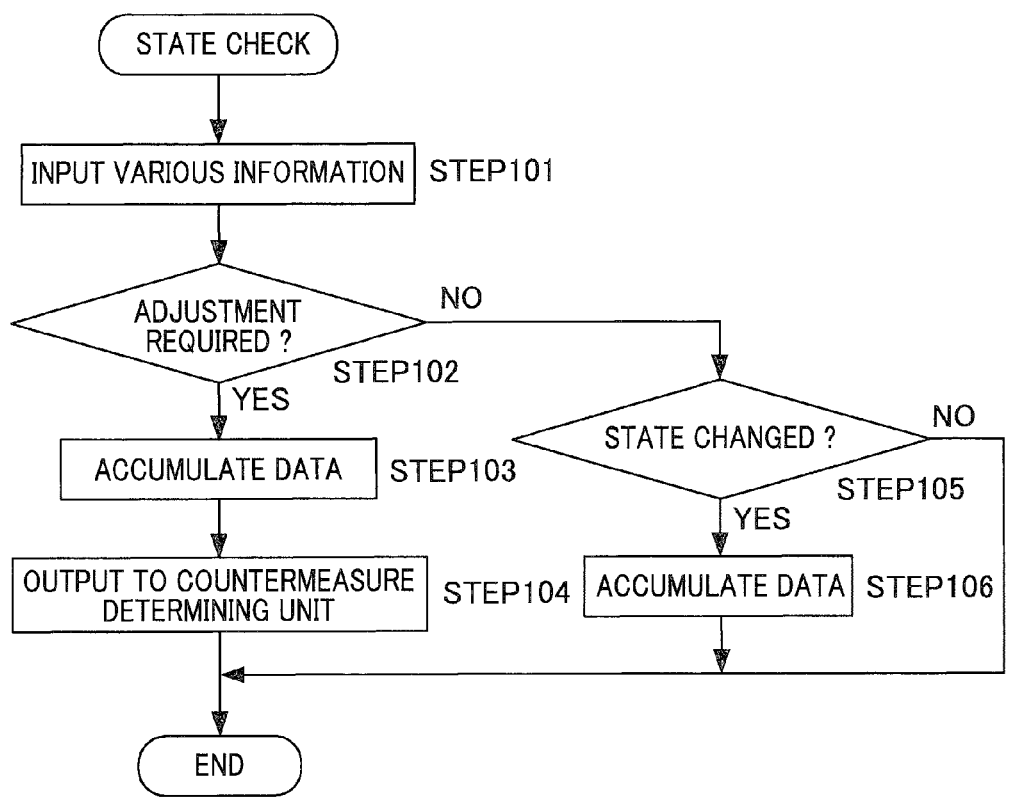
FIG. 7 is a flowchart showing operations of a state grasping unit.

When explained based on FIG. 7, the state grasping unit 22 of this embodiment is configured to accumulate the information on the category of the fuel characteristic to be inputted from the fuel characteristic estimating unit 400 in the data table for state check together with the various process amounts to be inputted from the inputting unit 21 and the maximum values of the oscillation intensity to be inputted from the frequency analyzing unit 25 in STEP 103 and STEP 106 in FIG. 7. In addition, the state grasping unit 22 sends the abnormal frequency designating information indicating the frequency band of the combustor 111 judged to have the oscillation intensity larger than the threshold (which is abnormal) in STEP 104 in FIG. 7 as well as the information on the category of the fuel characteristic out to the countermeasure determining unit 23.

Then, the countermeasure determining unit 22 switches processing contents depending on the category of the fuel characteristic sent from the state grasping unit 23. Specifically, the countermeasure determining unit 23 in FIG. 3 or the countermeasure determining unit 23 in FIG. 13 is configured to determine the state change amounts such as the fuel flow rate or the air flow rate to the combustor 111 on the basis of the measured values or the estimated values of the fuel composition or the heat capacity (to set up the amounts of correction for the state change amounts such as the opening of the bypass valve 118 or the pilot ratio). On the other hand, the countermeasure determining unit 22 of this embodiment shown in FIG. 33 is configured to determine the state change amounts such as the fuel flow rate or the air flow rate to the combustor 111 depending on the category (to set up the amounts of correction for the state change amounts such as the opening of the bypass valve 118 or the pilot ratio).

When explained based on FIG. 9, the countermeasure determining unit 23 of this embodiment sets up the amounts of correction for the state change amount such as the opening of the bypass valve 118 or the pilot ratio corresponding to the category by use of the information on the category of the fuel characteristic which is provided by the fuel characteristic estimating unit 400 through the state grasping unit 22 on the basis of the relational formula (or the data table and the like) for representing the amounts of correction to be determined for the category of the fuel characteristic in STEP 117 in FIG. 9.

Note that other processing contents of the respective units of the automatic adjusting unit 20*j* are similar to the processing contents of the respective units of the automatic adjusting unit 20*a* in FIG. 3.

According to the tenth embodiment, even if the fuel characteristic measuring unit such as a gas analyzer is not provided, it is possible to switch the contents of countermeasure processing following the change in the fuel characteristic by using the category of the fuel characteristic determined by the fuel characteristic estimating unit 400. Consequently, it is possible to maintain combustion stability.

Eleventh Embodiment

An internal configuration of an automatic adjusting unit in an eleventh embodiment of the present invention is similar to the internal configuration of the automatic adjusting unit 20*j* in FIG. 33. Consequently, this embodiment will also be described based on FIG. 33.

The automatic adjusting unit of the eleventh embodiment applies the configuration of the above-described tenth embodiment which further considers a deterioration characteristic of the gas turbine 2. The characteristics of the gas turbine 2 are gradually deteriorated in the course of operation for a long time period. Typical examples of deterioration in the gas turbine may principally include efficiency degradation attributable to dust adhesion to the vanes of the compressor 101 or a clogged intake air filter, for example.

Figure 35:
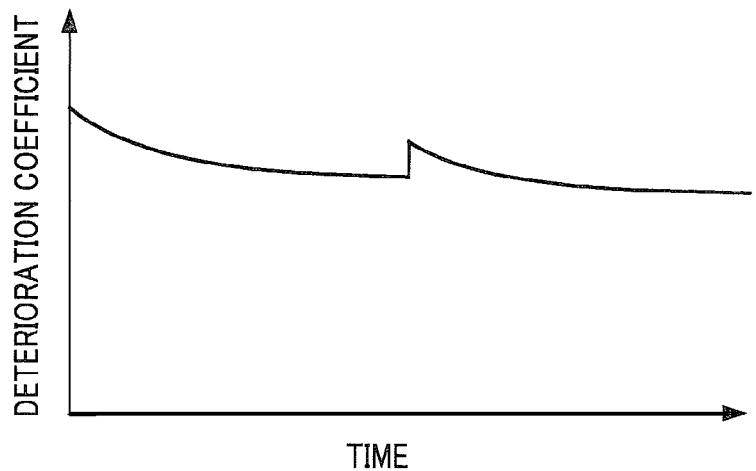
FIG. 35 is a diagram showing an example of a deterioration characteristic of a gas turbine.

For this reason, the deterioration characteristic of the gas turbine 2 is preset and the fuel characteristic estimating unit 400 corrects the ratio between the power generator output and the fuel flow rate on the basis of this deterioration characteristic of the gas turbine 2 and judges the category of the fuel characteristic by comparing the corrected ratio with the thresholds. An example of the deterioration characteristic of the gas turbine 2 is shown in FIG. 35. The fuel characteristic estimating unit 400 is configured to pre-store a function or a data table representing variation in the deterioration characteristic with time as shown therein, to determine a deterioration coefficient by use of the function or the data table representing this variation in the deterioration characteristic with time and of the operating time of the gas turbine 2, and to correct the ratio between the power generator output and the fuel flow rate by multiplying the ratio between the power generator output and the fuel flow rate by the determined deterioration coefficient.

The deterioration characteristic of the gas turbine 2 as shown in FIG. 35 as an example can be set up by setting based on design data of the vanes of the compressor 101 and the intake air filter, or by adjusting this on the basis of the measurement data of the various process amounts collected from the existing gas turbine system, for example. Here, in FIG. 35, the deterioration coefficient is not reduced gradually with time passage but is once increased stepwise on the midway. This represents recovery of efficiency (the performance of the gas turbine 2) due to maintenance of the compressor 101 at a periodic inspection of the gas turbine 2 and removal of dust on the vanes or the intake air filter.

According to the eleventh embodiment, it is possible to judge the category of the fuel characteristic appropriately in the case of operating the gas turbine 2 for a long period of time by correcting the ratio between the power generator output (the gas turbine output) and the fuel flow rate by use of the deterioration characteristic of the gas turbine 2. Consequently, it is possible to maintain combustion stability more reliably. It is to be noted that the present invention is applicable not only to the deterioration characteristic of the gas turbine which is recoverable by maintenance but also to unrecoverable deterioration characteristics.

Twelfth Embodiment

Figure 36:
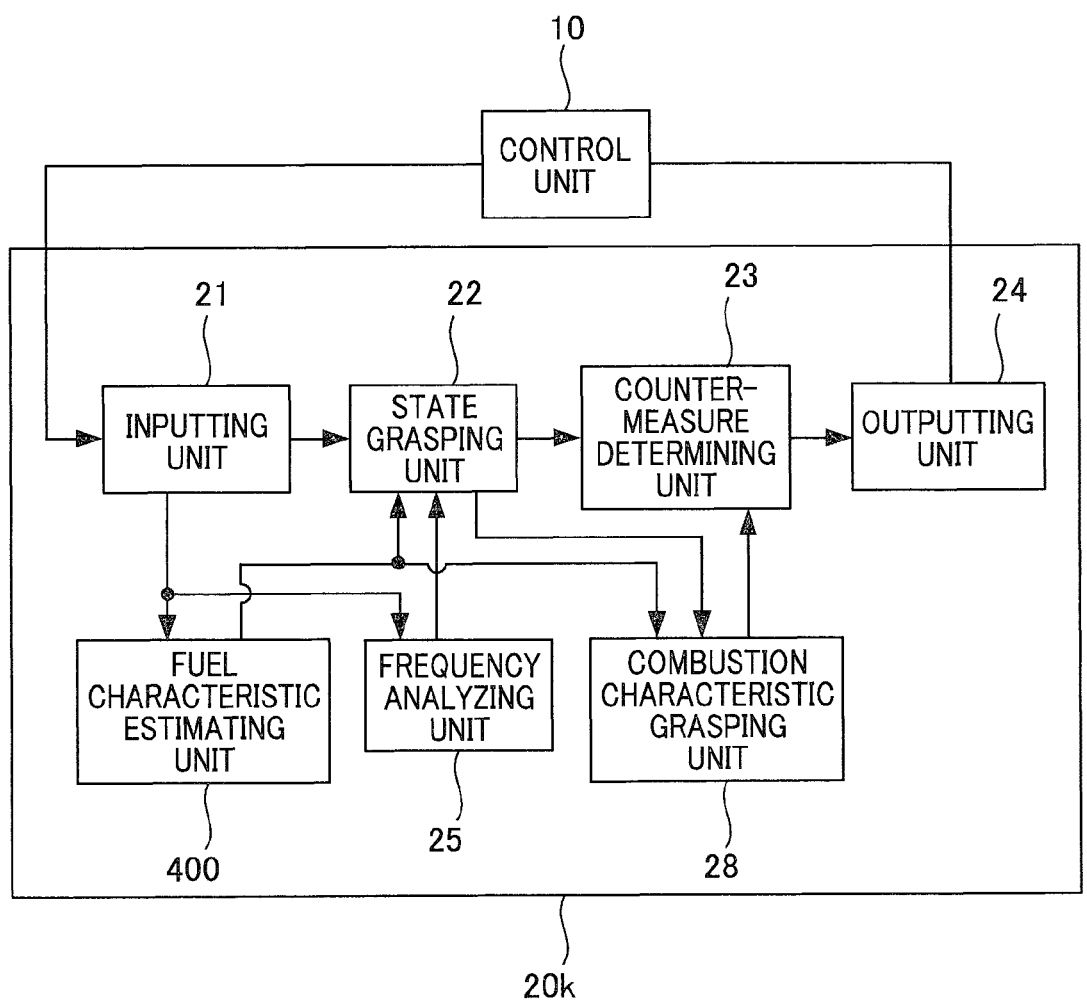
FIG. 36 is a block diagram showing a configuration of an automatic adjusting unit in a gas turbine system of a tenth embodiment.

A twelfth embodiment of the present invention will be described with reference to the accompanying drawings. FIG. 36 is a block diagram showing an internal configuration of an automatic adjusting unit used in a gas turbine system of this embodiment. Here, constituents used for the same purposes as the configuration of the automatic adjusting units in FIG. 15 and FIG. 33 will be designated by the same reference numerals and detailed description thereof will be omitted.

An automatic adjusting unit 20*k* shown in FIG. 36 (which corresponds to the automatic adjusting unit 20 in FIG. 1) has a configuration obtained by adding the combustion characteristic grasping unit 28 for constructing the mathematical model, which is formed by modeling the combustion characteristics based on the respective results of the analyses of the combustion oscillation for the frequency bands accumulated in the data table for state check stored in the state grasping unit 22, and based on the process amounts in the gas turbine 2, to the configuration of the automatic adjusting unit 20*j* shown in FIG. 15.

The combustion characteristic grasping unit 28 shown in FIG. 15 applies the value of the fuel composition information 1 (such as the fuel calorie) $Xy1$ as well as the value of the fuel composition information 2 (such as the volume ratio of the principal components of the fuel gas) $Xy2$ when modeling the maximum value $Yij$ of the oscillation intensity of the pressure oscillation in the j-th frequency band of the combustor 111-*i* by use of the multiple regression model as shown in the formula (3), for example. On the contrary, the combustion characteristic grasping unit 28 of this embodiment shown in FIG. 36 does not apply the fuel composition information. Instead, the combustion characteristic grasping unit 28 of this embodiment performs combustion characteristic modeling on the basis of the category of the fuel characteristic determined by the fuel characteristic estimating unit 400, by using the data corresponding to the category of the fuel characteristic (the data other than the fuel composition information) among the data stored in the data table for state check of the state grasping unit 22, namely, the value of the operation amount 1 (such as the valve opening of the bypass valve 118-*i*) $Xi1$, the value of the operation amount 2 (such as the pilot ratio) $Xi2$, the value of the inoperable state amount 1 (such as the ambient temperature), and the value of the inoperable state amount 2 (such as the load (MW) on the power generator) in the same category as the category of the fuel characteristic determined by the fuel characteristic estimating unit 400 in the example of the formula (3). In other words, the data in the data table for state check used for modeling the combustion characteristic are switched in response to the category of the fuel characteristic.

Note that other processing contents of the combustion characteristic grasping unit 28 of this embodiment, as well as the processing contents of the inputting unit 21, the countermeasure determining unit 23, the outputting unit 24, and the frequency analyzing unit 25 are similar to the processing contents of the combustion characteristic grasping unit 28, the inputting unit 21, the countermeasure determining unit 23, the outputting unit 24, and the frequency analyzing unit 25 in FIG. 15. Moreover, the processing contents of the fuel characteristic estimating unit 400 and the state grasping unit 22 of this embodiment are similar to the processing contents of the fuel characteristic estimating unit 400 and the state grasping unit 22 in FIG. 33. In other words, the fuel characteristic estimating unit 400 determines the category based on the ratio between the power generator output (the gas turbine output) and the fuel flow rate, while the state grasping unit 22 accumulates the category determined by the fuel characteristic estimating unit 400 as well as the various process amounts and the maximum values of the oscillation intensity in the data table for state check, and so forth.

According to the twelfth embodiment, the data in the data table for state check used for modeling the combustion characteristic are switched in response to the category of the fuel characteristic. In other words, the database for the data concerning combustion stability are switched along with the change in the fuel characteristic. Consequently, it is possible to improve accuracy of the characteristic analysis concerning combustion stability, and resultantly to maintain combustion stability while suppressing combustion oscillation at the time of the change in the fuel composition or the heat capacity.

INDUSTRIAL APPLICABILITY

The present invention relates to a control device for a gas turbine for performing control to suppress combustion oscillation and a system including the same, which is applicable to and useful for maintenance of combustion stability of the gas turbine.

The invention claimed is:

1. A gas turbine control device, comprising:
a frequency analyzing unit for performing a frequency analysis of combustion oscillation in a combustor of a gas turbine and for splitting a result of this frequency analysis into a plurality of frequency bands;
a fuel characteristic detecting unit for detecting any of a fuel composition and a heat capacity of fuel to be supplied to the combustor;
an inputting unit to which a process value of the gas turbine other than the fuel composition and the heat capacity of the fuel is inputted;
a state grasping unit for checking a current state of operation of the gas turbine by using the result of the frequency analysis split into the frequency bands from the frequency analyzing unit, the process value of the gas turbine from the inputting unit, and any of the fuel composition and the heat capacity of the fuel detected by the fuel characteristic detecting unit;
a countermeasure determining unit for determining an increase or decrease in a flow rate of at least one of a fuel flow rate and an air flow rate to the combustor on the basis of the current state of operation of the gas turbine checked by the state grasping unit; and
an outputting unit for outputting an operation amount corresponding to a countermeasure determined by the countermeasure determining unit, wherein said state grasping unit includes a data table configured to store therein a history indicating a relation between the fuel composition or the heat capacity of the fuel and combustion oscillation of the combustor, and said countermeasure determining unit determines a relation between the fuel composition or the heat capacity of the fuel and the current state of operation of the gas turbine based on the history.

2. The gas turbine control device according to claim 1, characterized in that the state grasping unit checks the current state of operation of the gas turbine on the basis of the result of the frequency analysis split into the plurality of frequency bands from the frequency analyzing unit and the process value of the gas turbine from the inputting unit,
that the state grasping unit determines a relation of an amount of correction in the current state of operation of the gas turbine corresponding to any of the fuel composition and the heat capacity of the fuel detected by the fuel characteristic detecting unit on the basis of the history indicating the relation between the fuel composition or the heat capacity of the fuel and combustion oscillation of the combustor, and
that the state grasping unit corrects the checked current state of operation on the basis of any of the fuel composition and the heat capacity of the fuel detected by the fuel characteristic detecting unit.

3. The gas turbine control device according to claim 1, characterized by comprising:
a combustion characteristic grasping unit for finding a relational expression indicating a combustion characteristic of the combustor from a relation between the current state of operation of the gas turbine checked by the state grasping unit and any of the fuel composition and the heat capacity of the fuel,
characterized in that the countermeasure determining unit determines the increase or decrease in the flow rate of at least one of the fuel flow rate and the air flow rate to the combustor by calculation based on any of the fuel composition and the heat capacity of the fuel checked through the state grasping unit.

4. The gas turbine control device according to claim 3, characterized in that the combustion characteristic grasping unit finds the relational expression indicating the combustion characteristic of the combustor from the history indicating the relation between the fuel composition or the heat capacity of the fuel and combustion oscillation of the combustor.

5. The gas turbine control device according to claim 3, characterized in that the relational expression indicating the combustion characteristic of the combustor is generated for each of the frequency bands split by the frequency analyzing unit and represents an expression indicating a relation among the result of the frequency analysis, the fuel composition or the heat capacity of the fuel, and the fuel flow rate as well as the air flow rate to the combustor.

6. The gas turbine control device according to claim 3, characterized in that the counter measure determining unit determines the increase or decrease in the flow rate of at least one of the fuel flow rate and the air flow rate to the combustor by utilizing an optimization method based on a relation between the current state of operation of the gas turbine checked by the state grasping unit and the relational expression indicating the combustion characteristic of the combustor by the combustion characteristic grasping unit.

7. The gas turbine control device according to claim 1, characterized by comprising:
a performance characteristic grasping unit for detecting efficiency of any of the entirety and respective units of the gas turbine by use of the process value of the gas turbine from the inputting unit and the fuel composition or the heat capacity of the fuel detected by the fuel characteristic detecting unit, characterized in that the countermeasure determining unit corrects an amount of the increase or decrease in the flow rate of at least one of the fuel flow rate and the air flow rate to the combustor, which is previously set up, to improve efficiency of any of the entirety and the respective units of the gas turbine detected by the performance characteristic grasping unit.

8. The gas turbine control device according to claim 1, characterized by comprising:
a life characteristic grasping unit for detecting lives of the respective units of the gas turbine by use of the process value of the gas turbine from the inputting unit and the fuel composition or the heat capacity of the fuel detected by the fuel characteristic detecting unit,
characterized in that the countermeasure determining unit corrects an amount of the increase or decrease in the flow rate of at least one of the fuel flow rate and the air flow rate to the combustor, which is previously set up, to improve the lives of the respective units of the gas turbine detected by the life characteristic grasping unit.

9. The gas turbine control device according to claim 1, characterized in that combustion oscillation of the combustor is measured based on any of pressure fluctuation of the combustor and acceleration oscillation of the combustor.

10. The gas turbine control device according to claim 1, characterized in that the fuel characteristic detecting unit includes a gas analyzer for measuring concentrations of respective components of the fuel and detects the fuel composition or the heat capacity of the fuel on the basis of the concentrations of the respective components of the fuel measured by the gas analyzer.

11. The gas turbine control device according to claim 1, characterized in that the fuel characteristic detecting unit is installed on a fuel supply line for guiding the fuel from a fuel supply source to the combustor and a location of the installation is set to a position where it is possible to obtain a measurement value of the fuel measured in the location of the installation before the measured fuel flows on the fuel supply line and reaches the combustor.

12. The gas turbine control device according to claim 11, characterized in that a time delay from a point of obtaining the measurement value of the fuel by the fuel characteristic detecting unit to a point of the fuel reaching the combustor is set by a function of any of an output of the gas turbine and the fuel flow rate, and
that timing of the fuel reaching the combustor is synchronized with timing of capturing the measurement value by the state grasping unit or by the state grasping unit and the combustion characteristic grasping unit on the basis of this time delay.

13. The gas turbine control device according to claim 11, characterized in that a plurality of the fuel characteristic detecting units are installed in the location of installation, and
that the plurality of the fuel characteristic measuring units have shifted timing for measuring the fuel.

14. The gas turbine control device according to claim 1, characterized in that the fuel characteristic detecting unit detects the fuel composition or the heat capacity of the fuel on the basis of the fuel flow rate of the fuel and an output as well as efficiency of the gas turbine.

15. The gas turbine control device according to claim 1, characterized in that, when the fuel to be supplied to the combustor includes a plurality of types of fuel substances having mutually different fuel compositions, the countermeasure determining unit also sets up increases or decreases of respective fuel flow rates of the plurality of types of fuel substances.

16. A gas turbine system characterized by comprising:
a compressor for compressing external air;
a combustor for combusting compressed air from the compressor and fuel;
a turbine for being rotated by combustion gas from the combustor; and
a gas turbine control device for setting an air flow rate and a fuel flow rate to the combustor on the basis of process values respectively measured in terms of the compressor, the combustor and the turbine,
characterized in that the gas turbine control device is the gas turbine control device according to claim 1.

17. The gas turbine system according to claim 16, characterized by comprising:
a plurality of gas turbine plants each having the compressor, the combustor and the turbine, and a control device for controlling states of operation of the plurality of gas turbine plants by communicating with the plurality of gas turbine plants,
characterized in that the gas turbine plant includes the inputting unit, the fuel characteristic detecting unit, the frequency analyzing unit, the outputting unit, and a communicating unit for communicating with the control device, and
that the control device includes the state grasping unit, the countermeasure determining unit, and a communicating unit for communicating with the gas turbine plants.

* * * * *